United States Patent
Lyons et al.

(10) Patent No.: US 9,558,612 B2
(45) Date of Patent: *Jan. 31, 2017

(54) SYSTEM AND METHOD FOR AUGMENTED REALITY GAMING

(71) Applicant: Bally Gaming, Inc., Las Vegas, NV (US)

(72) Inventors: Martin S. Lyons, Henderson, NV (US); Roderick Ang, Las Vegas, NV (US); Brett Jackson, Henderson, NV (US); Joseph Randy Hedrick, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 679 days.

This patent is subject to a terminal disclaimer.

(21) Appl. No.: 13/918,607

(22) Filed: Jun. 14, 2013

(65) Prior Publication Data

US 2013/0281206 A1   Oct. 24, 2013

Related U.S. Application Data

(63) Continuation-in-part of application No. 12/946,723, filed on Nov. 15, 2010, now Pat. No. 8,550,903.

(Continued)

(51) Int. Cl.
*G07F 17/32* (2006.01)
*A63F 13/53* (2014.01)
(Continued)

(52) U.S. Cl.
CPC ......... *G07F 17/3211* (2013.01); *G06T 19/006* (2013.01); *G07F 17/323* (2013.01);
(Continued)

(58) Field of Classification Search
CPC  G07F 17/3211; G07F 17/323; G07F 17/3206; G06T 19/006; A63F 2300/8082; A63F 2300/69; G06K 9/00664; G06K 9/00671; G02B 2027/0178; G02B 27/017; G02B 27/0172; G06F 3/017

See application file for complete search history.

(56) References Cited

U.S. PATENT DOCUMENTS

2002/0010025 A1   1/2002  Kelly et al.
2004/0229684 A1   11/2004 Blackburn et al.
(Continued)

FOREIGN PATENT DOCUMENTS

WO   WO2010128329   11/2010

*Primary Examiner* — Werner Garner
(74) *Attorney, Agent, or Firm* — Seed IP Law Group LLP

(57) ABSTRACT

Disclosed is a method for enabling an augmented reality interaction system and a mobile device to overlay a virtual 3D component over a physical 3D component with which the virtual 3D component interacts. The method includes: enabling a user to capture a live camera image of a gaming machine cabinet via a camera on the mobile device; determining if there are image tags on the gaming machine cabinet in the live camera image; producing a virtual rendering of the gaming machine cabinet; determining virtual 3D components to be displayed over an image of a virtual gaming machine cabinet; comparing a virtual depth rendering of the virtual 3D components to a virtual depth rendering of the virtual gaming machine cabinet; and overlaying virtual 3D components without the subtracted elements onto a live camera image of the virtual gaming machine cabinet on a display of the mobile device.

20 Claims, 86 Drawing Sheets

Related U.S. Application Data

(60) Provisional application No. 61/659,966, filed on Jun. 14, 2012.

(51) Int. Cl.
  *G06K 9/00* (2006.01)
  *G06T 15/40* (2011.01)
  *G06T 19/00* (2011.01)

(52) U.S. Cl.
  CPC ....... *A63F 13/53* (2014.09); *A63F 2300/1093* (2013.01); *A63F 2300/203* (2013.01); *A63F 2300/308* (2013.01); *A63F 2300/6045* (2013.01); *A63F 2300/66* (2013.01); *A63F 2300/69* (2013.01); *A63F 2300/8082* (2013.01); *G06K 9/00664* (2013.01); *G06K 9/00671* (2013.01); *G06T 15/405* (2013.01); *G07F 17/3206* (2013.01)

(56) References Cited

U.S. PATENT DOCUMENTS

| | | |
|---|---|---|
| 2006/0232662 A1 | 10/2006 | Otaka et al. |
| 2008/0026822 A1 | 1/2008 | Walker et al. |
| 2008/0189360 A1 | 8/2008 | Kiley et al. |
| 2009/0017913 A1 | 1/2009 | Bell et al. |
| 2009/0209320 A1 | 8/2009 | Walker et al. |
| 2010/0197490 A1 | 8/2010 | Adzic et al. |
| 2011/0060669 A1 | 3/2011 | Laves |
| 2011/0183749 A1 | 7/2011 | Allen et al. |
| 2011/0207531 A1 | 8/2011 | Gagner et al. |
| 2012/0021814 A1 | 1/2012 | Gurovich et al. |
| 2012/0086727 A1* | 4/2012 | Korah ............. G06T 19/006 345/633 |
| 2012/0105487 A1 | 5/2012 | Son et al. |
| 2012/0122528 A1 | 5/2012 | Lyons et al. |

\* cited by examiner

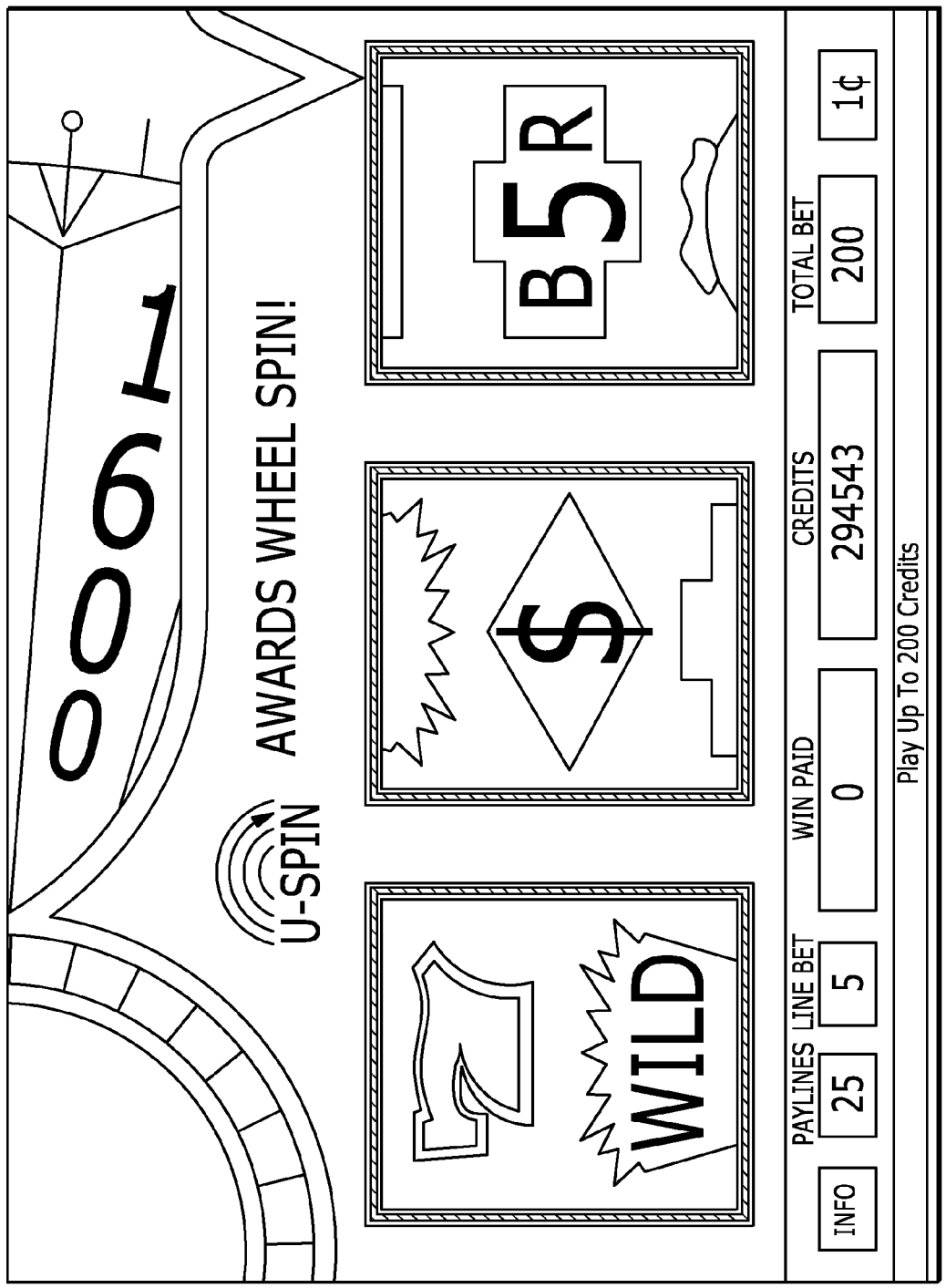

FIG. 39

Alien Attack Bonus Feature-Pick 'Em Game

The player is awarded credits during the Pick 'Em game portion of the Alien Attack Bonus Feature.

All pays in the Pick 'Em are multiplied by the bet multiplier that was in play when the Alien Attack Bonus Feature was initiated.

Rookie, Veteran, and Ace Ranking do NOT affect credits paid.

Touch A Ship To Win A Prize

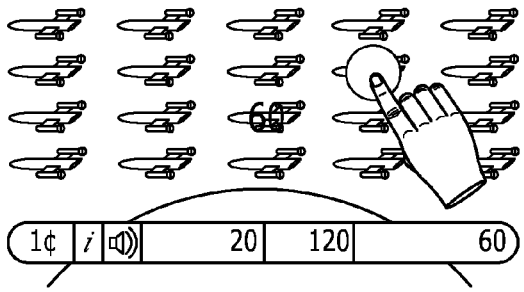

| 1¢ | i | 🔊 | 20 | 120 | 60 |

Pick any enemy ship to reveal prize credits. Each time a ship is selected other enemy ships may warp out and be removed from the field.

Continue picking ships until none remain. The Alien Attack Bonus Feature ends when no enemy ships remain.

FIG. 40

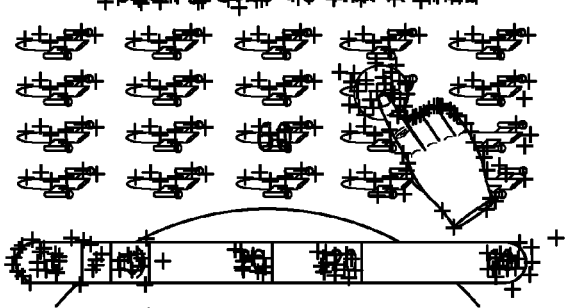

SYSTEM AND METHOD FOR AUGMENTED REALITY GAMING

CROSS-REFERENCE TO RELATED APPLICATIONS

This application claims priority to U.S. Provisional Patent Application No. 61/659,966, filed Jun. 14, 2012, which is incorporated herein by reference. This application is also a continuation-in-part of U.S. patent application Ser. No. 12/946,723, filed Nov. 15, 2010, which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

This disclosure is directed to wagering games, gaming machines, networked gaming systems and methods, and in particular to the maintenance of these wagering games, gaming machines, networked gaming systems and methods.

BACKGROUND

Previously, various types of gaming machines have been developed with different features to captivate and maintain player interest. In general, a gaming machine allows a player to play a game in exchange for a wager. Depending on the outcome of the game, the player may be entitled to an award which is paid to the player by the gaming machine, normally in the form of currency or game credits. Gaming machines may include flashing displays, lighted displays, or sound effects to capture a player's interest in a gaming device.

Another important feature of maintaining player interest in a gaming machine includes providing the player with many opportunities to win awards, such as cash or prizes. For example, in some slot machines, the display windows show more than one adjacent symbol on each reel, thereby allowing for multiple-line betting.

In the past, manufacturers have developed systems for control of gaming machines. Specifically, these have included applications for denying self-excluded gamblers from playing slot machines, bonusing of anonymous players and allowing a player to participate in a casino loyalty scheme without the need to insert a physical card into the gaming machine.

While gaming machines including feature games have been successful, there remains a need for feature games that provide players with enhanced excitement and an increased opportunity of winning.

SUMMARY

Briefly, and in general terms, the method is disclosed for enabling an augmented reality interaction system and a mobile device to overlay a virtual 3D component over a physical 3D component with which the virtual 3D component interacts. The method includes: controlling a camera on the mobile device using the augmented reality interaction system; enabling a user to capture a live camera image of a gaming machine cabinet via the camera; determining if there are image tags on the gaming machine cabinet in the live camera image; in response to identifying images tags on the gaming machine cabinet, producing a virtual rendering of the gaming machine cabinet; determining virtual 3D components to be displayed over an image of a virtual gaming machine cabinet, wherein the virtual 3D components include a plurality of elements each having a depth value and the virtual gaming machine cabinet includes a plurality of elements each having a depth value; comparing a virtual depth rendering of the virtual 3D components to a virtual depth rendering of the virtual gaming machine cabinet; in response to the comparison, subtracting the elements of the virtual 3D components that have a lower depth value than elements of the virtual gaming machine cabinet at corresponding spatial positions; and overlaying virtual 3D components without the subtracted elements onto a live camera image of the virtual gaming machine cabinet on a display of the mobile device.

In one embodiment, the disclosed method further comprises using a depth buffer to determine which elements of a 3D rendering are visible to a virtual camera. In another aspect of one embodiment, the disclosed method further comprises determining the z-value of each element is compared against an existing depth buffer z-value at the same screen co-ordinate, wherein if the existing z-value is greater, the pixel is drawn, and wherein if the existing z-value is less than an existing depth buffer z-value at the same screen co-ordinate, then the pixel is discarded. Continuing, another aspect of one embodiment further comprises rendering the virtual gaming machine cabinet by mapping the image tag co-ordinates to the gaming machine cabinet co-ordinates using vector subtraction. In still another aspect, one embodiment further comprises combining the camera video image with the rendering of the additional virtual 3D component minus the virtual gaming machine cabinet.

In another embodiment, the disclosed method includes a CAD model having spatial parameters is associated with an image tag. In another aspect, the virtual rendering of the gaming machine cabinet is a virtual depth-only rendering of the gaming machine cabinet. In still another aspect, virtual rendering of the gaming machine cabinet extracts 2D information from the display of the gaming machine to produce a 3D image of the gaming machine. Continuing, in yet another aspect, one embodiment further includes overlaying virtual graphics in a position within 3D space on a display of the mobile device that augment the display of the gaming machine with 3D to create complex augmented reality.

In some embodiments, an object recognition system of the augmented reality gaming assistance component establishes a communication channel between the augmented reality component and the gaming machine enabling additional elements of the game to be augmented on the mobile device, and elements of the game content to be influenced by the augmented state. Additionally, in some embodiments the augmented reality translation system of the augmented reality assistance component extracts a first language from the display of the gaming machine and translates the first language into a second language that is visible to the user in place of the first language.

In another embodiment, a method is disclosed of enabling an augmented reality interaction system and a mobile device to overlay a virtual 3D component over a physical 3D component with which the virtual 3D component interacts. The method includes: enabling a user to capture a live camera image of a 3D object via a camera on the mobile device; determining if there are image tags on the 3D object in the live camera image; in response to identifying images tags on the 3D object, producing a virtual rendering of the 3D object; determining virtual 3D components to be displayed over an image of a 3D object, wherein the virtual 3D components include a plurality of elements each having a depth value and the virtual 3D object includes a plurality of elements each having a depth value; comparing a virtual depth rendering of the virtual 3D components to a virtual depth rendering of the virtual 3D object; in response to the comparison, subtracting the elements of the virtual 3D components that have a lower depth value than elements of the virtual 3D object at corresponding spatial positions; and overlaying virtual 3D components without the subtracted elements onto a live camera image of the virtual 3D object on a display of the mobile device.

Features and advantages will become apparent from the following detailed description, taken in conjunction with the accompanying drawings, which illustrate by way of example, the features of the various embodiments.

BRIEF DESCRIPTION OF THE DRAWINGS

FIG. 32C illustrates the alignment boxes of FIG. 32B overlaid onto the live camera image that was displayed in FIG. 32A.

FIG. 39 illustrates an embodiment that shows a help screen to be translated.

FIG. 40 illustrates an embodiment that shows an Augmented Reality Tag Data for Help Screen.

DETAILED DESCRIPTION OF PREFERRED EMBODIMENTS

Figure 1:
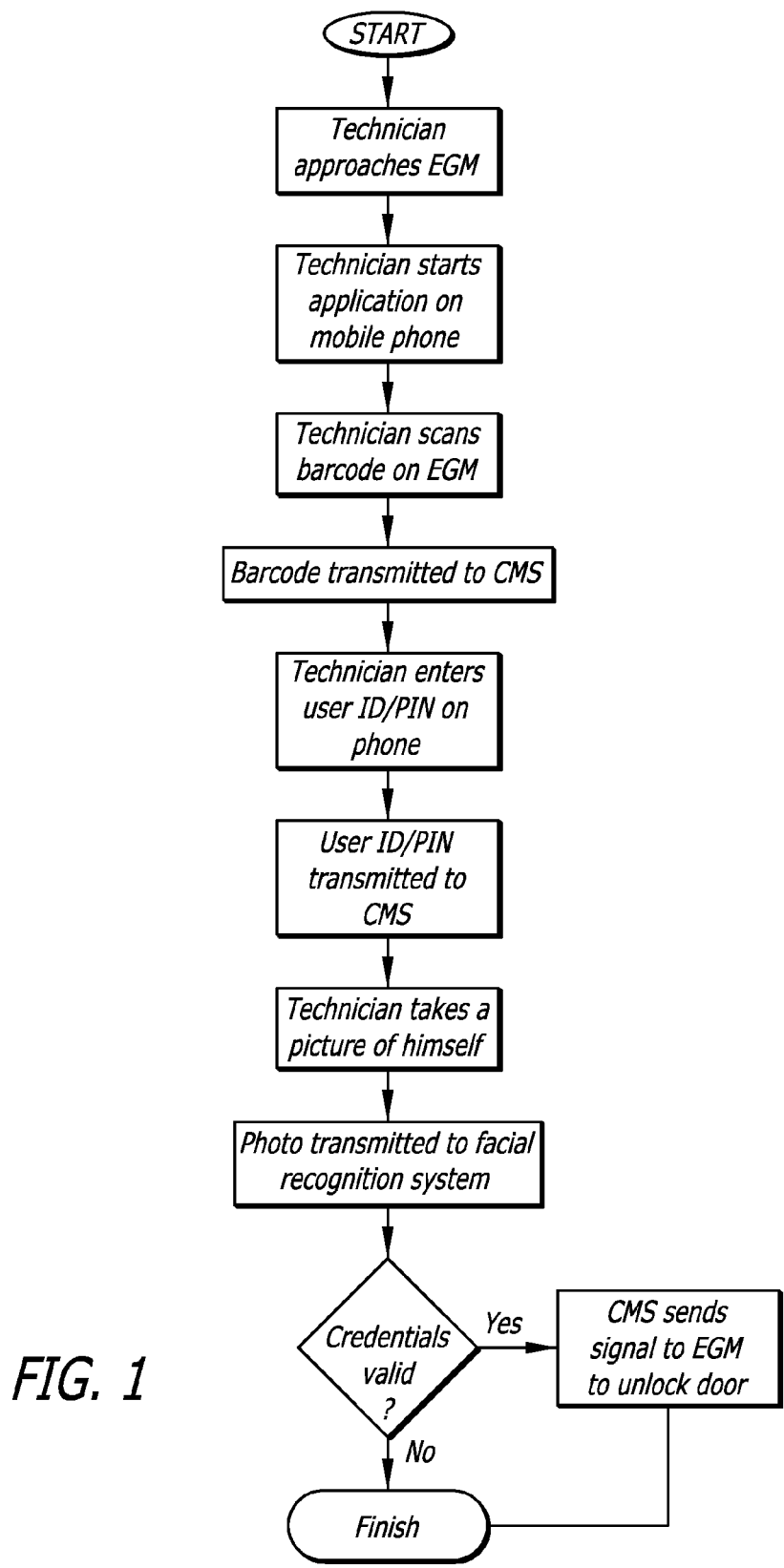
FIG. 1 illustrates a logic flow diagram of a process for a technician to unlock a gaming device in a gaming system that utilizes a biometric controlled door lock.

Various embodiments are directed to a game, gaming machine, and/or gaming system and method for playing a game, wherein the gaming system includes biometrically-controlled door locks. The embodiments are illustrated and described herein, by way of example only, and not by way of limitation. Referring now to the drawings, and more particularly to FIGS. 1-7, there are shown illustrative examples of games, gaming machines, gaming systems and methods for playing a game in accordance with various aspects of the gaming system which includes biometrically-controlled door locks.

Figure 2:
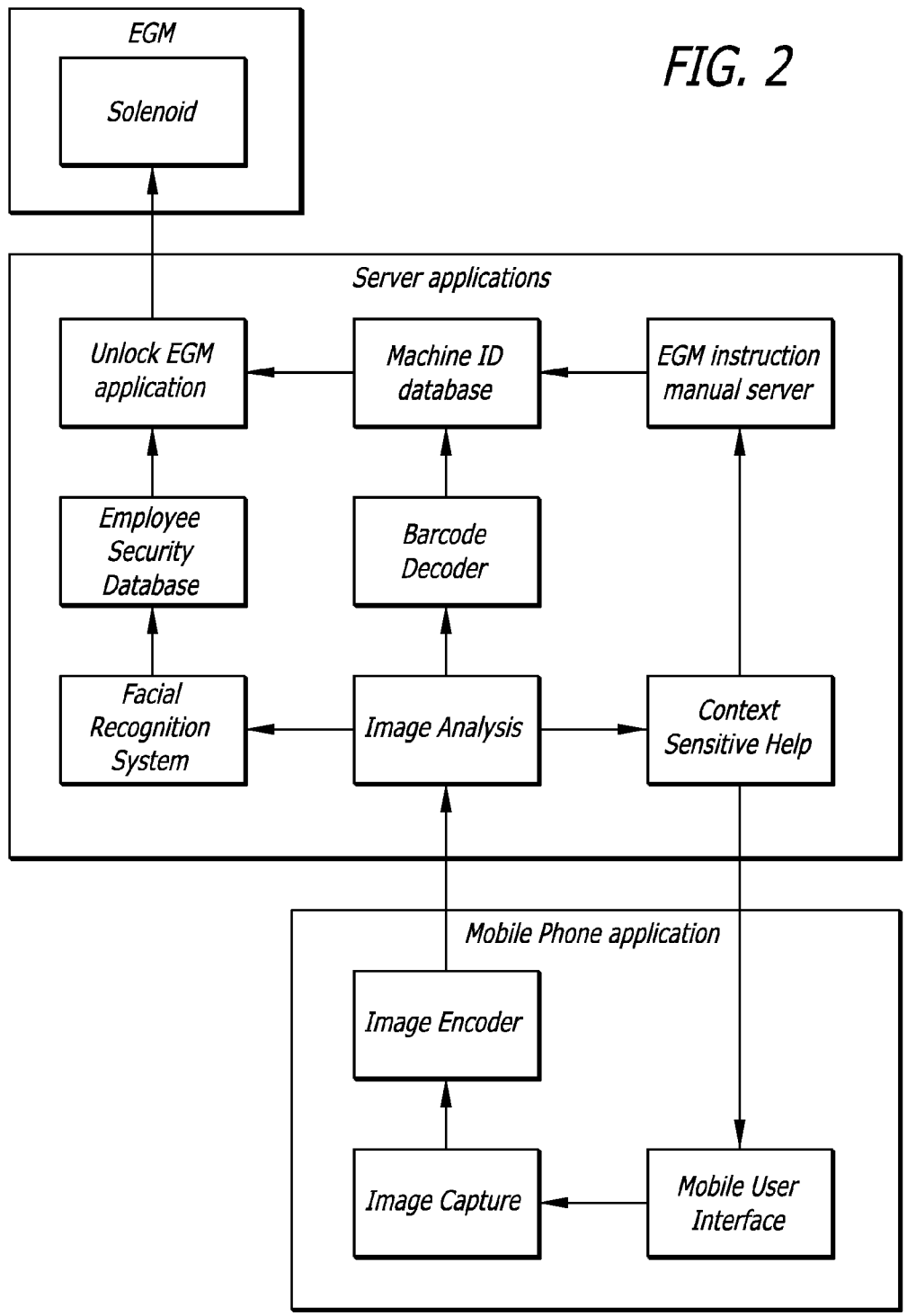
FIG. 2 illustrates a system overview of a gaming system that utilizes a biometric controlled door lock.

An example in accordance with one or more aspects of a disclosed embodiment is shown in FIGS. 1-2. A preferred embodiment of a gaming system includes a biometrically-controlled door lock 100. The biometrically-controlled door lock enables a technician to open a gaming machine door without needing a master key. Instead, the technicians present themselves to a camera built into the gaming machine, and a picture is taken of them. This picture is transmitted to the casino management system (CMS) and if the facial recognition software running on the CMS identifies the technician as being authorized, a message is sent to the EGM (electronic gaming machine) to unlock the door. The gaming machine has a solenoid attached to the door lock, and is able to unlock the door under software control.

The advantage of such a system is that it removes the need for a casino to issue master keys to technicians.

A preferred embodiment of a gaming system which includes biometrically-controlled door locks enables a technician to open a gaming machine without using a key. Traditional key and lock systems are difficult to change. Moreover, the disclosed gaming system offers better security than either the existing key or biometric systems. Additionally, a preferred embodiment of a gaming system which includes biometrically-controlled door locks is also much cheaper to deploy, requiring only a software-controlled solenoid to be installed in each gaming machine.

A preferred embodiment of this gaming system, which includes biometrically-controlled door locks, leverages existing mobile "smart phones." By way of example only, and not by way of limitation, such smart phones include Apple's iPhone series, Google's Droid and Nexus One series, Palm's Pre series, and RIM's Blackberry series of smart phones. Most, if not all, of these smart phones include a built-in camera that can be controlled by software applications. Accordingly, preferred embodiments of this gaming system "move" the camera from the gaming machine to a smart phone, carried by the technician. In more detail, the components that make up the gaming system having biometrically-controlled door locks may be seen in FIG. 2. In this regard, a preferred embodiment of a locking system should employ (1) something you are (e.g., a biometric), (2) something you know (e.g., a PIN), and (3) something you possess (e.g., a physical token, such as a key).

As part of one aspect of a disclosed embodiment, a technician is equipped with a smart phone. Additionally, a manufacturer develops a specific biometric lock application for this embodiment that is deployed by casino IT staff. For security purposes, this application is not widely distributed, and it is not downloadable by the public. The biometric lock application is capable of taking photographs using the camera built into the phone, and passing these photographs over an encrypted internet (Secure Socket Layer) connection to a web server connected to the CMS. In some embodiments, the web server also provides context-sensitive help documents to the mobile phone, in addition to being able to take photographs.

In a preferred embodiment of a gaming system having biometrically-controlled door locks, each gaming machine is equipped with a solenoid to control the opening of the cabinet door. The gaming machine also includes software to enable commands to be sent from the CMS to enable the door to be opened by triggering the solenoid. In addition, the gaming machine preferably has a sticker or placard attached that uniquely identifies the machine. This may be achieved by a barcode printed on the sticker.

Referring now to the process in FIG. 1, a technician is tasked to perform some maintenance on a gaming machine. In practice, he or she approaches the gaming machine in question and starts the technician biometric lock application on the smart phone. The technician is prompted to scan the gaming machine's barcode, and then the biometric lock application presents the current image being read by the camera on the phone's LCD screen. Once the technician positions the camera at a suitable distance from the barcode, the image is captured, and sent via the encrypted link over the internet to the web server. At the web server, the image analysis software decodes the image and determines that it is a barcode. The barcode decoding module determines an identifier, which is used by the Machine ID database to determine which gaming machine has been scanned.

In some preferred embodiments, the CMS then responds back to the mobile phone with information about the gaming machine so that the technician may confirm that the barcode is correct. This information may consist of the name of the game currently loaded on the gaming machine and other identifying information.

After confirming that the gaming machine is correct, for security purposes, at this point the technician must enter a PIN (Personal Identification Number), or a user identifier/password combination. These credentials are transmitted to the CMS via the internet. The mobile phone application then tells the technician to take a self-portrait using the camera on the mobile phone. For some phones equipped with dual cameras (such as most Nokia models, the iPhone 4, and the HTC EVO), this simply means holding the phone up to get a good view of the face. In the case where the phone has only one camera, the technician turns the phone around so that the camera faces him or her, and presses the button on the user interface of the phone to take a picture.

The captured image is also sent up to the CMS via the secure cellular internet connection. As an alternative to the use of secure connections over the internet, a WiFi local network may also be used if it is present in the casino. At the CMS, the image analysis software passes the self-portrait to the facial recognition system, which determines the employee identifier associated with the face presented.

In addition to the credentials described above, in another aspect of some embodiments, the smart phone itself may be "married" to a particular employee. In such embodiments, in every transaction a unique identifier for the phone may also be transmitted. This identifier is set at install time, and cannot be changed by the technician. Alternatively, the phone's IMEI (International Mobile Equipment Identity) number or other cellular identifier may be used.

In some preferred embodiments of the gaming system having biometrically-controlled door locks, all four credentials are passed to the unlock application at the CMS including (1) the employee ID, (2) the phone identifier, (3) the machine ID and (4) the PIN. If all credentials are valid (i.e., if the employee is currently allowed to unlock the gaming machine), an unlock signal is sent over the CMS network to the gaming machine. Once the gaming machine receives this signal, the controller associated with the door solenoid causes it to be tripped. In other embodiments, only three of the four credentials are passed to the unlock application at the CMS.

Once opened, a specific set of help pages are retrieved by the CMS from a gaming machine instruction manual server to aid the technician in his tasks. These pages are made available on the smart phone for the technician to peruse and are specific to the game and cabinet combination in question.

To further assist the technician, at any time he or she may take a photograph of the gaming machine's LCD display. Any error messages, "lockup" messages or menus displayed may be read by the image analysis module at the CMS and by OCR (Optical character recognition) may be used to index into context-sensitive help for the particular problem.

In addition to a barcode on the exterior of the gaming machine, each peripheral within the machine may also have a barcode. By scanning the barcode with the camera on the mobile phone using the mobile phone application, context-sensitive help may also be retrieved for maintaining the peripheral, or for determining the asset status or configuration of a peripheral.

Some preferred implementations of the disclosed embodiments use a smart phone with two cameras and OpenCV image analysis software. Additionally, some embodiments:

(1) provide a cheaper solution than installing cameras in each gaming machine; (2) enable a casino to update software 'keys' without needing to replace thousands of locks; (3) enable technicians to carry a physical token (i.e., the smart phone) that is very difficult to copy; (4) employs facial recognition and PIN security measures that prevent casual theft of a smart phone causing security issues; and (5) technicians can receive context-sensitive help to fix a particular gaming machine. In other aspects, some embodiments provide: (1) use of the combination of a phone, camera, facial recognition, barcode and network-controlled solenoid to open a gaming machine door; and (2) context sensitive help for maintenance of the gaming machine, delivered by phone to authorized personnel. In this manner, a technician points his phone's camera at an error message and receives help to fix the specific problem associated with the error message.

In another aspect of some embodiments, gaming systems are utilized that include augmented reality viewing capabilities 300. In such embodiments of the disclosed gaming system, smart phones are utilized that include a built in gyroscope, as well as location tracking technology such as a digital compass and a GPS system (Global Positioning System). These features enable the accurate position and orientation of the smart phones and its user to be derived. Additionally, some other embodiments of the disclosed gaming system use object recognition and OCR (Optical character recognition) techniques combined with location/orientation derivation to provide players in casinos easy ways of finding games, progressive jackpots, particular machines, and other players of their choice.

Figure 3:
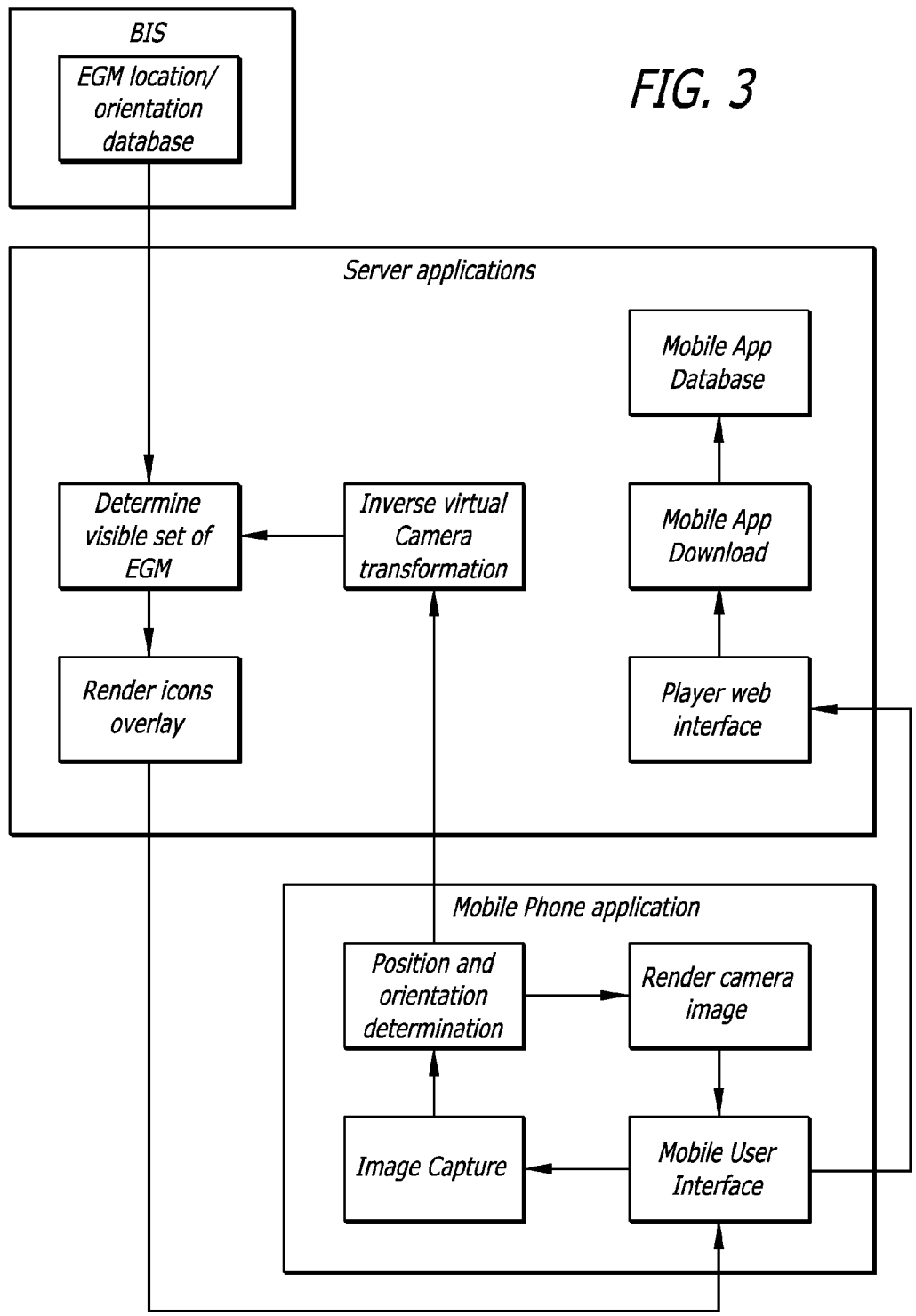
FIG. 3 illustrates a system overview of an augmented reality venue system.

The overall arrangement of the gaming systems that include augmented reality viewing capabilities may be seen in FIG. 3. In broad terms, gaming systems that include augmented reality viewing capabilities include an application loaded onto a camera-enabled smart phone, a back-end system for assisting the application, and integration modules for connecting to an existing Business Intelligence System (BIS).

In some embodiments, the Business Intelligence System provides a database or other structure that includes a table of the position and orientation of every gaming machine in a venue. Continuing, in such embodiments each position/orientation is associated with a unique identifier that enables this system to query the Casino Management System (CMS) to retrieve data for the gaming machine in question such as current occupancy, historical performance, current denomination and other relevant attributes.

Figure 4:
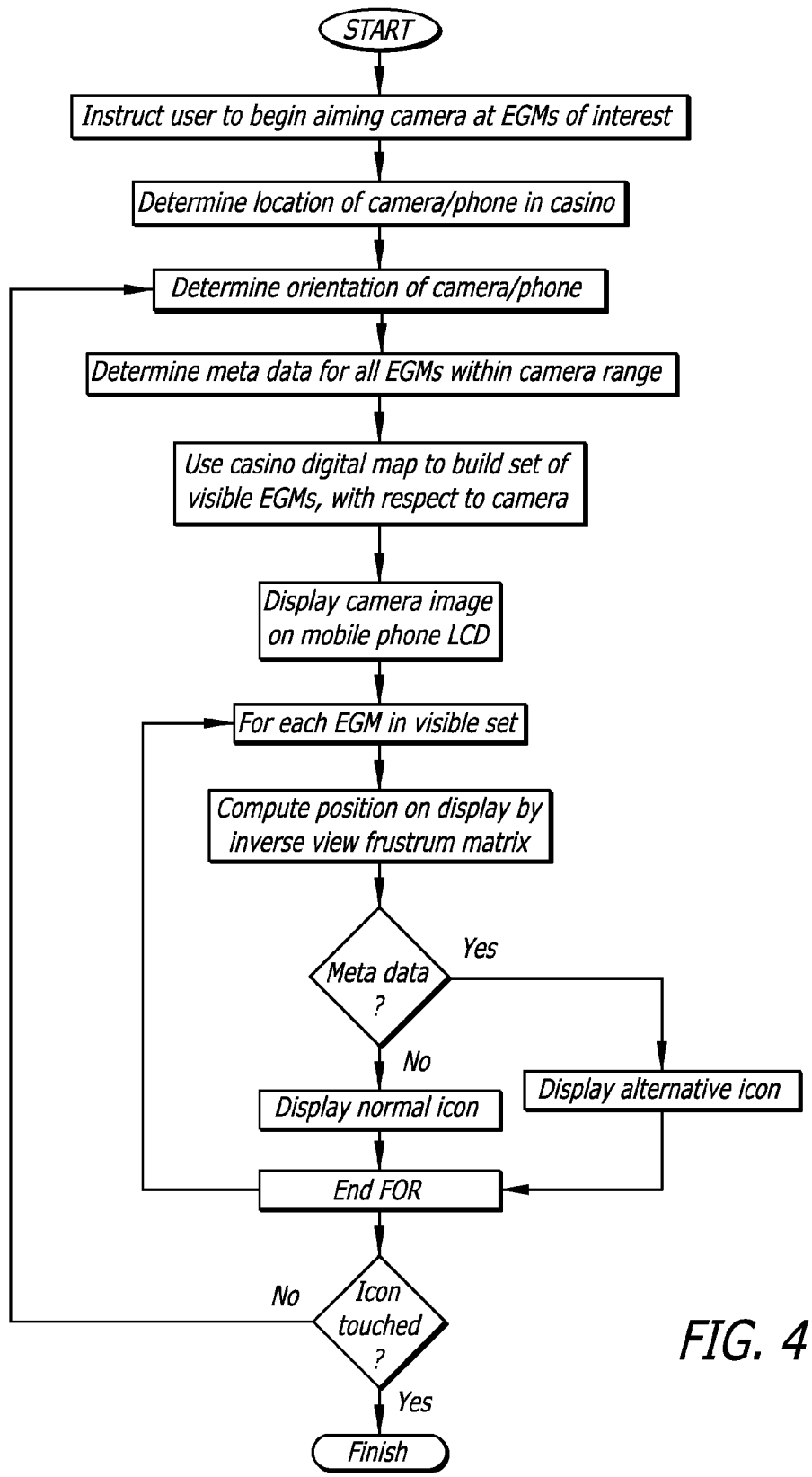
FIG. 4 illustrates a logic flow diagram of a process to build an augmented display.

The basic operation of one embodiment of a gaming system that includes augmented reality viewing capabilities is shown in FIG. 4. A player installs an augmented reality venue application on his phone, and activates the application when he enters the venue. Preferably, the application may be automatically activated by a Bluetooth or wireless message that is received by the phone when it passes through a portal such as a casino entrance. Alternatively, the application may be automatically activated by a "locale" condition programmed into the smart phone, tied to the venue's GPS location. In the simplest implementation, the application is manually activated by the player.

Once activated, the application of the gaming system having augmented reality viewing capabilities begins to control the inbuilt primary camera of the smart phone. In one such embodiment, a message is displayed on the smart phone display asking the user to aim the camera at gaming machines or other objects of interest in the venue.

Once aimed, the augmented reality application determines the location of the phone, by means such as GPS, Bluetooth, or cell tower triangulation. In another embodiment, the augmented reality application determines the location of the phone by analysis of the image being captured by the camera. In this regard, physical reference points may be placed in the casino for the camera to find. Next, the orientation of the phone is determined. This may be accomplished by accessing the internal digital gyroscope embedded within the smart phone.

Once the location/orientation of the smart phone is known, the objects of interest (such as gaming machines) that may be seen by the smart phone's camera may be computed. This may be achieved by placing the camera position/orientation within a virtual 3D representation of the venue. This virtual representation may be built up offline by parsing the Business Intelligence System table of position/orientations of gaming machines and other objects. From time to time, this representation may be updated to take into account the moving of gaming machines and signage around the venue.

In one embodiment of the gaming system having augmented reality viewing capabilities, a list of gaming machines and other objects currently visible to the camera are built up. For each object visible, a virtual position on the smart phone display may be derived by performing an inverse projection matrix on the co-ordinates of the gaming machine. The camera captured image is rendered on the smart phone display, and an icon is overlaid on the image for each visible object. An example of this output is shown in FIG. 5.

Figure 5:
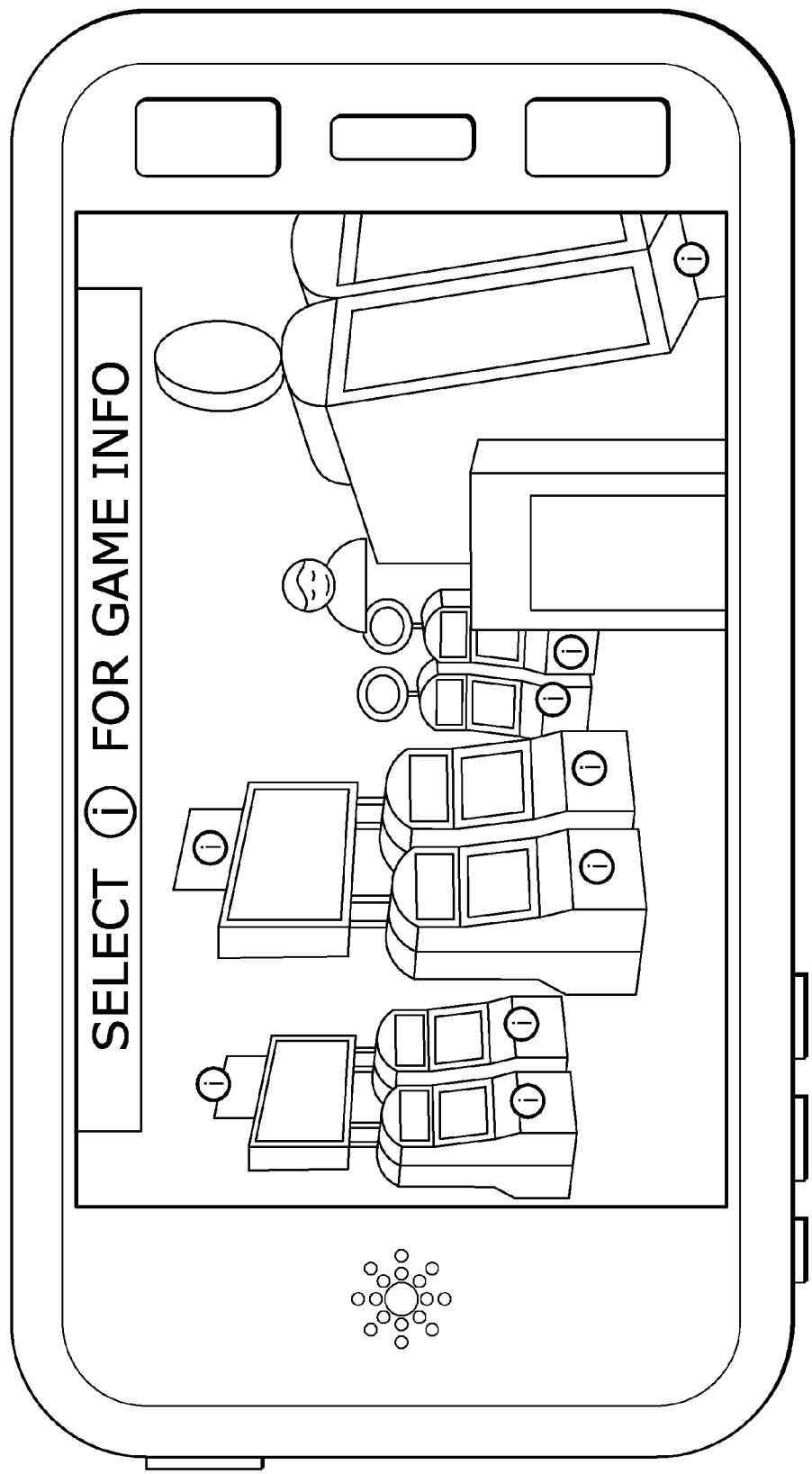
FIG. 5 illustrates a smart phone that is displaying an example output from an augmented reality venue mobile application.

As shown in FIG. 5, in another aspect of the gaming system having augmented reality viewing capabilities, some different types of icons may be shown depending upon the type of object or some meta-data associated with an object. In the example shown in FIG. 5, a standard gaming machine is shown with a green icon, a gaming machine that is being played (and thus unavailable) is shown with a blue icon, and the gaming machine with the highest payout over a recent period of time (i.e. the 'hottest' gaming machine) is shown with a red icon.

Another type of icon shown in the embodiment of FIG. 5 is a user icon. This user icon represents another player, such as a player that the current user has an affinity with (e.g., a spouse or relative). In some embodiments of the gaming system having augmented reality viewing capabilities, the player may register affinities in the CMS or via the augmented reality venue application. By employing such an embodiment, the player is able to find their spouse by simply panning their camera around until the user icon is straight ahead.

Notably, icons such as the user icon need not represent an object directly visible by the player. In some embodiments of the augmented reality venue system, signage and banks of gaming machines may be between the player and their spouse, but do not affect the operation of this system.

Figure 6:
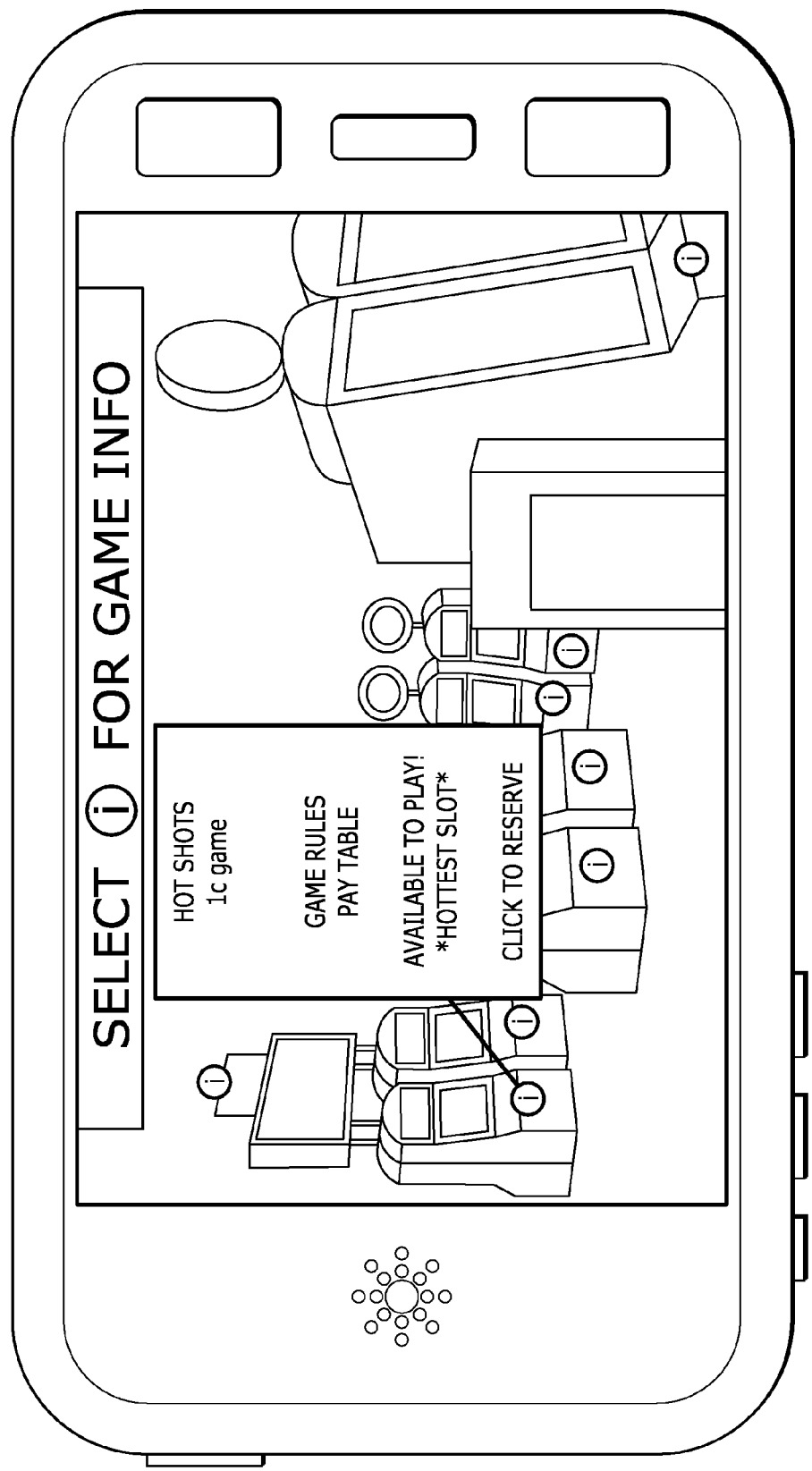
FIG. 6 illustrates a smart phone that is displaying an example output from an augmented reality venue mobile application with a game highlighted.

As shown in FIG. 6, once an icon is shown, the player may touch the touchscreen on their smart phone at the location of the icon to bring up information about the object in question. FIG. 6 shows an example of such information. In this example, the user has selected the red icon near a 'Hot Shots' game on the image displayed on his phone. This selection causes a pop-up window with information about the game, including the detail that this is the 'Hottest Slot' by some measure (e.g., perhaps this gaming machine has paid out the most money over the last 24 hours).

In some embodiments, the pop-up window also lets the player know that this gaming machine is available to play, which might not be apparent if there are any obstructions between the gaming machine and the user. In one such embodiment, this availability information is obtained by the back-end systems by querying the CMS to see if any credits or player tracking card are inserted.

Figure 7:
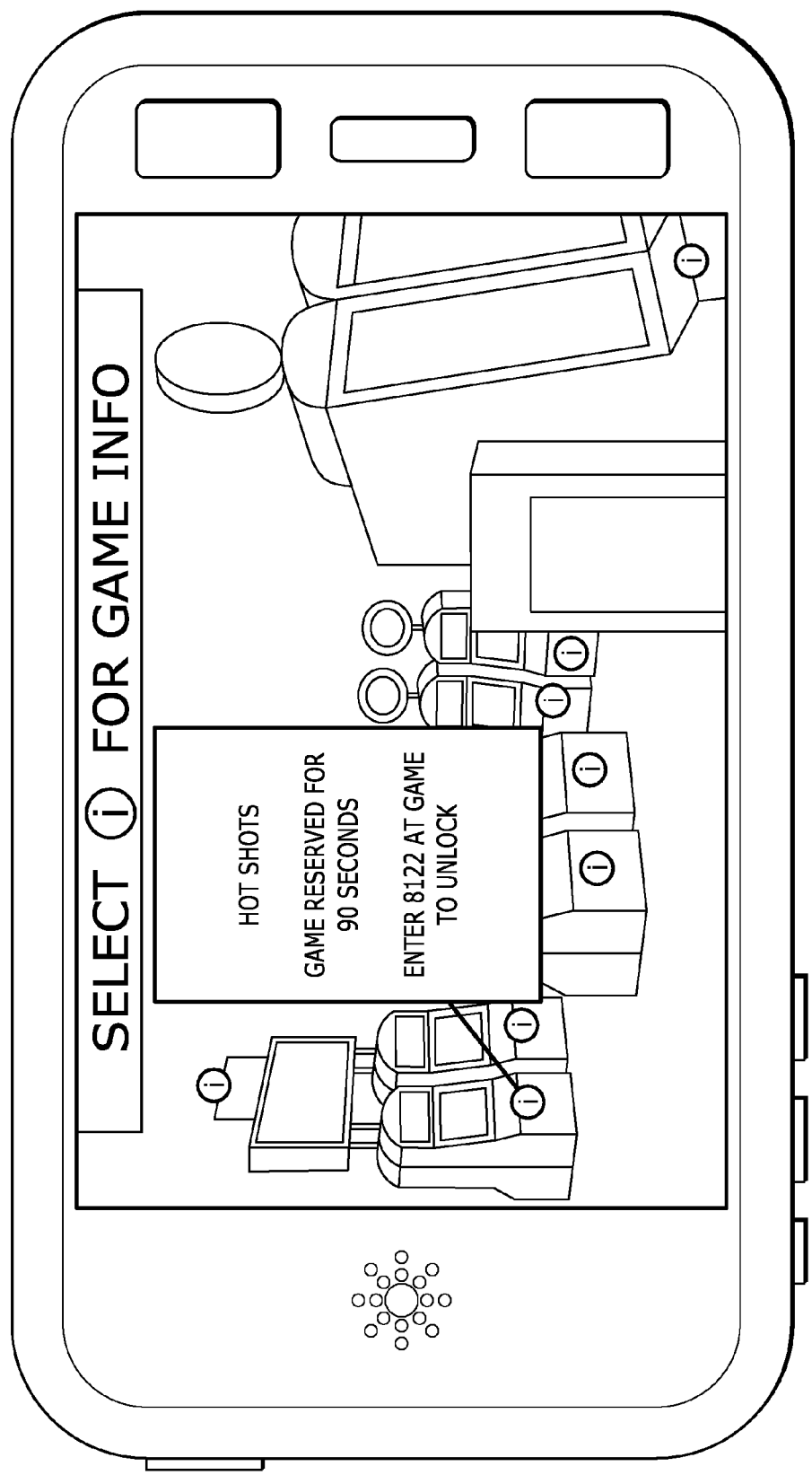
FIG. 7 illustrates a smart phone that is displaying an example output from an augmented reality venue mobile application with a game reserved with a Personal Identification Number.

Referring now of FIG. 7, in another aspect of a gaming system having augmented reality viewing capabilities, the pop-up window also enables a player to "reserve" a gaming machine. Reserving gaming machines is popular in some markets, and this novel feature extends the reserving feature. If a player chooses to reserve the gaming machine by selecting the button on their smart phone, a message is sent up from the phone to the back-end system, and onto the CMS to reserve the gaming machine. Preferably, the CMS generates a PIN and transmits this PIN to the gaming machine and back to the phone. This PIN is displayed on the phone, as shown in FIG. 7. The gaming machine then locks up for a period of time to give the player time to walk over. When the player reaches the gaming machine, he or she enters the matching PIN and the game is unlocked. Once the time limit is reached, the gaming machine automatically unlocks to prevent the gaming machine from being held out-of-service.

Figure 8:
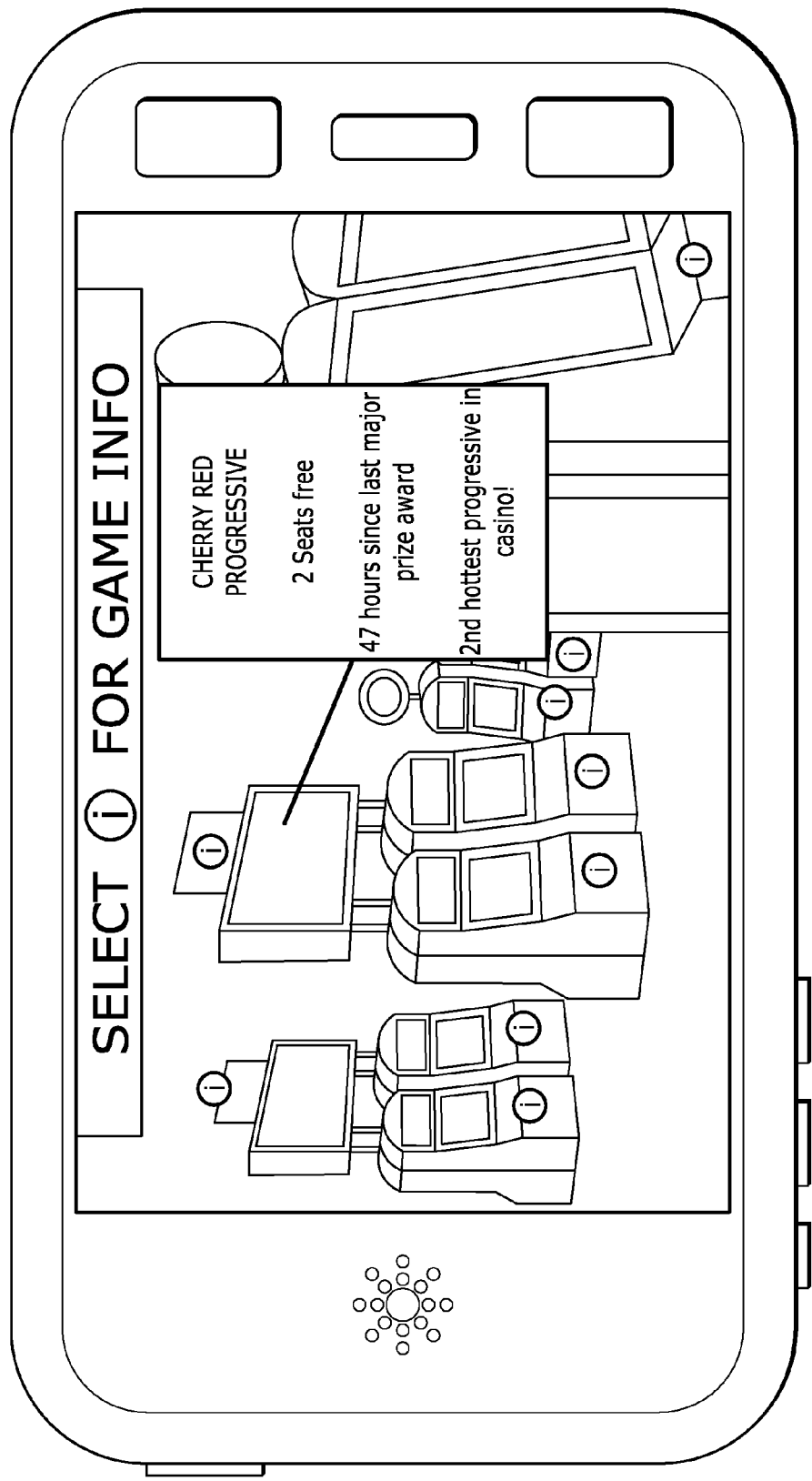
FIG. 8 illustrates a smart phone that is displaying an example output from an augmented reality venue mobile application with signage highlighted.

Referring now to FIG. 8, an embodiment of a gaming system having augmented reality viewing capabilities is shown in which a user has selected an augmented reality venue with the signage highlighted. This type of reservation may be restricted to users of a certain standing; for example, "Platinum Level" players, to ensure they have priority for popular games.

Figure 9:
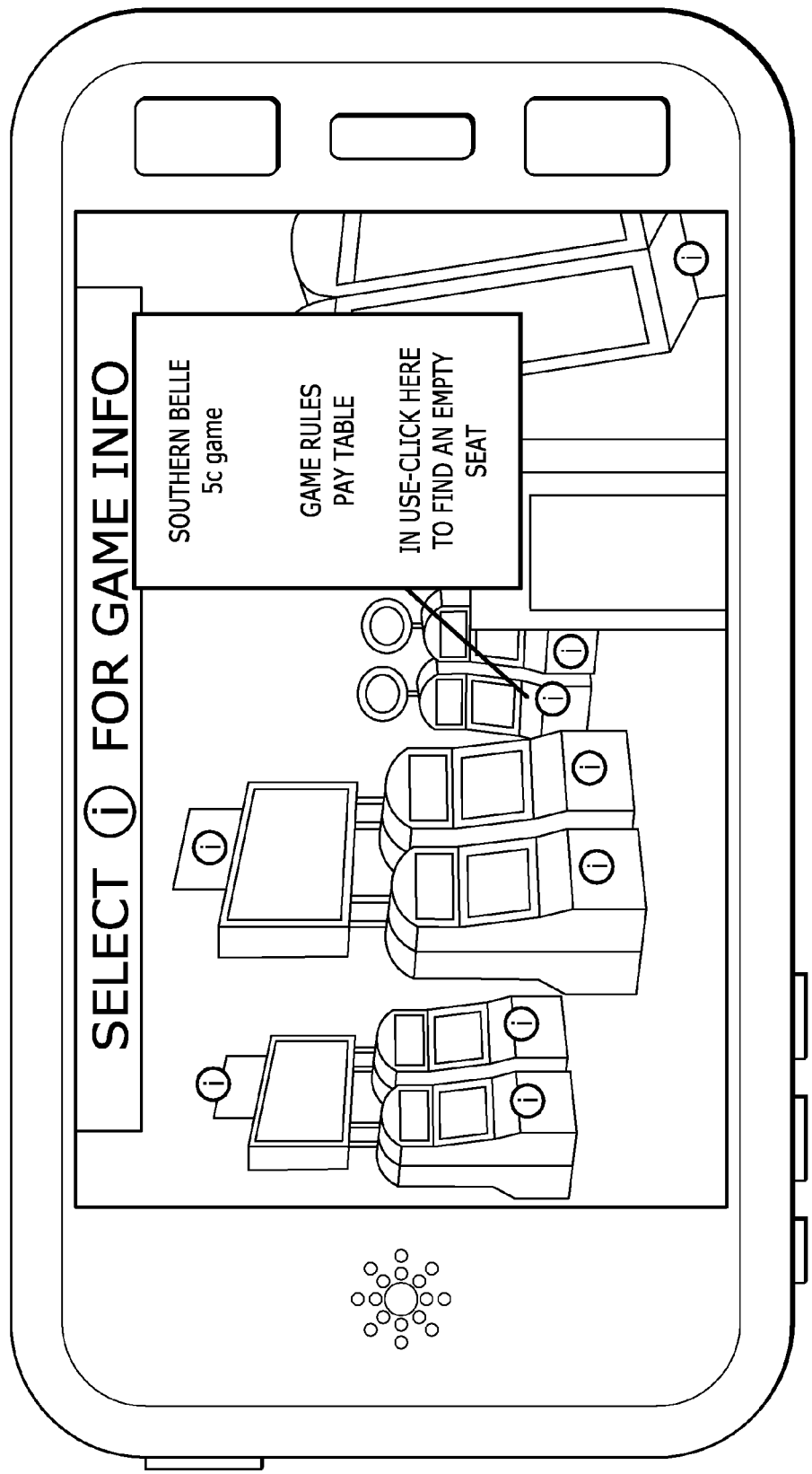
FIG. 9 illustrates a smart phone that is displaying an example output from an augmented reality venue mobile application with an "in-use" game highlighted.

FIG. 9 is an embodiment of a gaming system having augmented reality viewing capabilities in which a user has selected a game that is currently in use by another player. In this scenario, the user is offered the choice of finding another game of the same type elsewhere in the venue. In some embodiments, this action is performed by the backend querying the CMS as to other games with identical themes, and filtering this list by only matching gaming machines where credits are zero and no player tracking card is inserted.

Once the list is formed, the list is sorted by distance from the user based upon the gaming machine location table in the Business Intelligence System. The nearest gaming machine matching is then presented on the screen, if it is visible, by a vertical arrow icon pointing at the gaming machine. In some embodiments the arrow icon is flashing. In another aspect of one embodiment, if the nearest matching gaming machine is off of the screen, a horizontal arrow is displayed that indicates which way the player should rotate themselves to bring the matching gaming machine into view. As the player rotates himself, holding the phone in front of him, the arrow position is updated, and eventually replaced by a vertical arrow pointing directly at the gaming machine.

In one embodiment of a gaming system having augmented reality viewing capabilities, "Platinum" players (or other selected players) are presented with another option when all gaming machines of a particular type are in use, or the player has a particular favorite machine. These players may be given the option to "pre-reserve" a gaming machine or game, such that they will be informed by the augmented reality application the moment that their game, or favorite machine, becomes free. At this point, the gaming machine in question will be reserved for a period of time, using the PIN method described above.

Figure 10:
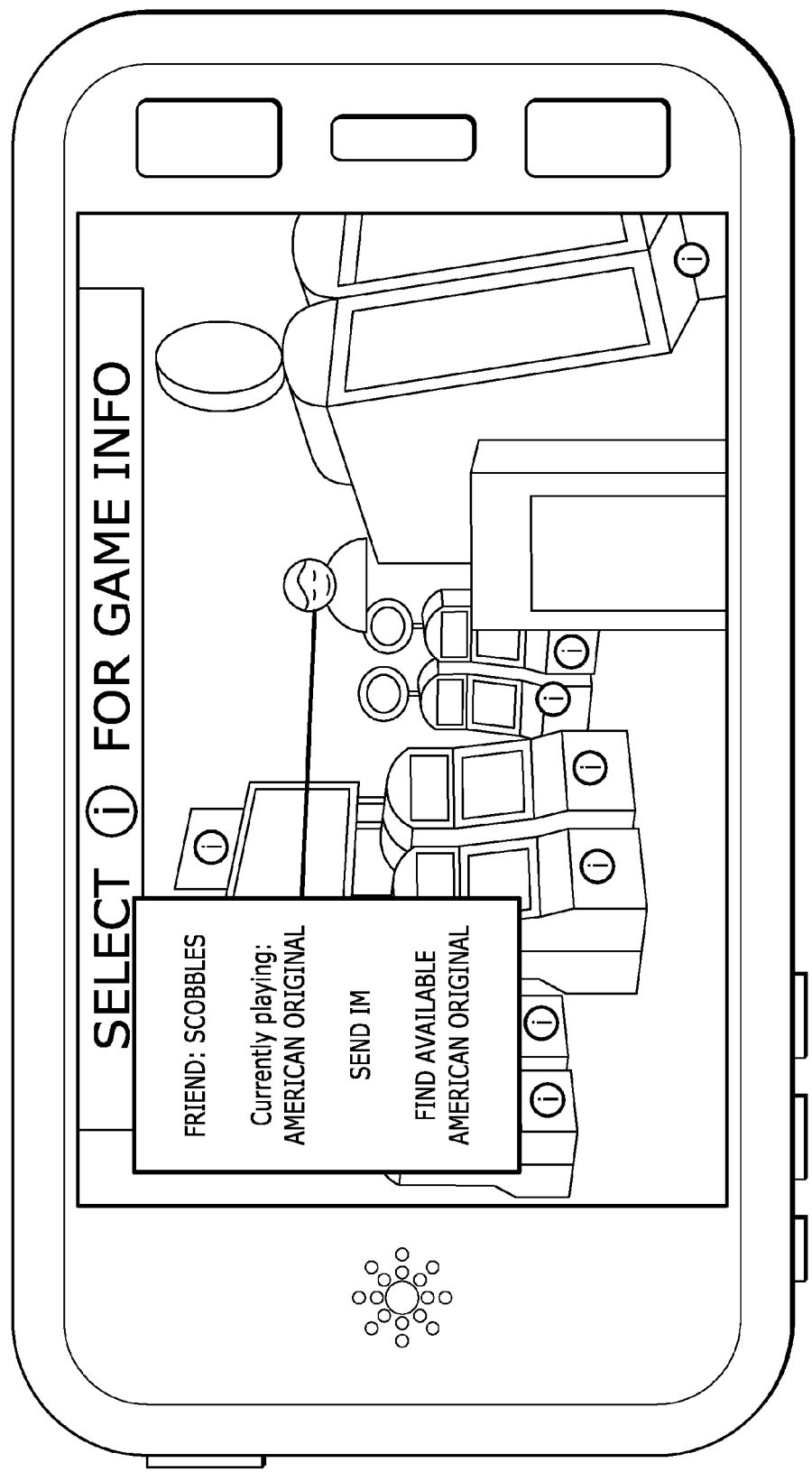
FIG. 10 illustrates a smart phone that is displaying an example output from an augmented reality venue mobile application with a user highlighted.

Referring now to FIG. 10, an embodiment of a gaming system having augmented reality viewing capabilities shows yet another feature. As mentioned above, players may register affinities to other players. In this example, as well as being able to find their friends or spouse, the player may choose to find the same game (at a different gaming machine) they are playing, or possibly sending an instant message (IM) to their friend to be displayed on the friend's gaming machine. In the case of community games, the "Find Available" option may also allow a player to find a free seat in the same community game as their friend.

Some preferred implementations of the disclosed embodiments use (1) a smart phone for the client that has a GPS or other positioning system, as well as a gyroscope for accurate orientation detection, (2) any suitable web server for communication with the smart phone and registration of players, and (3) OpenCV image analysis software. Additionally, some embodiments provide features that include, by way of example only: (1) enabling players to quickly find objects of interest, (2) increasing casino revenue by helping players find their favorite games quicker, (3) enabling players to reserve games from their phone, (4) leveraging technology that players already have, and (5) utilizing a system that is inexpensive to deploy, since it does not require any new infrastructure. In other aspects, some embodiments provide: (1) the use of the phone as a way of finding objects in a casino, (2) the ability to reserve games from the phone, and unlock the games with a PIN, (3) notification when games become available, and (4) the ability to find other players, and the games that they are playing.

In another aspect of some embodiments, gaming systems are utilized that include augmented reality gaming capabilities 1100. In such embodiments of the disclosed gaming system, smart phones are utilized that include built-in object recognition technologies and OCR (Optical character recognition) techniques combined with location/orientation derivation to provide players in casinos with additional gaming options and opportunities. In one embodiment of a gaming system that includes augmented reality gaming capabilities 1100, such object recognition technologies and OCR capabilities are similar to those provided by Google's "Goggles" application.

Figure 11:
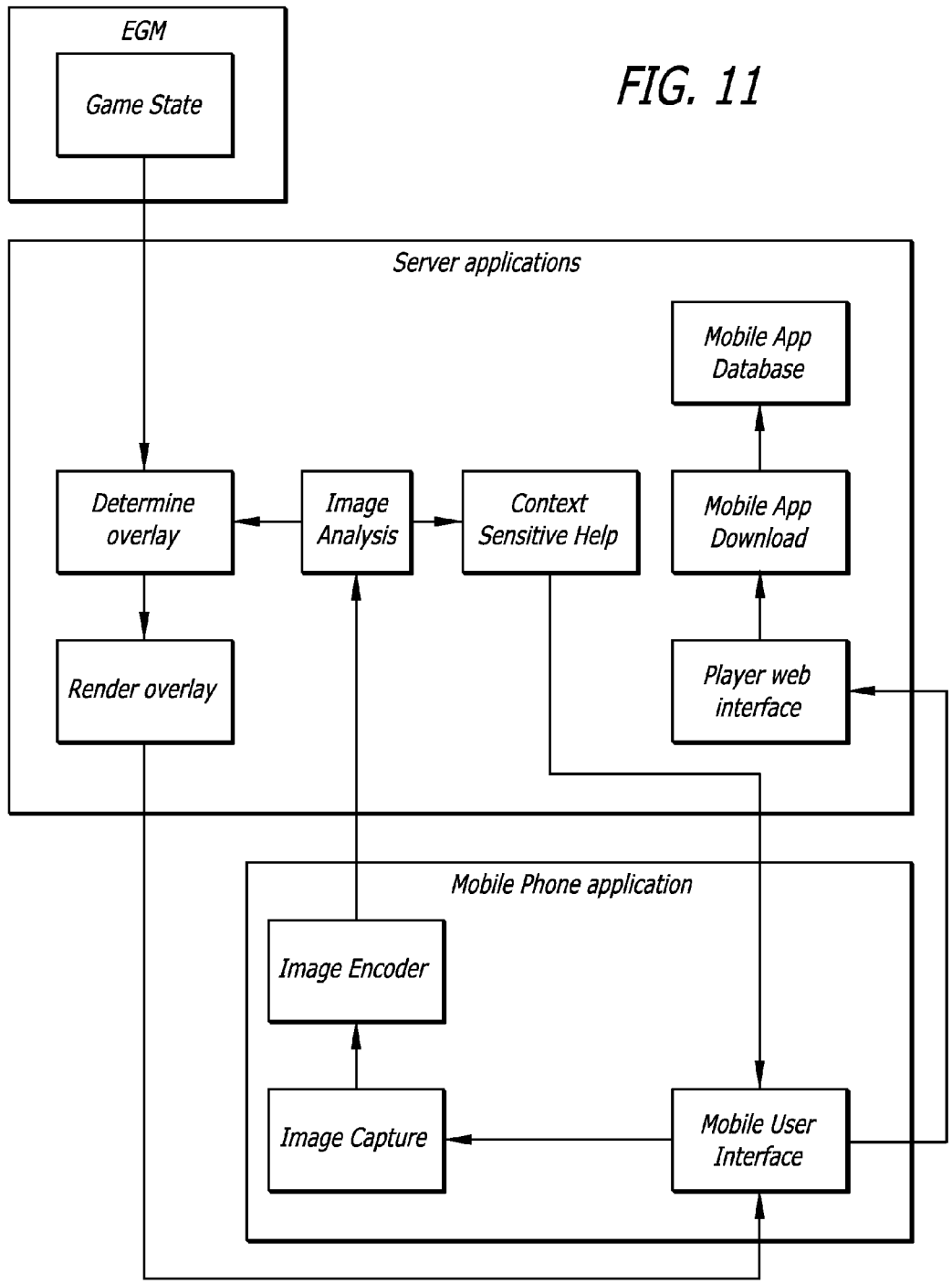
FIG. 11 illustrates a system overview of an augmented reality gaming system.

The overall arrangement of the modules that make up an embodiment of a gaming system that includes augmented reality gaming capabilities 1100 may be seen in FIG. 11. In some embodiments, the gaming system having augmented reality gaming capabilities 1100 consists of an augmented reality gaming application loaded onto a camera-enabled mobile smart phone, a back-end system for assisting the application, and in some scenarios, additional software modules as part of the gaming machine software.

Figure 24:
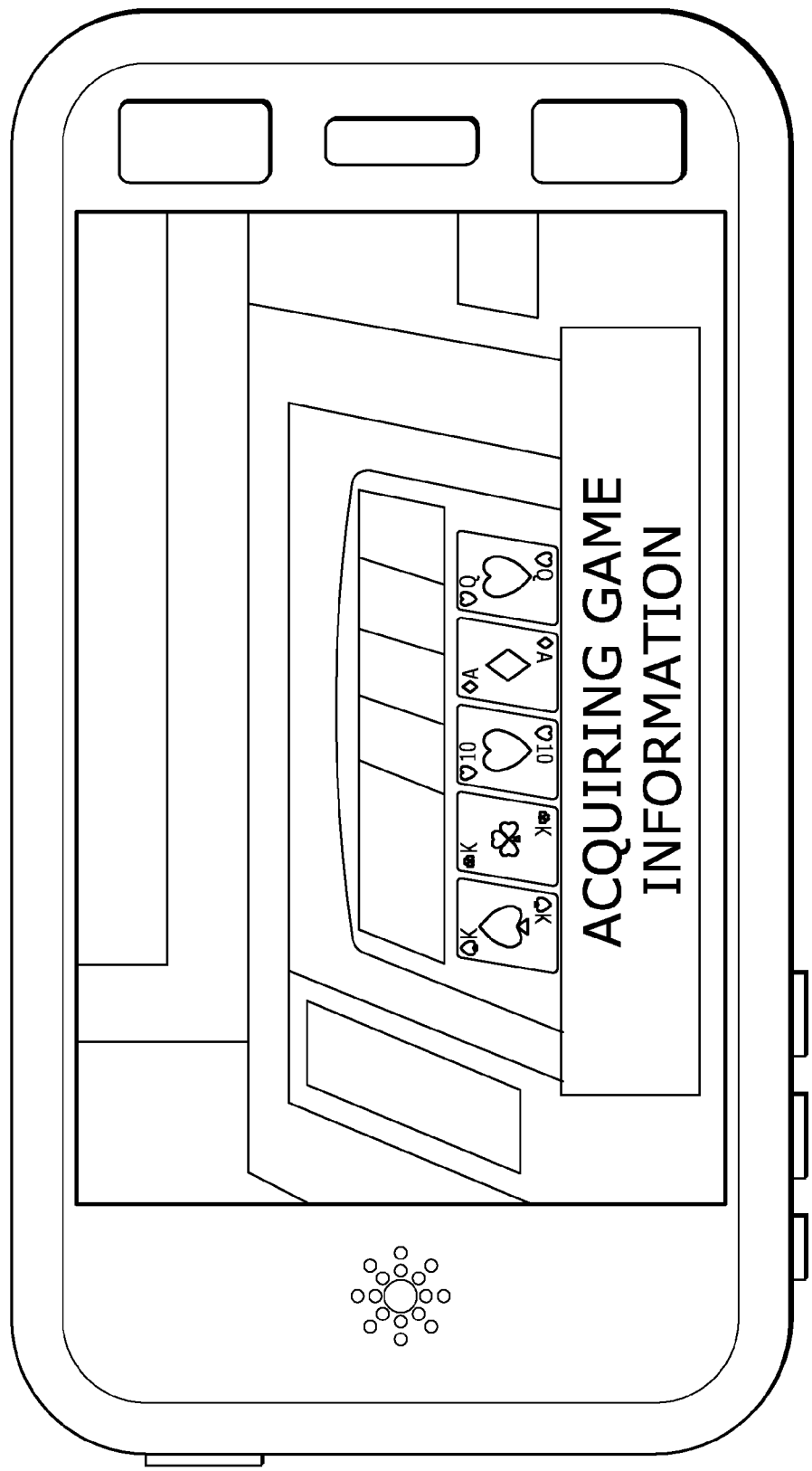
FIG. 24 illustrates a smart phone that is displaying a game application menu of an example video poker acquisition and decoding.

In one implementation of a gaming system that includes augmented reality gaming capabilities 1100, the gaming process proceeds in the following manner. A player approaches a game machine to play a game (e.g., Joker Poker). Joker Poker is a video poker game in which a player makes a decision about which cards to hold or draw. During the game, the player may reach a point where the player is unsure of the correct strategy with which to proceed. When this point of uncertainty occurs, the player may take out his mobile phone and select the augmented reality gaming assistance application. Next, the player is prompted to point his smart phone's camera to the gaming machine screen. Once the camera is aimed at the screen, the player presses the camera shutter button, and an image is captured (as seen in FIG. 24).

The augmented reality gaming assistance application transmits the image to the backend server via a 3G (third generation) or GPRS (General Packet Radio Service) encrypted SSL (secure socket layer) session to a public web service and awaits a response. The backend server, using object recognition and OCR technology determines the following from analyzing the image: (1) the paytable of the game, and thus, the game title; (2) the current game state; and (3) the player's credit/bet information. From the first two of these items, all possible strategies are determined by the system. This information, along with the game name and state, is transmitted back to the augmented reality gaming assistance application on the mobile phone over the 3G connection.

Figure 25:
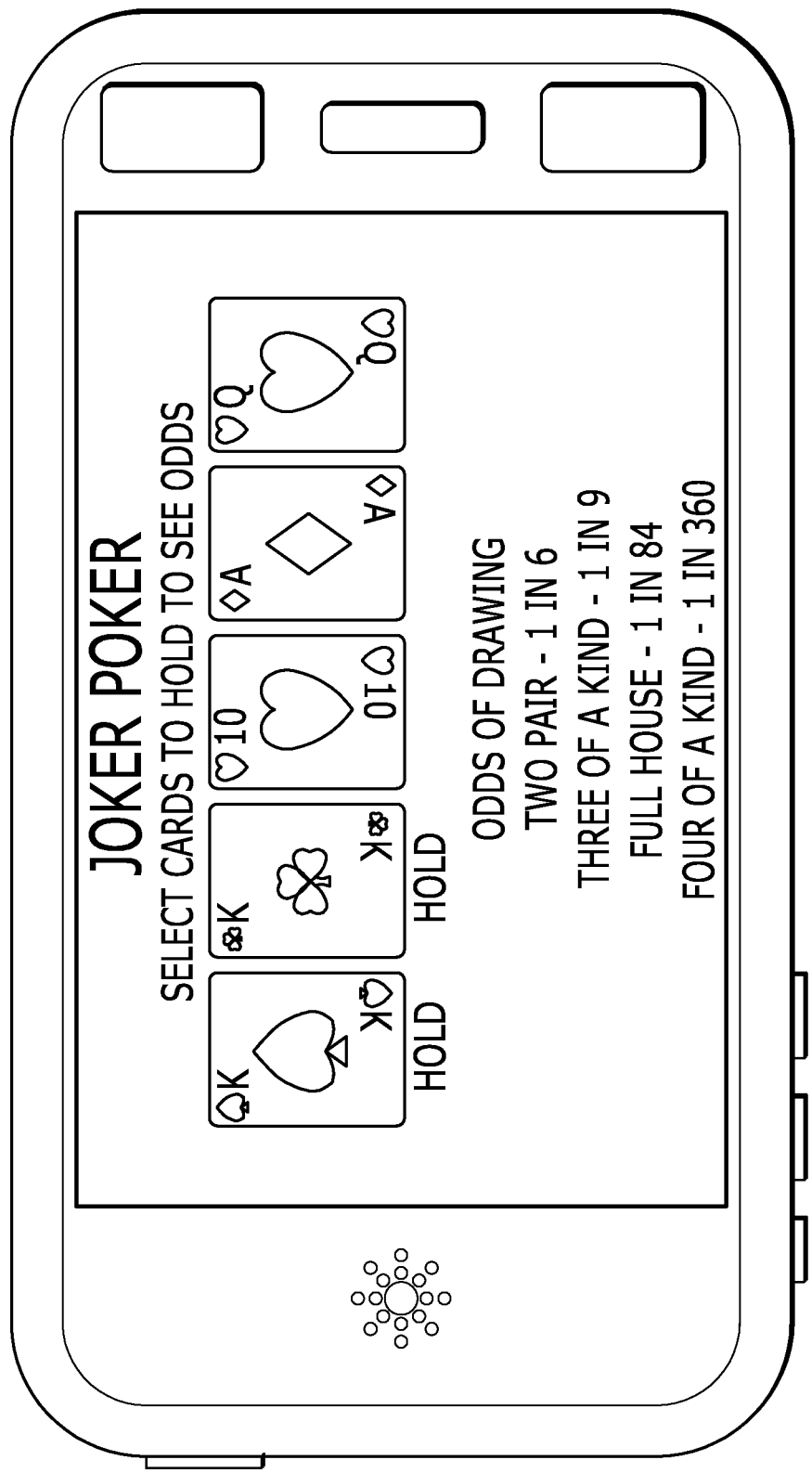
FIG. 25 illustrates a smart phone that is displaying a game application menu of an example video poker analysis presentation.

In one embodiment, the augmented reality gaming assistance application may present the information to the player in a number of ways, as shown in FIG. 25. In the example of FIG. 25, the theoretical best choice for the player is presented for the game of Joker Poker, along with information concerning the possible outcomes to the game. Notably, the player is free to experiment on the assistance application of the player's smart phone, selecting and de-selecting potential cards to hold. During this process, the odds are presented below the cards, as the cards are being updated to reflect the current scenario (e.g., after each selection/de-selection).

While the augmented reality gaming assistance application is clearly useful for beginner players, the application is also useful for more expert players by taking into account progressive jackpots which may cause strategy to vary depending upon the current progressive amount. Furthermore, the augmented reality gaming assistance application provides additional benefits whenever variables are added to games, such as a wild card, or when more complex odds are associated with the outcome of a game.

In some embodiments of the gaming system having augmented reality gaming capabilities 1100, once the game title is determined, other information can also be made available by the phone application. For example, links to tutorials, discussion forums and social networking sites specific to the game may be offered. Such tutorials may take into account the current state of the game and offer context-sensitive help.

In other, more sophisticated, embodiments of the gaming system that include augmented reality gaming capabilities 1100, the gaming process proceeds in the following manner. While the video poker example presented above provides the content on the player's smart phone related to the game, these above-described embodiments do not augment the output of the gaming machine directly. However, in more sophisticated embodiments of the gaming system that include augmented reality gaming capabilities 1100, an augmented display captures the output from the gaming machine via the camera in the phone, and overlays virtual graphics on the smart phone's display that either (1) appear to be on the gaming machine display when viewed via the mobile phone, or (2) augment the gaming machine display with elements that indicate points of interest on the gaming machine.

Figure 12:
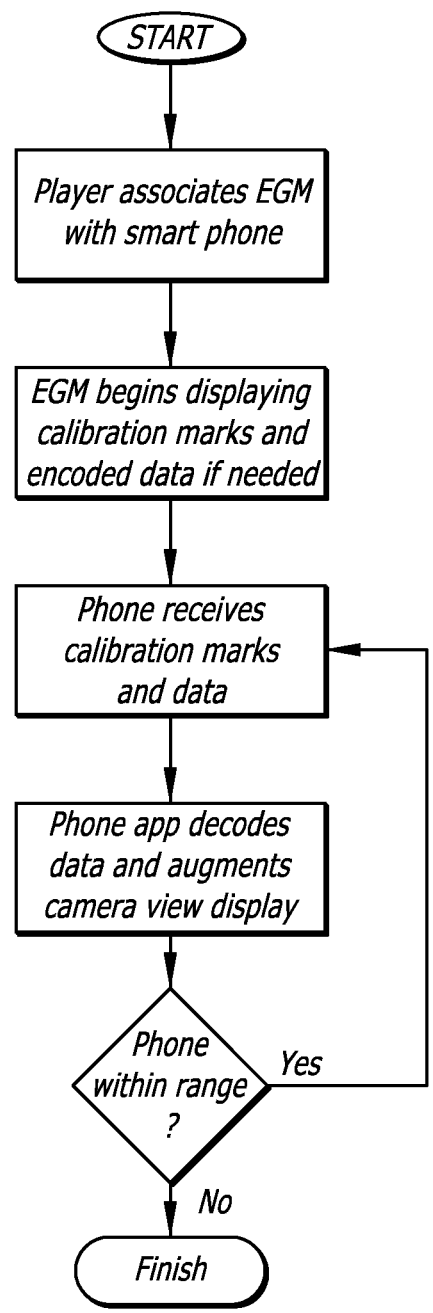
FIG. 12 illustrates a logic flow diagram of a process to provide a game on a smart phone.
Figure 15:
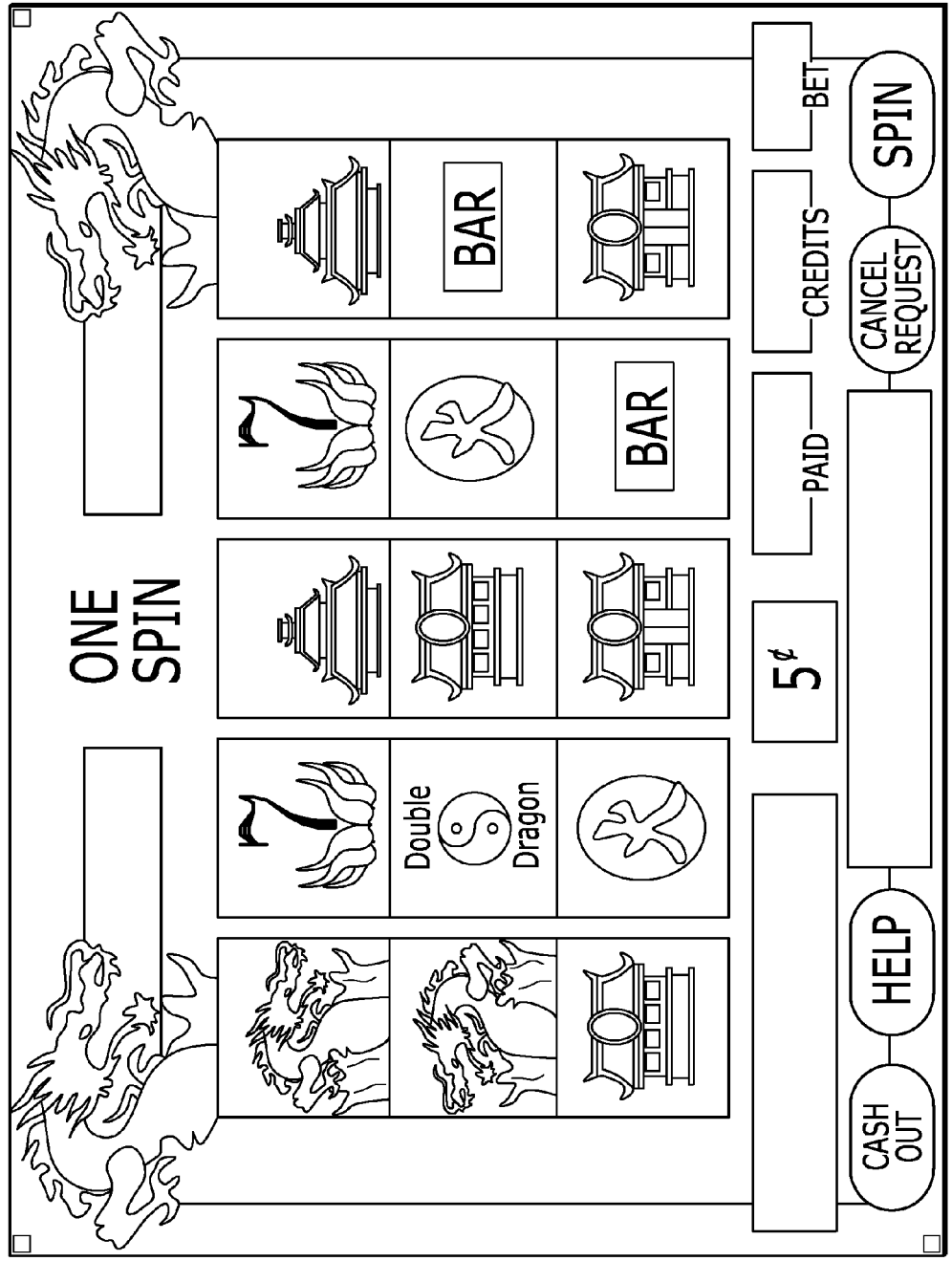
FIG. 15 illustrates an example gaming machine output with calibration and data marks enabled.
Figure 16:
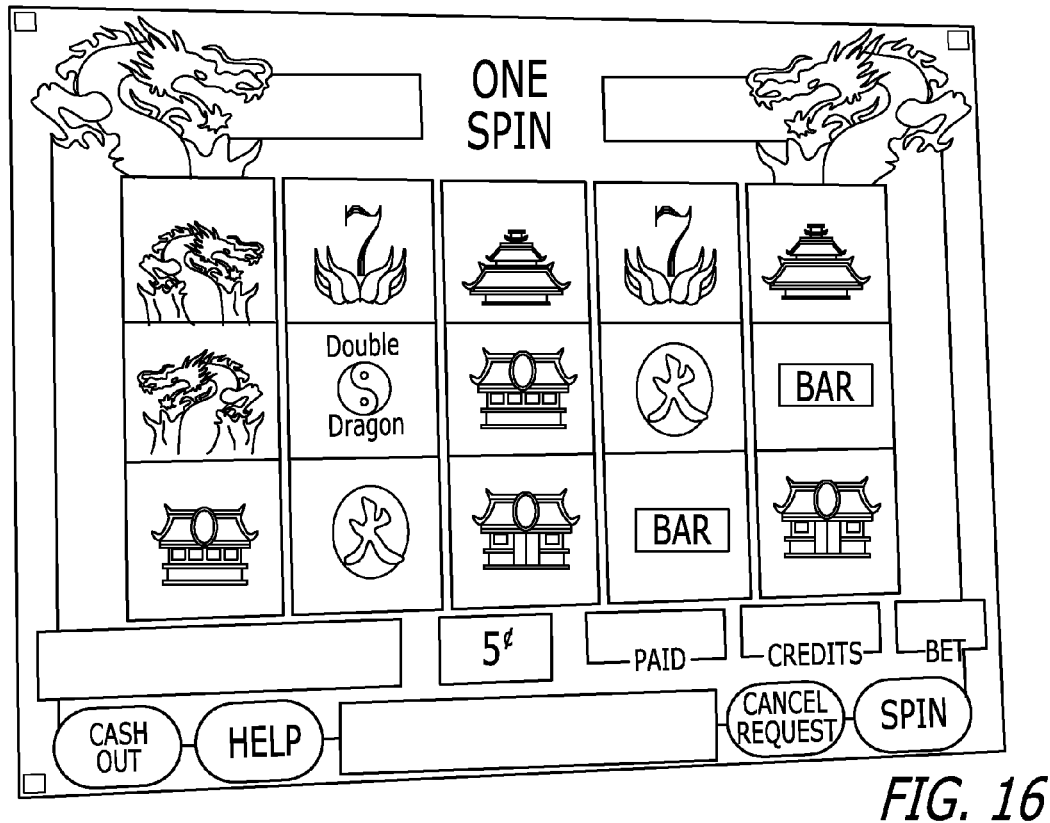
FIG. 16 illustrates an example gaming machine output from a smart phone's camera-perspective.

Referring now to FIG. 12, one embodiment of a gaming system having augmented reality gaming capabilities 1100 that illustrates how an augmented feature may be deployed is shown. Firstly, a player associates the gaming machine being played with the phone he is holding. This association may be accomplished in a number of ways, two of which are described below. In the first association technique, the gaming machine begins displaying calibration marks at the corner of the LCD display, or in other unobtrusive positions, once the augmented session has begun. An example of these calibration marks is shown in FIG. 15. Continuing, as the player holds the camera of the smart phone up in front of the gaming machine, the application-controlled camera captures the image of the gaming machine, including the game LCD output. Since it is unlikely that the player will be holding the camera directly parallel to the LCD, the image of the LCD will likely be slightly trapezoidal, as shown in FIG. 16.

Figure 17:
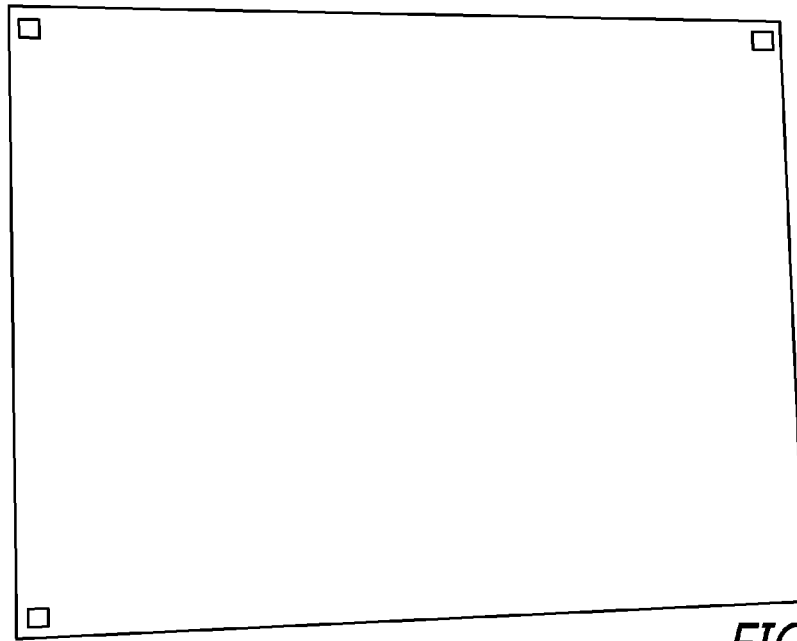
FIG. 17 illustrates calibration marks as extracted from image capture.

Referring now to FIG. 17, the object recognition system takes this image and extracts the calibration marks. In some embodiments, the object recognition system uses a standard object recognition algorithm. Notably, this amount of computation is well within the real-time capability of today's modern smart phone. If more advanced computational processing is required for some reason, the object recognition algorithm may be run by transmitting the image to the backend server, where the image may be processed. This is not the preferred solution due to the time taken to transmit the image would likely interfere with real-time overlay by producing significant lag. In a more preferred embodiment, once the calibration marks are decoded, the mobile phone application overlays images at suitable points on the camera-derived image. The techniques for achieving this image overlay are described above with respect to the gaming system having an augmented reality venue 300.

Figure 23:
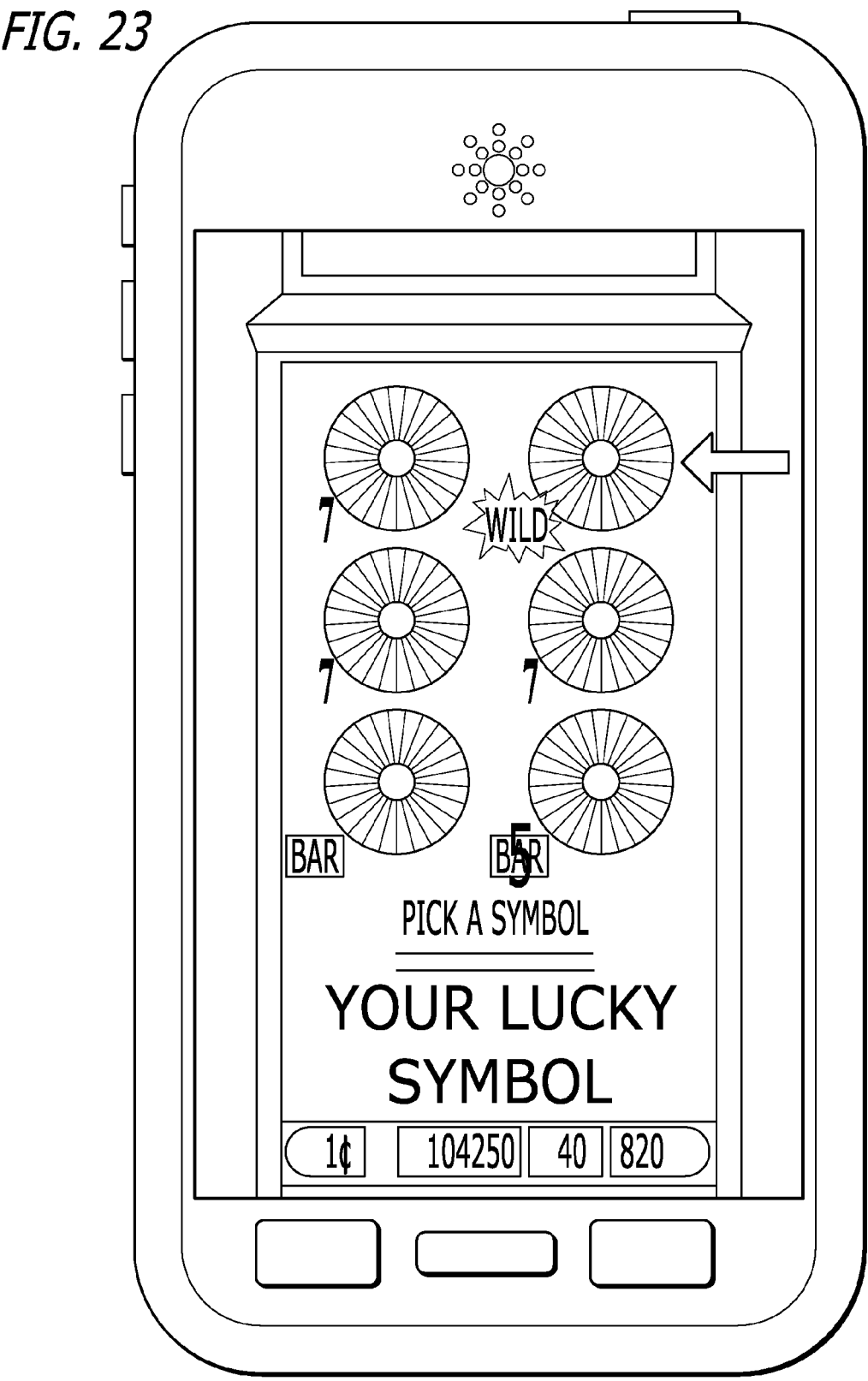
FIG. 23 illustrates a smart phone that is displaying a game application menu of an example strategy overlay.

Referring now to FIG. 23, an example of potential context-sensitive help being overlaid at the correct position on the camera image is shown. In such an embodiment of the gaming system having augmented reality gaming capabilities 1100, a player is assigned a "lucky" symbol for a feature. In some embodiments, the determination of this symbol is based upon past performance by the player of this game, past performance of the machine, a hashing algorithm based upon the player's name or telephone number, or combinations thereof. Continuing, when the player reaches the selection stage of the feature, the player uses the augmented reality application on his smart phone to take a photo or video and receive the image overlay, as shown in FIG. 23.

Referring now to FIG. 15, an embodiment of a gaming system having augmented reality gaming capabilities 1100 is shown that includes "data marks" in the captured image. These "data marks" may be displayed at similar locations to calibration marks, or ideally as in FIG. 15, they may be embedded within a suitable graphic. In the embodiment shown in FIG. 15, the data marks are the Dragon's eyes. In one aspect of a disclosed embodiment, a data mark performs by temporally varying the intensity of the pixel(s) that compose it. From the player's perspective, this varying of intensity appears as though the dragon's eyes are flickering. In contrast, an actual flicker typically requires an encoded stream of data. A simple implementation uses a high intensity pixel to indicate a binary 1, and a low intensity pixel to indicate a binary 0. In some embodiments, multiple data marks are used to increase data throughput.

By using calibration marks, the overall geometry of the game LCD is known with respect to the camera image. From this geometry, the expected position of the data marks may be derived. In some embodiments, the data marks are utilized as a one-way method of the game communicating with the augmented reality gaming application. In this manner, the data marks may be used for the following purposes: (1) The state of the game may be efficiently communicated (e.g., during free spins, the data marks may cause the phone to augment the display with extra graphical FX). (2) The game may provide "secret hints" to the player via their mobile phone with regard to choices to make during a game. Such features may be constructed such that the hints do not affect the overall hold over time, or simply decrease the hold by a known amount. In one embodiment, players may be targeted who have a consistent record of betting larger. (3) Game play statistics may be encrypted and sent via the data mark and augmented reality gaming application to a secure web service. These statistics may be collected by the manufacturer as an alternative means of collecting marketing data. Notably, in most embodiments, the phone application does not affect the outcome or operation of the underlying game since the communication is only one way.

In another embodiment of the gaming system having augmented reality gaming capabilities 1100, particular data marks provide a means for a gaming machine manufacturer to potentially track the deployment of games. Historically, there have been problems in some markets of games and machines being resold without the manufacturer's consent. This may potentially result in copy-protection methods being breached. Through the implementation of the disclosed gaming system, a manufacturer may make use of the location awareness of a modern smart phone, which then transmits the location of the phone along with data from the data mark, which is capable of uniquely identifying the gaming machine. If the location of the gaming machine is found to be incorrect based upon sales records, corrective action may be taken.

Figure 13:
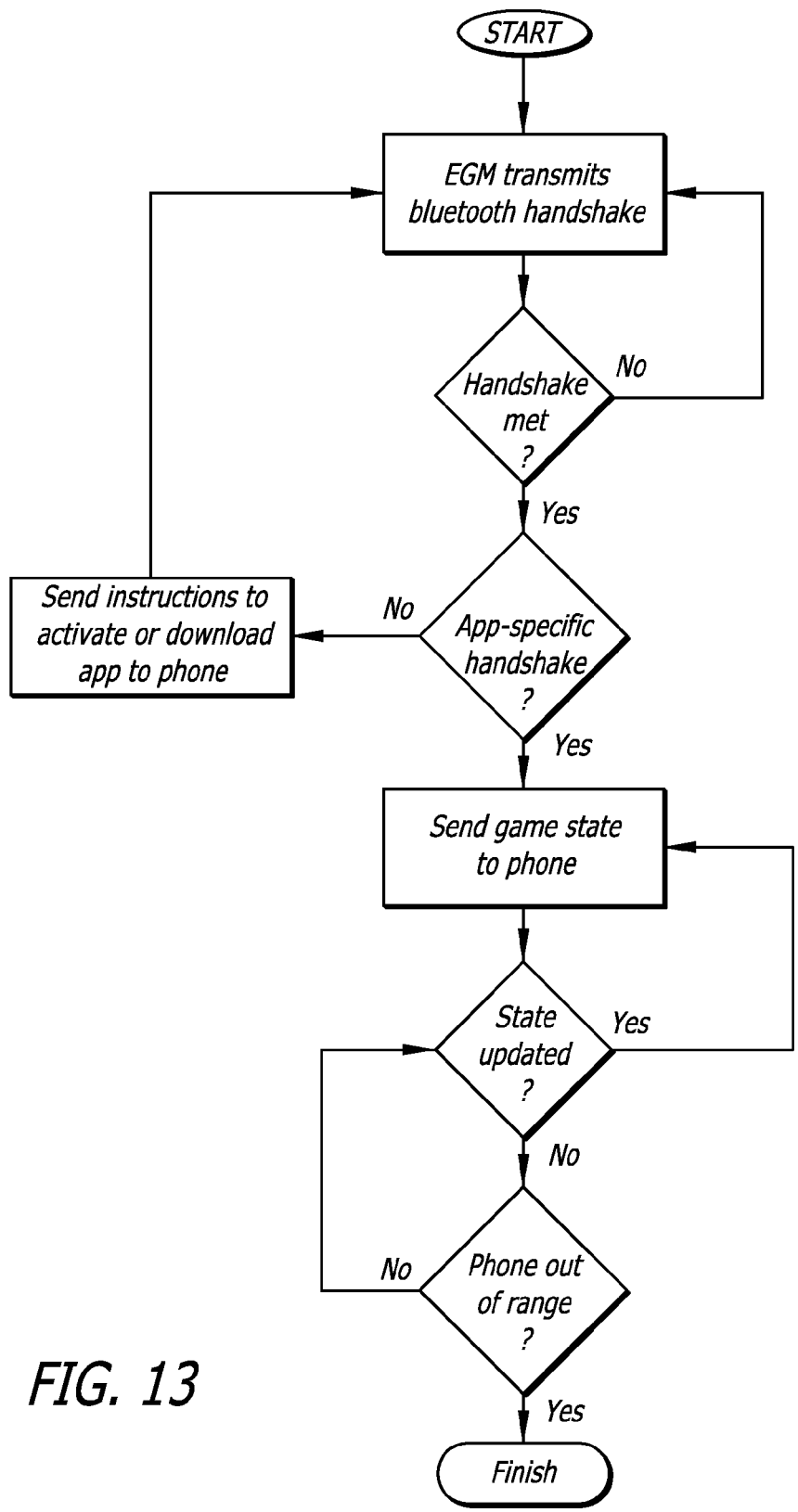
FIG. 13 illustrates a logic flow diagram of a process to begin an augmented session via bluetooth.

As noted above, there are a number of methods for establishing an augmented reality gaming session using an embodiment of the disclosed gaming system. As shown in FIG. 13, Bluetooth wireless technology may be used, by installing a Bluetooth radio in the gaming machine and leveraging the existing Bluetooth capabilities of a standard smart phone. In this manner, the selected gaming machine continually broadcasts to suitable Bluetooth devices using known Bluetooth discovery processes. When a handshake is made, the gaming machine determines if the handshake is from the augmented reality gaming application or from another source. If the handshake is from another source, the gaming machine sends a Bluetooth text message giving instructions on how to download the augmented reality gaming application.

Figure 18:
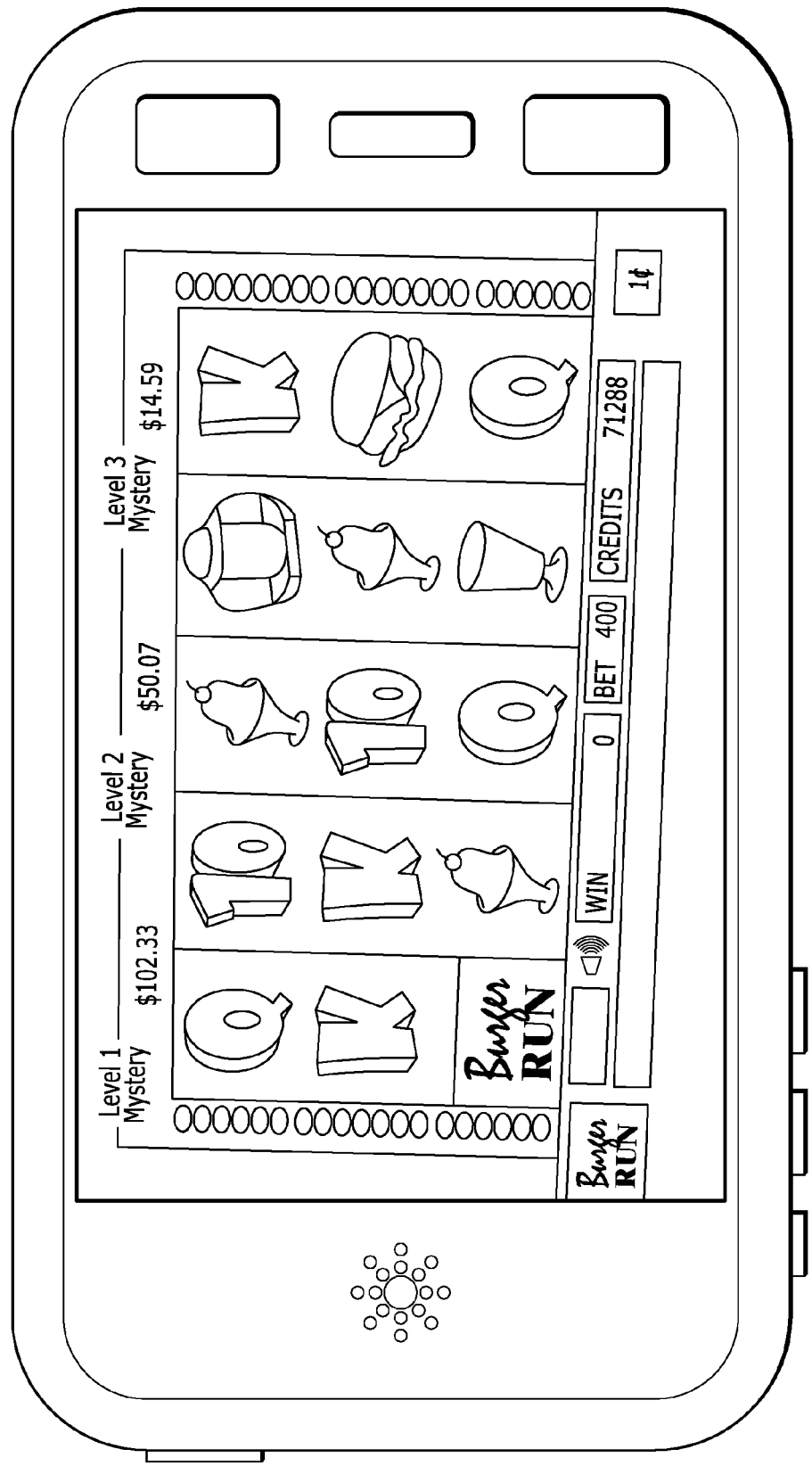
FIG. 18 illustrates an example image capture by the game application of "Burger Run."
Figure 19:
FIG. 19 illustrates a smart phone that is displaying a game application menu for "Burger Run."

Referring now to FIG. 18, once the gaming system is in communication with the augmented reality gaming application, the game information and state is sent to the application. This enables the augmented reality gaming application to display a menu such as shown in FIG. 19. In some embodiments, updated state information may be continually sent by Bluetooth rather than by the use of data marks or OCR throughout the session. This configuration provides the advantage of using Bluetooth. However, this benefit must be balanced against the potential downside of the communication being theoretically two-way, and thus, harder to be approved by certain gaming regulators.

Figure 14:
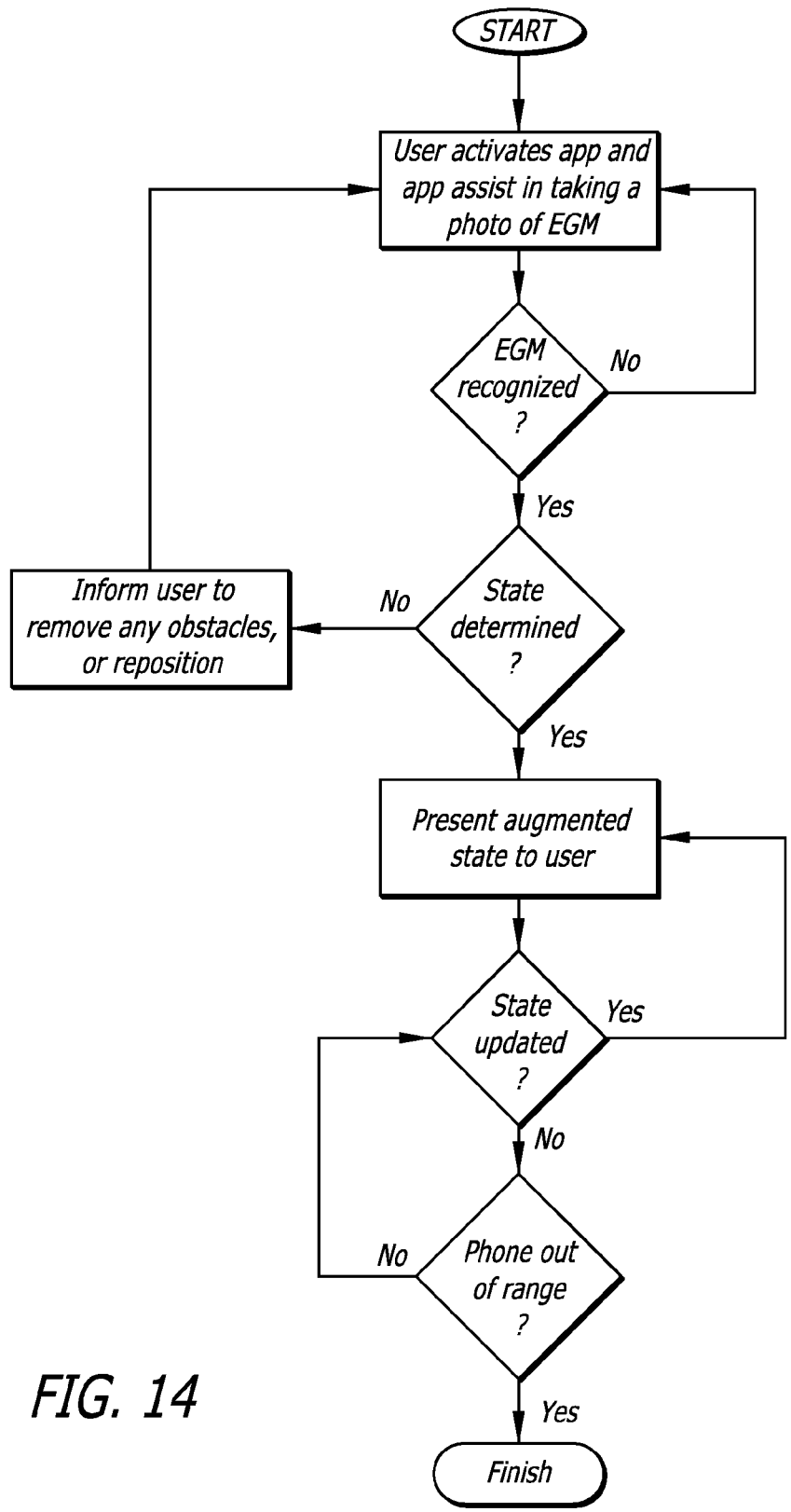
FIG. 14 illustrates a logic flow diagram of a process to begin an augmented session via image recognition.

As described in FIG. 14, an alternative to Bluetooth may be implemented using object recognition from a camera image. Specifically, in such an embodiment, the augmented reality gaming application which is loaded onto the player's smart phone, asks the user to take a photo of the gaming machine. Through the use of known object-recognition algorithms, the name of the game may be extracted. Further information may also be obtained by OCR analysis of the camera image. Specifically, the arrangement of symbols and the values of meters and other states are extracted from the camera image. Moreover, for marketing purposes, this data may be sent by the backend server or by the augmented reality gaming application via an SSL (secure socket layer) session to a secure manufacturer's web service.

Continuing in this embodiment, once the state of the game is known, an augmented state may be presented to the player via the display screen of the smart phone. For example, in some embodiments where a player is given the choice of three boxes to open, an arrow may appear on the mobile phone display pointing to the box that the player should favor. An example of an image capture from the process of FIG. 14 is shown in FIG. 18. In this embodiment, a player is playing a game called "Burger Run." Referring now to FIG. 19, a successful determination of the state results is shown in the content of the smart phone's display screen.

In this embodiment, the smart phone's display screen presents a number of features to the player, including, by way of example only, Game Rules, Games Like This, Progressive Info, Secret Strategy, and Download Application. The "Game Rules" feature includes a standard pay table, videos demonstrating the features present in the game, and other general information. Selecting the "Games Like This" feature presents a list of games that were similar to a previously-played game, based upon denomination, volatility, and/or other factors. The "Progressive Info" feature is described in further detail below. In some embodiments, the "Secret Strategy" feature refers a player to one or more social networking sites where players may debate and propose strategies for the current game. The "Secret Strategy" feature may also provide context-sensitive help that is overlaid at the correct position on the camera image as described above in FIG. 23, to give the player the feeling that he may have an edge on the game. The "Secret Strategy" feature may also present time-limited bonuses that are currently available at this gaming machine (e.g., Power Winners promotions that are currently near the location of the smart phone).

In another aspect of some embodiments, the "Download App" feature enables a player to download a "fun" version (i.e., non-gambling version) of the game onto their phone. Otherwise stated, in such an embodiment, the gaming system having augmented reality gaming capabilities 1100 enables players to simply take a photo of games they wish to have on their smart phone, and have them automatically downloaded for continued future use.

Figure 20:
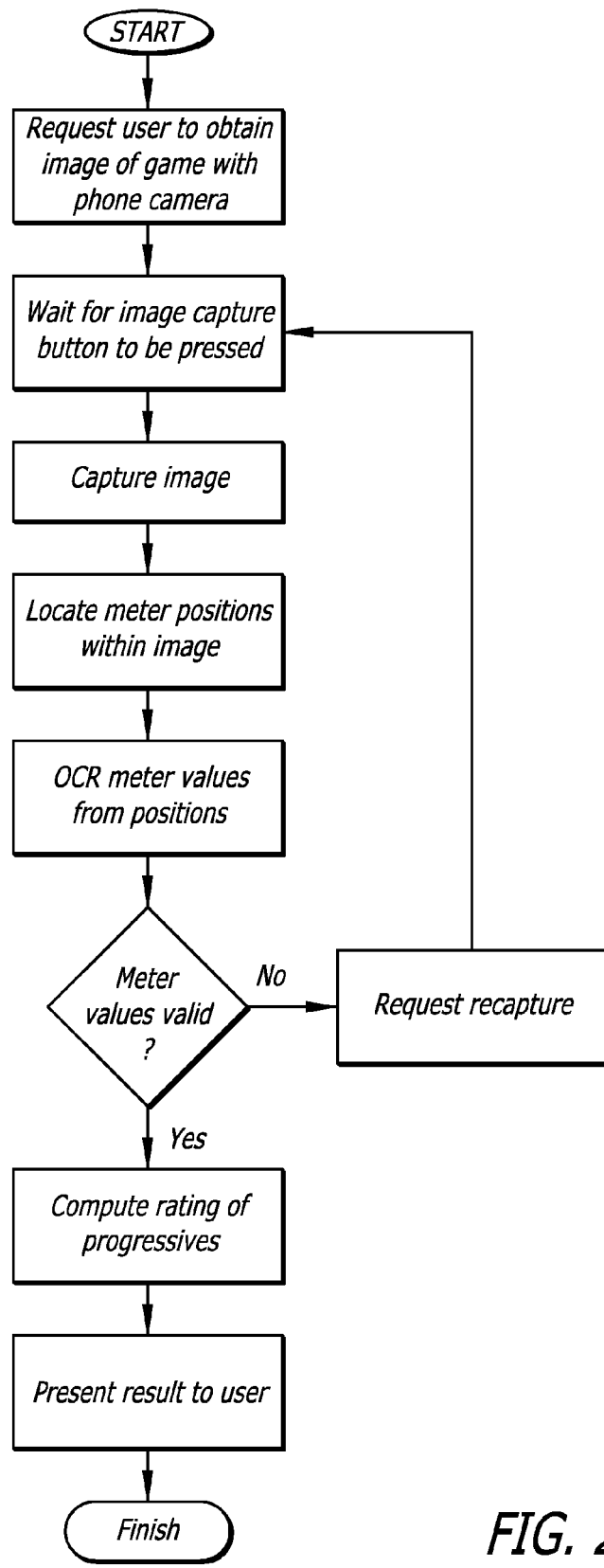
FIG. 20 illustrates a logic flow diagram of a process to present progressive ratings.
Figure 21:
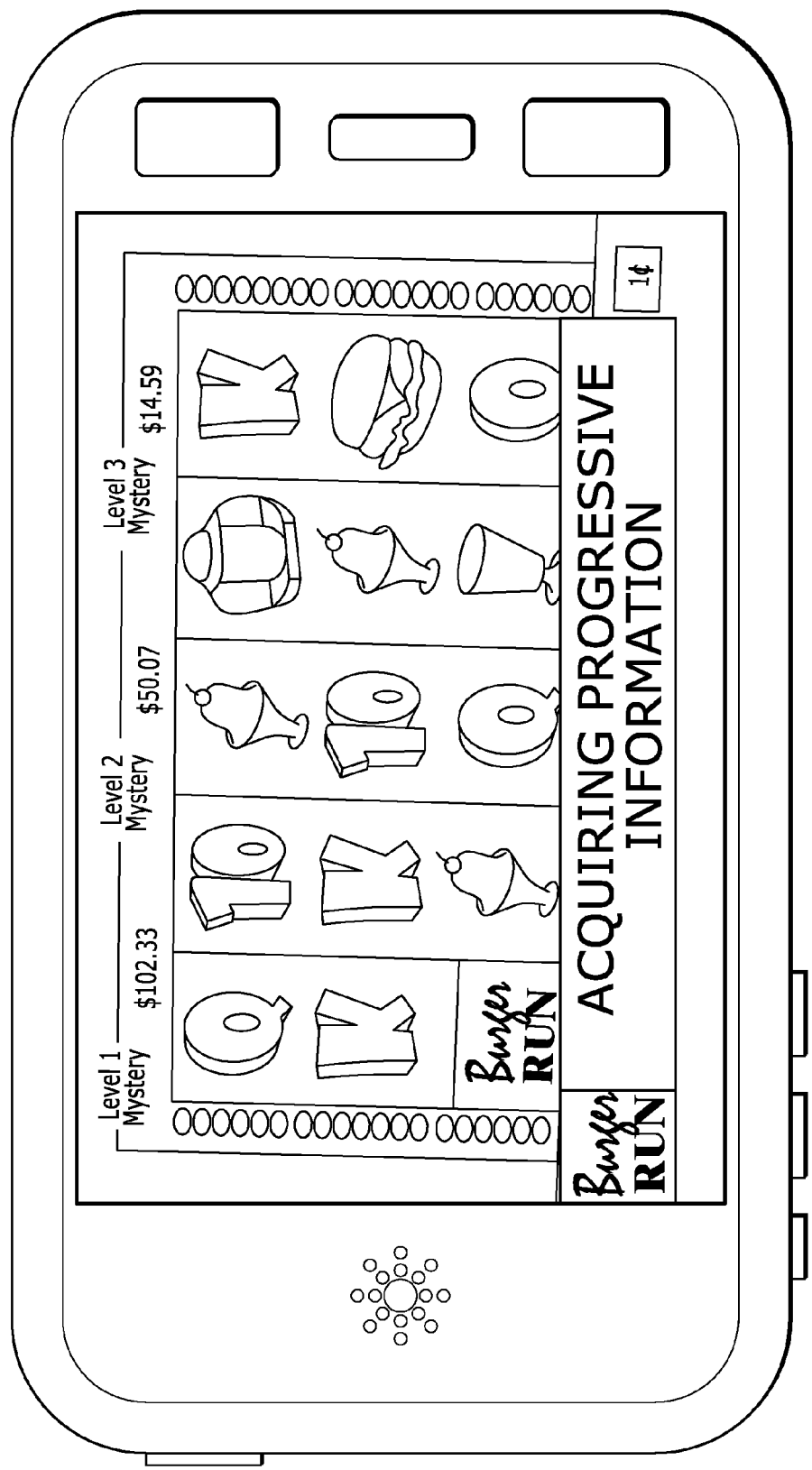
FIG. 21 illustrates a smart phone that is displaying a game application menu for progressive value decoding.
Figure 22:
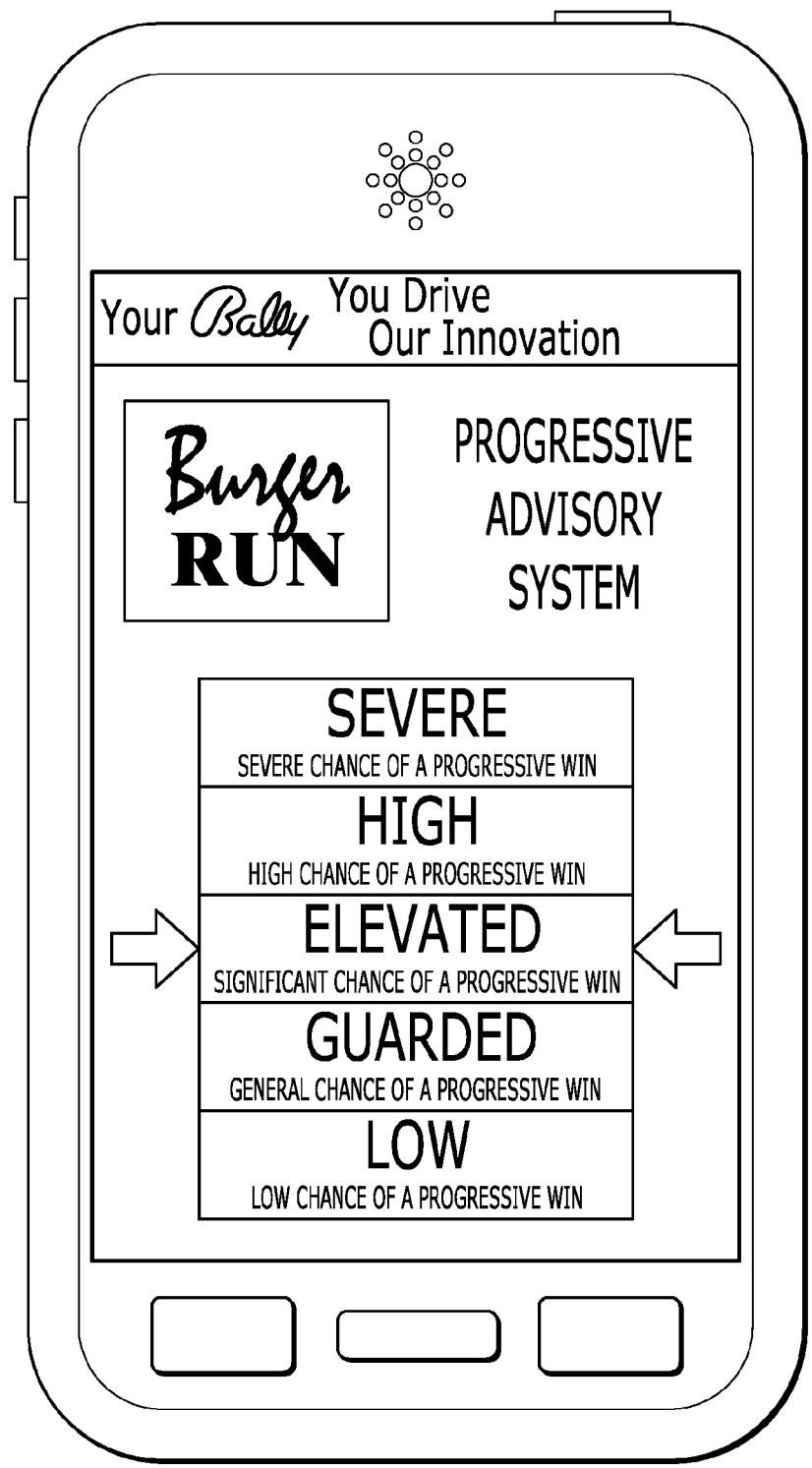
FIG. 22 illustrates a smart phone that is displaying a game application menu of an example progressive analysis presentation.

Referring again to the "Progressive Info" feature, this feature is further illustrated in FIGS. 20-22. Specifically, FIG. 20 illustrates a logic flow diagram of a process to present progressive rating. In one embodiment, FIG. 21 illustrates a smart phone in the process of acquiring progressive information for progressive value decoding. As with video poker, the gaming system having augmented reality gaming capabilities 1100 enables a player to take a photo of a progressive game. Continuing, as shown in FIG. 22, the mobile phone application or the backend server analyzes the current state of the meters to determine the current favorability of playing the game. This analysis is done by using the known meter positions within the captured LCD image (which may be derived by looking up the meter positions for a particular game once the game title itself has been derived using the processes in FIG. 13 or FIG. 14).

In some embodiments, the images at the meter positions are passed to an OCR (Optical Character Recognition) algorithm to determine the current progressive values. These values are then checked for sanity (i.e., if the values read are out-of-range for what may be expected, there may likely by either a problem with the image capture or with the installed progressive game). The values are then compared against their associated range, and a rating is determined. Otherwise stated, a progressive may have a range with a maximum expected value of $100, and a minimum of $90. If the current value read is $99.50, one would expect this progressive to be likely triggered comparatively soon. This result would also cause a high rating to be given.

In another embodiment of the gaming system having augmented reality gaming capabilities 1100, if the progressive is open-ended and does not have a maximum value, then the rating may be determined based upon the theoretical hold of the game based upon its current progressive states. In this manner, higher progressive values lead to a higher theoretical hold. In the case of multiple progressives, each rating may be shown individually, or combined into either an average or maximum rating. A maximum rating shows the rating of only the likeliest progressive to hit. Once determined, the rating is shown to the player, an example of which is shown in FIG. 22. In such an embodiment, progressive games are given a rating equivalent to the widely known Homeland Security warning system. Like its security counterpart, the rating may be configured such that the "low" rating is never chosen.

Notably, the use of calibration marks or a Bluetooth for determining the gaming machine screen position and orientation in a captured image is not necessary. In some embodiments of the gaming system having augmented reality gaming capabilities 1100, the game title may be determined by OCR or object recognition. In this manner, the fixed geometry and small set of possible images in a game may be used to quickly and accurately determine which game is present. Once the game title is determined, the known structure of the game display may be used in place of calibration marks. For example, in one embodiment, the game shown in FIG. 15 has touch screen buttons in the lower corners marked "Cash Out" and "Spin," which may be detected by object recognition and used as fixed points in the same way that the calibration marks would be used. Finally, in still another embodiment, techniques disclosed with respect to augmented reality gaming may be used as a way of augmenting a conventional stepper-based game in the way that LCD overlays have been used. In this manner, a complex winning line arrangement may be shown on the mobile phone screen.

Some preferred implementations of the disclosed embodiments use (1) a smart phone for the client, (2) any suitable web server for communication with the smart phone and for the registration of players, and (3) OpenCV image analysis software. Additionally, some embodiments provide features that include, by way of example only: (1) new bonus concepts, (2) quick, intuitive processes for players to obtain help, downloadable games, or other enhancements, (3) scale-ability from no interaction with the game to full interaction with the game, (4) delivering content to augment a regulated game with a comparatively unregulated mobile phone application, which cannot affect the regulated game, (5) leveraging existing technology, and (6) requiring no new infrastructure. In other aspects, some embodiments provide: (1) the use of object recognition and OCR to deliver augmented content overlay of an existing game, (2) the ability to overlay content based upon one-way communication from a gaming machine (data marks), and (3) a unique method of tracking potential license violations by casino users.

In another aspect of some embodiments, gaming systems are utilized that include mobile gaming capabilities 2600. In such embodiments of the disclosed gaming system, smart phones are utilized that include built in object recognition technologies and OCR (Optical character recognition) techniques combined with location/orientation derivation to provide players in casinos with additional gaming options and opportunities. In one embodiment of a gaming system that includes mobile gaming capabilities 2600, the gaming system leverages the possession by players of smart phones to enable the manufacturer to build profiles of players and target valuable players for promotions of key products of the manufacturer.

Figure 26:
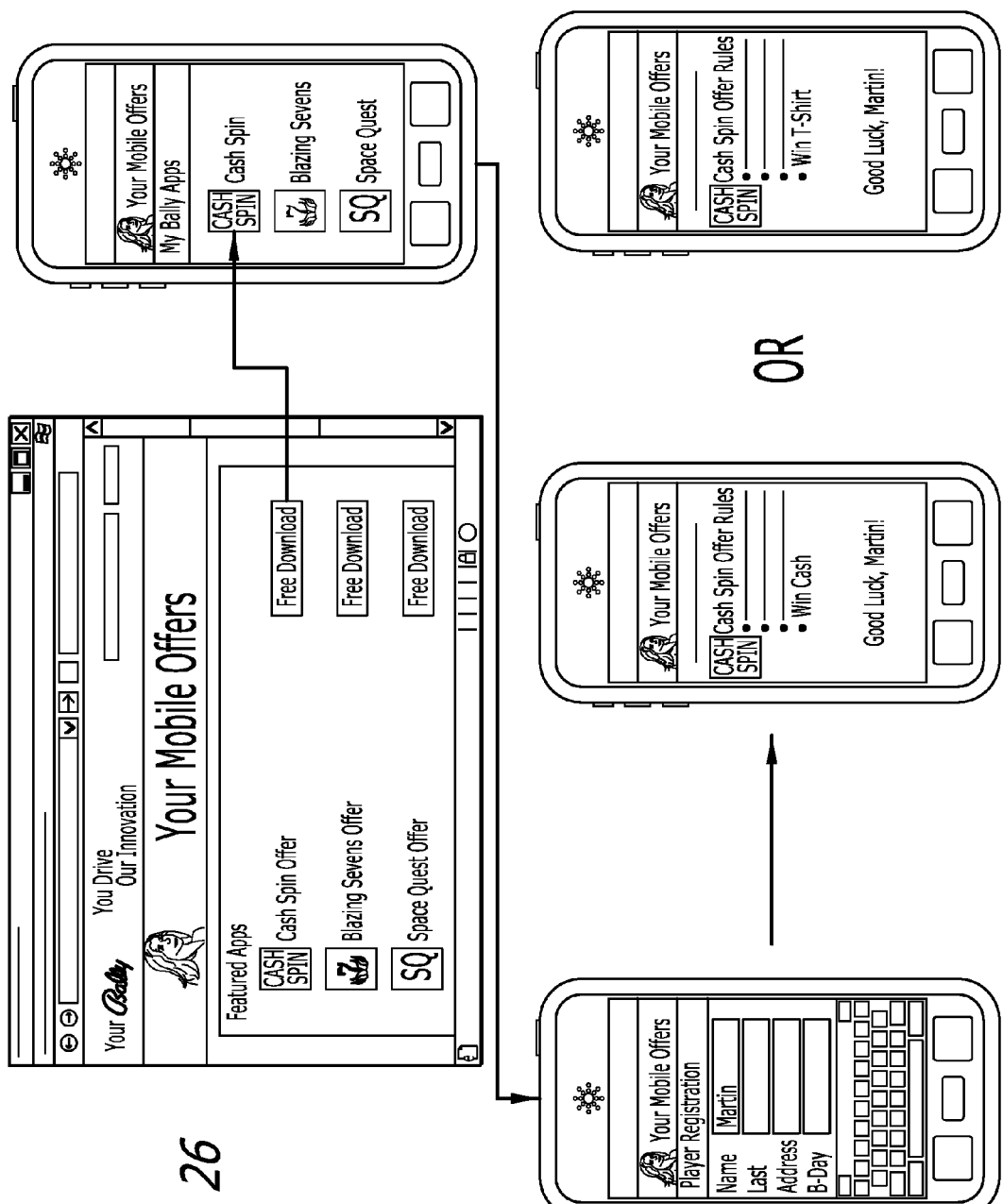
FIG. 26 illustrates a diagram of a download and registration process for an example iBonus game played on a mobile smart phone.
Figure 27:
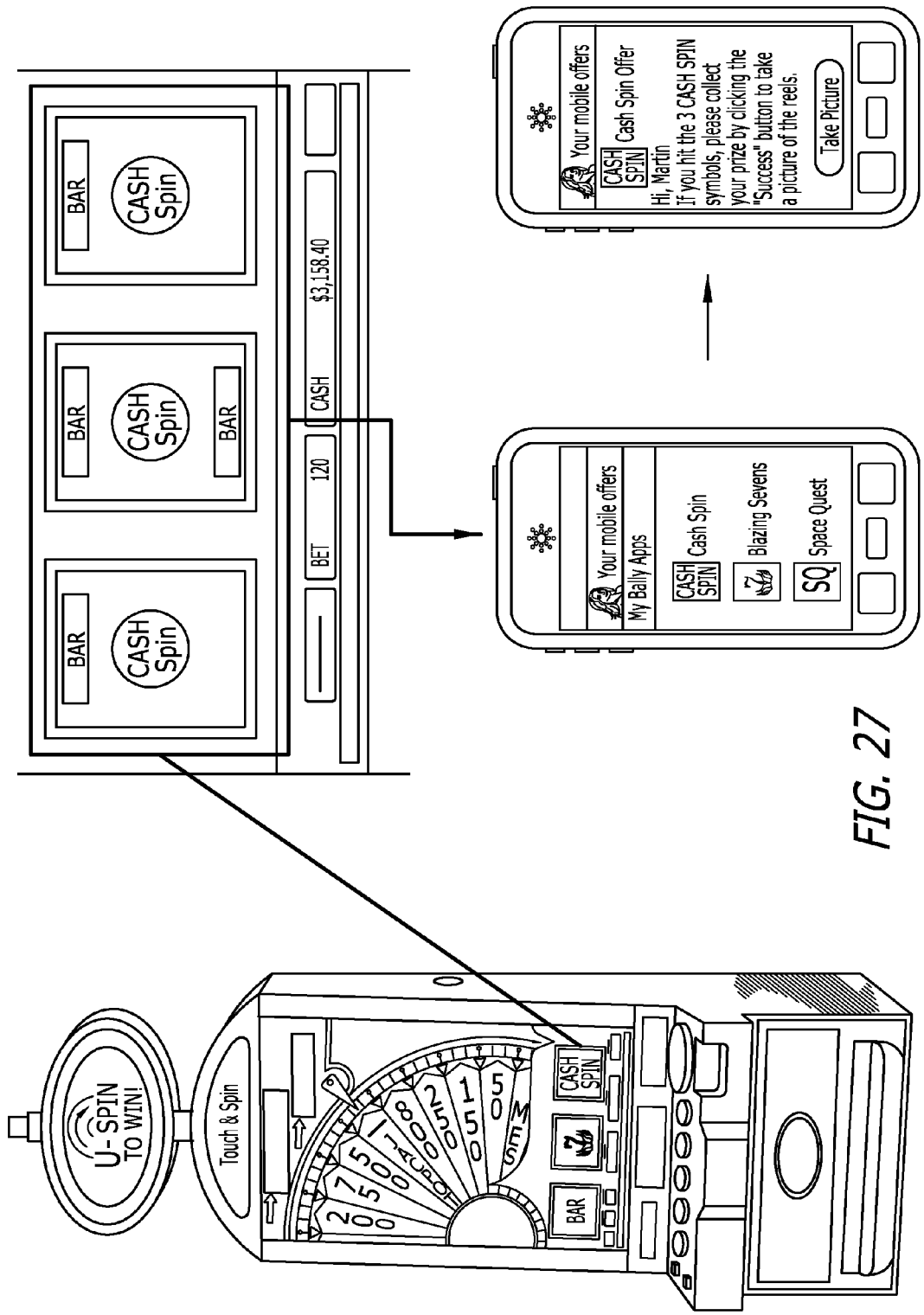
FIG. 27 illustrates a diagram of a game play process on an example iBonus game played on a mobile smart phone.
Figure 28:
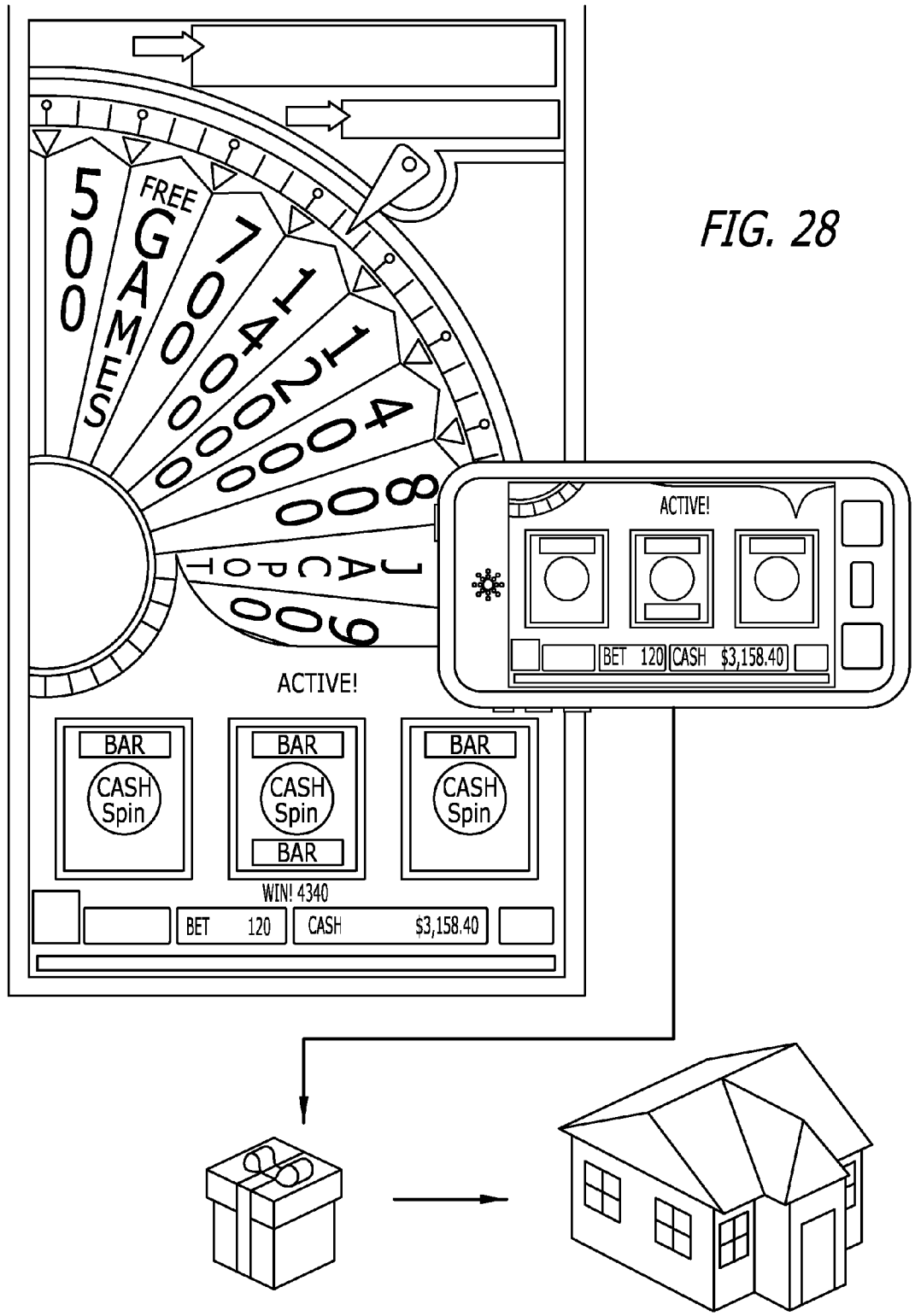
FIG. 28 illustrates a diagram of a bonus award process on an example iBonus game played on a mobile smart phone.

Referring now to FIGS. 26-28, the overall arrangement of the modules that make up an embodiment of a gaming system having mobile gaming capabilities 2600 is shown. In some embodiments of the gaming system having augmented reality gaming capabilities 2600, the gaming process proceeds in the following manner. A player downloads the "iBonus" application from an Application Store (e.g., a gaming manufacturer's application store, the Apple Application store, the Goggle Application Store, or the like) onto their smart phone. The player uses the iBonus application to enroll in the iBonus system. The iBonus application then displays a list of targeted promotions.

In one embodiment, a promotion may be "Hit 3 Cash Spin symbols to win a free Cash Spin t-shirt." The player then goes to the casino and plays Cash Spin. Once the player meets the requirements of the promotion, such as by hitting a combination that includes three Cash Spin symbols, the player takes out their phone, selects the iBonus application, and uses the built-in camera (controlled by the iBonus application) to take a photo of the game result. The iBonus Application securely transmits the photo to a web service, where the photo is analyzed to confirm that the player has indeed met the terms of the promotion. Once confirmed, the player is awarded the bonus by mail or electronically.

Figure 29:
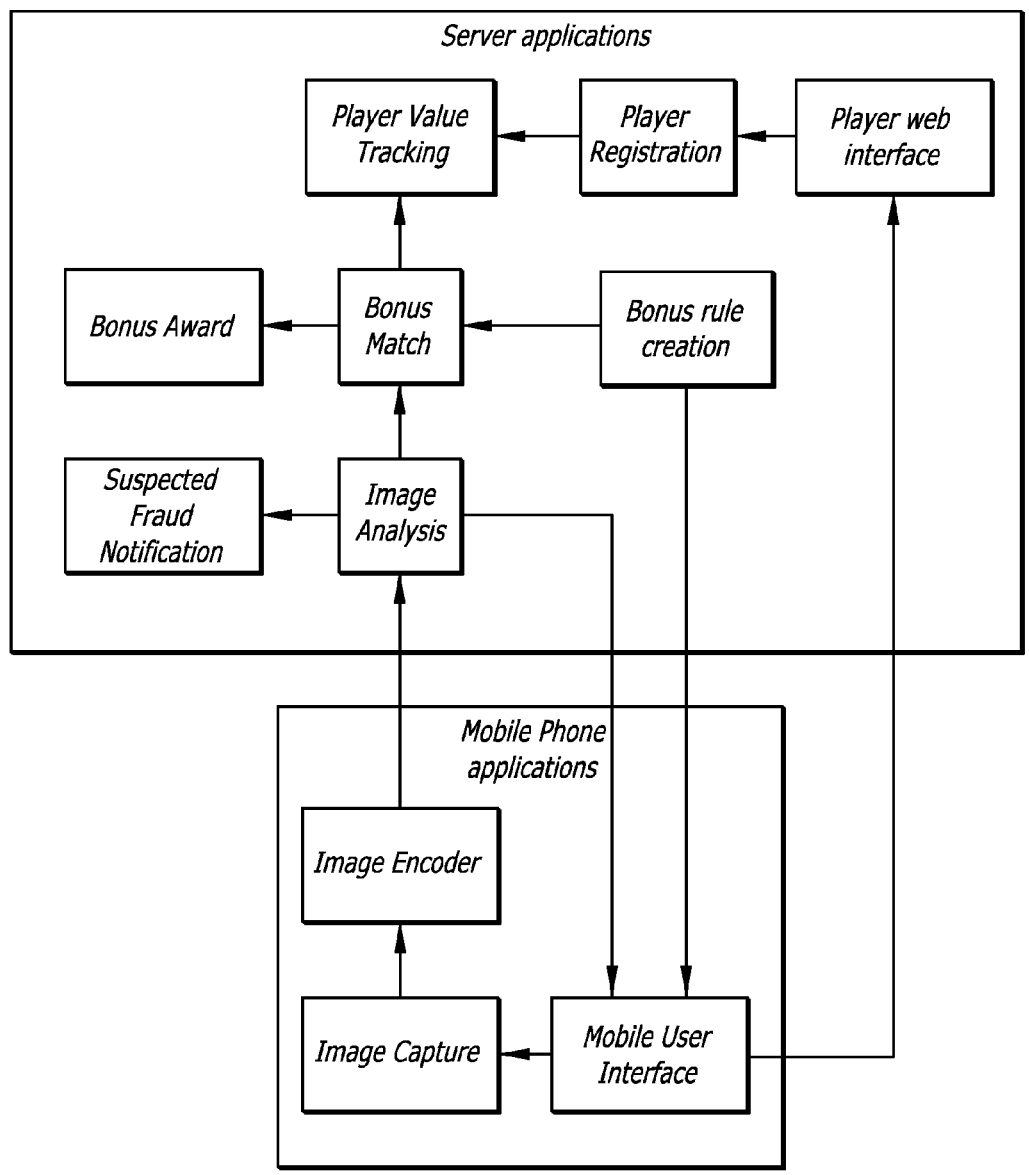
FIG. 29 illustrates a system overview of an iBonus system.

Referring now to FIG. 29, an embodiment is shown that displays the general arrangement of logical modules in the gaming system having mobile gaming capabilities 2600. These modules include, by way of example only, and not by way of limitation: Player Value Tracking, Player Registration, Player Web Interface, Bonus Match, Bonus Award, Bonus Rule Creation, and Image Analysis.

Regarding the Player Value Tracking feature of the gaming system having mobile gaming capabilities 2600, as players register, they are added to a database managed by the Player Value Tracking module. Initially, a player is assigned a zero value. Otherwise stated, the player will be offered bonuses available to all other players in their demographic (such as location/jurisdiction or age). As players participate in the bonus system their value may go up based upon their average bet, and thus they may be offered higher value, more targeted bonuses. The important difference between this module and a conventional player tracking system is that instead of each wager made by the player contributing to the value, this system only tracks events captured by the mobile phone application, which are generally bonus-qualifying wins.

Referring now to the Player Registration feature of the gaming system having mobile gaming capabilities 2600, the player registration module handles the creation of new records for the Player Value Tracking system. Since fraud prevention is an important facet of the disclosed gaming system, the player registration module generally requires some identification data to ensure that players do not register multiple accounts. A simple way to achieve this is to use an online service such as an online Application Store as a means of downloading the smart phone application. After being downloaded, each application may be electronically "fingerprinted" so as to be tied to one smart phone account and/or smart phone, without requiring payment from the player.

Regarding the Player Web Interface feature of the gaming system having mobile gaming capabilities 2600, the player web interface provides some other important functionality, in addition to providing a portal to the Player Registration module. Initially, the web interface provides general advertising of the iBonus system and current promotions within. This advertising may also be accessed from the smart phone application. Furthermore, the web interface provides the ability to push updates to the smart phone application. As an anti-hacking measure, the software and encryption keys on the smart phone are periodically updated to increase the cost of reverse engineering the communication protocol beyond the economic value of any bonuses fraudulently earned.

Referring now to the Bonus Match feature of the gaming system having mobile gaming capabilities 2600, once an image or image set has been analyzed to determine the state of the gaming machine at capture time, the correct bonus to be awarded can be calculated. In this manner, the Bonus Match module parses the list of possible bonuses to generate a list of matching bonuses. It is expected that each possible bonus record would include some or all of the following fields, including but not limited to: Type of bonus, Game Identifier, Game qualifying conditions, Bet qualifying conditions, Geographic restrictions, Demographic restrictions, Time restrictions, and Quantity.

In some embodiments of the gaming system having mobile gaming capabilities 2600, the "Type Of Bonus" may be physical or virtual. A physical bonus may be an item such as a t-shirt or a prepaid debit card, while a virtual bonus may be loyalty points that can be redeemed for physical items or funds. In another aspect of some embodiments, the "Game Identifier" is the name of the game being "bonused." In still another aspect, the "Game Qualifying Conditions" are the symbols or game state that must be matched. For example, in one embodiment, the symbol qualifying condition is "4 or more scatter symbols," and a game state may be "a win above >$100." In yet another aspect, the "Bet Qualifying Conditions" are a bonus that may be restricted to a minimum denomination and/or other conditions such as a minimum number of lines played, or a minimum total bet.

Continuing, in some embodiments of the gaming system having mobile gaming capabilities 2600, the "Geographic Restrictions" file includes some combination of a cell tower identifier, a reverse DNS lookup, and a GPS address to restrict the eligibility of some bonuses. In another aspect of some embodiments, the "Demographic Restrictions" file includes some bonuses that are available to players in certain demographic groups such as age-ranges. In still another aspect, the "Time Restrictions" field includes bonuses that may be only available at certain times of the week or for a fixed length of time. Finally, in yet another aspect of one embodiment, the "Quantity" field includes the ability to set a limit on the number of redemptions before the bonus expires.

Desirably, the combining of these attributes enables a manufacturer to generate some interesting promotion types. For example, in some embodiments, the manufacturer may choose to offer an "ad-hoc" tournament to certain players. In such an embodiment, the players are sent a message telling them, for example, that if the players play "Cash-Spin" from 7:30 PM to 11:30 PM on Independence Day, the first fifty players to hit the Cash Spin will be awarded an extra prize.

Figure 30:
FIG. 30 illustrates a smart phone that is displaying an Ad Hoc tournament on a mobile smart phone.

In another embodiment of the gaming system having mobile gaming capabilities 2600, tournaments are formed by having bonus awards predicated upon the highest wins by players participating over a period of time. For example, in one embodiment, the manufacturer sends a message to targeted players, informing the players that the highest win on a Blazing 7s game between 8:00 PM and 9:00 PM on Tuesday will win a bonus of $1000. In such a scenario, each player participating during this time would be encouraged to take photos of significant wins, and at the end of the period the player with the highest win submitted would win the bonus. Notably, as shown in FIG. 30, the smart phone application may also be used to enter the tournament. Next, updates would be pushed to all of the smart phones of the participating players every time the leader board changed, thus enabling the players to monitor their positions in the tournament rankings. At the completion of the tournament, any awards may be notified directly to players through the smart phone application.

Referring now to FIG. 29, the Bonus Match Module interfaces with the Player Value Tracking module in that all data captured by the Bonus Match Module (e.g., the arrangement of symbols, denomination, current credits played) are passed to the Player Value Tracking module so that a history of interaction for each player may be generated. This data may be used to compute an average bet for a player (and thus their value to casinos) and also to determine the particular game types (e.g., 1c high volatility) that a player prefers to play.

Referring now to the Bonus Award module of the gaming system having mobile gaming capabilities 2600, this module performs the function of distributing awards to players. In one more basic embodiment, players may be awarded physical awards such as t-shirts or prepaid debit cards, which may be mailed out to the players. In another aspect of some embodiments, a loyalty points program is implemented that enables players to accumulate points to be redeemed for larger awards.

Regarding the Bonus Rule Creation feature of the gaming system having mobile gaming capabilities 2600, each bonus is constructed from a set of rules such as those described above. In some embodiments, bonuses may be created from these rules by using a GUI (graphical user interface). However, in other embodiments, Business Intelligence may be used to target the players who would benefit from some bonuses. In one such embodiment, if a manufacturer launches "Cash Spin 2," the manufacturer may target players who had previously won a bonus playing "Cash Spin" as being eligible for a special bonus opportunity.

Figure 31:
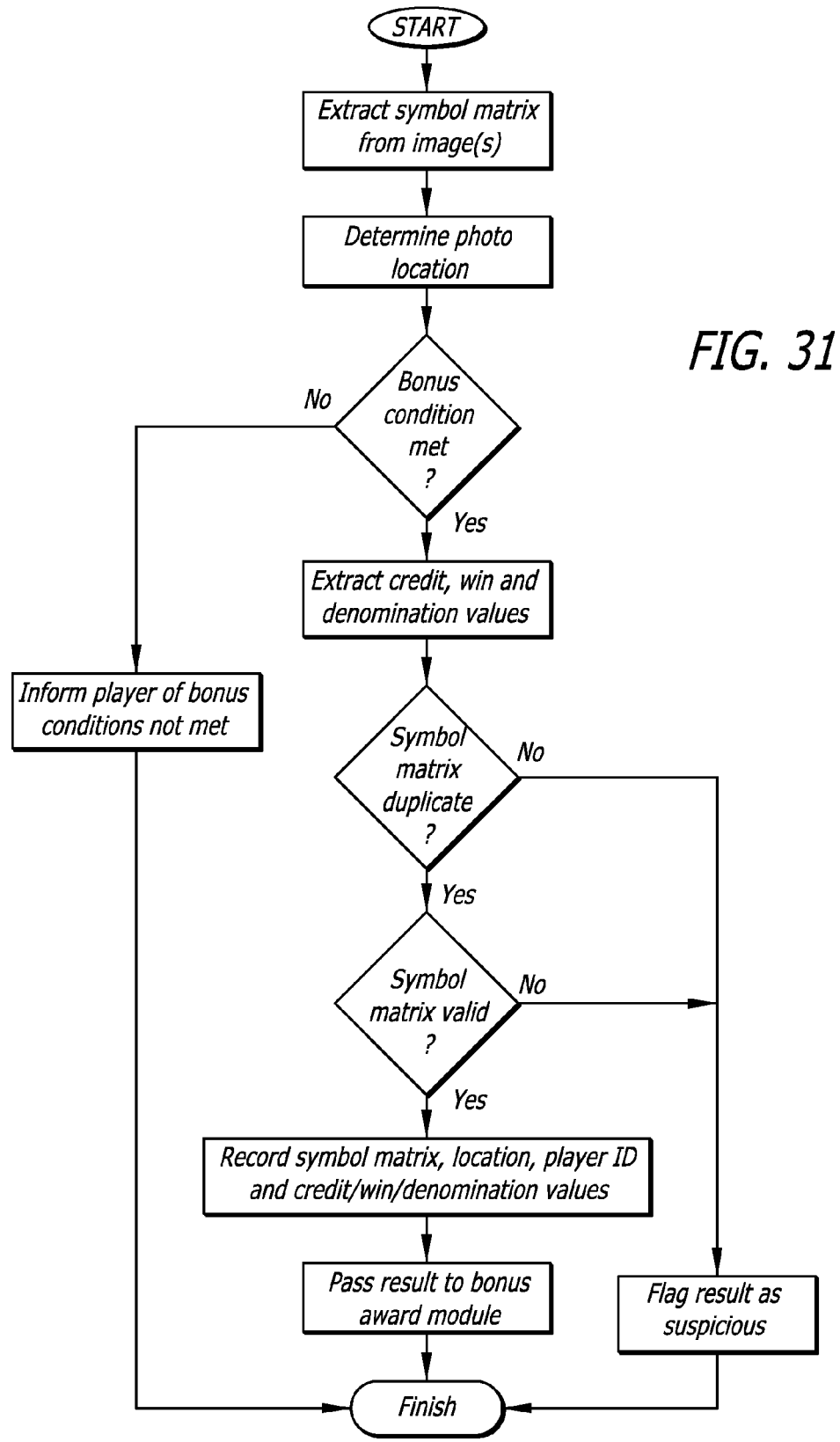
FIG. 31 illustrates a logic flow diagram of an image analysis process.

Referring now to the Image Analysis module of the gaming system having mobile gaming capabilities 2600, the processes of this module are shown in FIG. 31. The image analysis module performs two major functions: (1) determination of the arrangement of symbols present in the photo taken by the player; and (2) detection of attempted fraud. In some embodiments, the first task that the image analysis module performs upon receiving an image from the smart phone application is the extraction of the symbol matrix from the image. Standard image analysis techniques are utilized, such as the OpenCV software library. In one aspect of this embodiment, the image analysis has copies of all of the candidate symbol images that may be detected. From this library of images, the arrangement of symbols on screen may be determined. Notably, in another embodiment, manual intervention may be used. In such an embodiment, a person located at a manufacturer's office quickly analyzes a photo and enters the arrangement of symbols into the Image Analysis system.

In another aspect of the gaming system having mobile gaming capabilities 2600, additional data may be sent from the smart phone to assist in automatic image analysis. The smart phone location (i.e., "geotag") information may be used to narrow down the number of possible games against which to compare. Such a location may be determined by various combinations of the phone's GPS position, IP address, and/or smart phone tower location.

Figure 32:
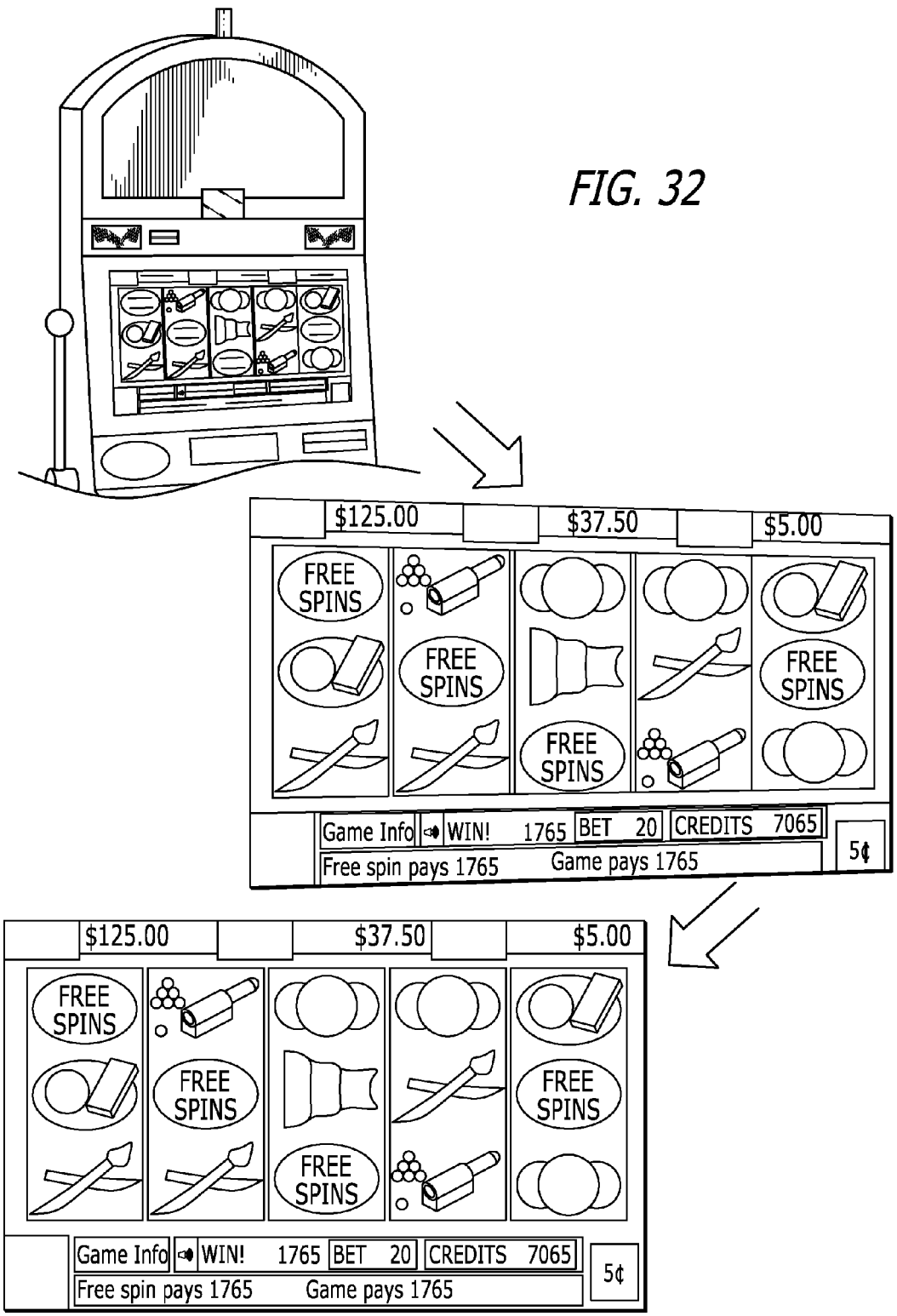
FIG. 32 illustrates a diagram of a process for removal of a perspective distortion of an image.

Referring now to FIG. 32, one embodiment of the gaming system 2600 is shown that illustrates how a gaming machine screen image may be processed from a photo taken by a smart phone camera. Initially, the screen image is extracted. Next, the screen image is transformed by a reverse perspective (or keystone) transformation.

In some embodiments, to assist the keystone transformation of the image, the orientation of the smart phone is determined by reading the smart phone's accelerometer values at the instant the image is captured. Typically, the accelerometer values indicate orientation about the x, y and z axis. While rotation about the vertical (y) axis is only useful if the orientation of the gaming machine cabinet is known (which may be possible if the location of the camera is known precisely enough), rotation about the x and z axis may be used to reduce the complexity of the transformation required, given that the orientation of the gaming machine screen for a particular cabinet is a known constant about the x and z axis. In this manner, reducing the transformation to one axis makes determining the "best fit" relatively straightforward. Once the extent of the gaming machine screen is determined in the image, the angle of rotation of the top or bottom of the gaming machine screen from the horizontal is all that is needed to compute the reverse perspective transformation.

Furthermore, FIG. 32 also illustrates another feature of certain manufacturer-specific games. In this feature, the symbols constituting a win flash are otherwise animated in the event of a win. To compensate for the difficulty this may add to determining the arrangement of symbols, the following steps are taken. Initially, the Image Analysis module has access to every frame of animation of each animated symbol. In this manner, each frame is used to compare against candidate sub-images. Next, the smart phone application takes multiple photos when the player presses the "Take Picture" (or similar) button. These photos are spaced in time such that at least a half a cycle of the known symbol flash time (approximately ten frames or one-third of a second) elapses between consecutive captures. In the event that the symbol matrix cannot be determined from the first image captured, the second and subsequent captures are used to fill in any blanks. In another aspect, multiple image capture is also used as part of the fraud detection strategy described below.

Referring again to FIG. 31, the image captured is analyzed to determine the state of the game with respect to the current denomination being played, current play line configuration, amount bet, and credits available. These values are preferably determined by the use of known OCR (Optical Character Recognition) techniques in conjunction with templates available to the Image Analysis module. The Image Analysis module describes where on the primary gaming machine LCD screen the meter values may be expected to be located. Notably, in another embodiment, manual intervention may be used. In such an embodiment, these values are extracted for the purpose of ensuring that bonus conditions may be met, to help prevent fraud (as described in further detail below), and for passing to the Player Value Tracking system.

In the embodiment shown in FIG. 32, since the game is known to have progressive meters displayed on the screen, these meters are also extracted. Once the symbol matrix and meter values have been determined, they are passed (along with any geographic identification) to the Bonus Match module. If no bonus condition has been met, the player is informed accordingly. In the event that the symbol matrix was not captured correctly, this gives the player another chance to take a photo.

In another aspect of the gaming system having mobile gaming capabilities 2600, if a bonus condition has been met, the image(s) is further analyzed for the purposes of player value tracking and fraud detection. Typically, the first task of the fraud detection method is the analysis of the symbol matrix to ensure that the matrix is valid. One non-limiting embodiment is illustrated by the following result:

|  | Reel 1 | Reel 2 | Reel 3 | Reel 4 | Reel 5 |
| --- | --- | --- | --- | --- | --- |
| Line 2 | KING | KING | KING | KING | ACE |
| Line 1 | NINE | SEVEN | QUEEN | KING | JACK |
| Line 3 | ACE | NINE | KING | SEVEN | JACK |

In this non-limiting exemplary embodiment, a player is eligible for a bonus if the player has four Kings in a line. However, the player is only awarded the bonus in this scenario if they have elected to play at least two lines. Furthermore, the following checks are performed to prevent a hacker trying to subvert the process.

In the first hacker prevention step, each of the reel segments is compared against every legal reel strip for this particular game to ensure that they are possible. For example, if there is no known reel strip for reel 4 that contains a sequence of "KING KING SEVEN," then this configuration may be identified as illegal. Accordingly, a suspicious notification may be generated. In another aspect, games may have different reel strips in different jurisdictions, which in conjunction with the known geographic position of the smart phone may be used to limit the possible legal strips. If the reel segments are found to be valid, the game configuration (in terms of hold) may also be determined to be valid. As such, the game configuration may be passed as data to the Player Value Tracking module for later business intelligence methods, with respect to the evaluation of the success of different holds for games.

In the second hacker prevention step, the winning amount won by the player as represented on the screen and extracted above (along with the associated bet value) is validated against the known pay table to ensure the winning amount has not been faked. Continuing, in the next hacker prevention step, the progressive meters, if present, are compared against the known legal ranges. In the case of wide-area-progressives, where the values of the progressives are known for a given time, the time stamp of the image is used to determine the expected progressive values. If the progressive meter values are not within a small range of these expected values, the bonus may be flagged as suspicious.

Finally, in yet another hacker prevention step relating to a scenario in which multiple image captures are taken, each image is analyzed in turn to ensure that it is consistent with a correct set of animations for the game result. For example, if it is expected that a winning symbol would flash at a certain rate, the bonus can be flagged as suspicious if this flash is not present in the image and/or the sequence is not captured at the correct rate.

If an image passes all of these above-described hacker prevention checks, the system will likely conclude that an image has been taken off a legal bonus. A further set of checks are also performed, however, to guard against "replay attacks." A replay attack occurs when an unscrupulous person takes multiple photos of the bonus triggering game result and submits the photos as multiple entries, thereby attempting to earn multiple awards.

In some embodiments, the gaming system 2600 guards against replay attack by comparing the following data obtained from the image against other bonus redemptions for the same game. Such data includes: the arrangement of the symbol matrix, the values of the credit, denomination, bet and win meters, and progressive meters, and the time and geographic location of the bonus being submitted. Regarding the arrangement of the symbol matrix, the odds of two persons hitting the same exact arrangement of paying and non-paying symbols is actually quite high (i.e., in the hundreds of thousands, if not millions to one) for most reasonably high paying game outcomes. With respect to the values of the credit, denomination, bet and win meters, and progressive meters (if present), it is highly unlikely that two bonus winners would have identical values for all of these. Lastly, regarding the time and geographic location of the bonus being submitted, it is highly unlikely that the same winning result would be achieved at the same place and close to the same time. When taken in combination, it is mathematically clear that if two bonus images are submitted that match all of the above, it is likely that fraudulent behavior is the cause of such a result. Once an award attempt passes these hacker prevention checks, the Bonus Award module is signaled to award the bonus, and the smart phone application is signaled to inform the player that the award has been earned.

As described above, various strategies may be performed to prevent "replay attacks" against the gaming system 2600 in which a number of identical submissions are made by one or more players at a similar time. In this type of fraud, when a player wins, in addition to the winning player submitting their photo, one or more other people around the winning player also take photos of the screen in an attempt to try and also get the prize. Normally, only the first submission of a group of identical game results is awarded the prize, with the subsequent submissions being denied.

In another fraud-attempt scenario, a player wins a prize on a gaming machine, but before the winning player has a chance to get their phone out, another person behind the winning player (or at an adjacent gaming machine) takes a photo of the winning game screen and submits the photo. To prevent this type of fraud, in a case where multiple submissions are received by the gaming system 2600, if the first submission is taken at a much further distance, or at a significantly more acute angle (as measured by the perspective distortion of the captured image of the reels) to a second submission then the later submission is determined to be the valid one. This analysis may be performed either automatically, or more preferably, with human interaction.

Referring now to the smart phone application of the gaming system having mobile gaming capabilities 2600, the smart phone application is comprised of a number of smaller modules. In some embodiments, the smart phone application has a user interface that interfaces with the Player Web Interface module. This enables the smart phone application to provide periodic updates with new offers which may be targeted to the player.

In another aspect, the application also includes an image capture module. The image capture module is activated by the player upon them pressing the "Take Picture" button for a particular offer. In some embodiments, the image capture module controls the in-built camera on the smart phone and displays a copy of the current camera captured image on the phone's display, much like a conventional camera application. Additionally, a button is also presented to the player to be pressed when the display of the gaming machine is roughly centered in the camera view. In another embodiment, no button is used, and image analysis algorithms built into the capture module detect the presence of game symbols in the camera view and immediately begin capturing images. The presence of game meters (read by OCR) or a physical barcode sticker may be used to automatically begin capturing images.

In some preferred implementations of the gaming system having mobile gaming capabilities 2600, the image capture module reads the values of the accelerometers from the phone and does not capture images unless the phone is relatively stable (i.e., only small amounts of acceleration detected). This assists the player in making a good image capture in the low (in-door) light of a casino. In some embodiments, the auto-focus algorithms of the phone's camera only allow photos to be taken that are sharp. Additionally, as each image is taken it may be analyzed using box filters and Fourier transforms to detect the overall sharpness of the image. The application may also take multiple image captures until an image is taken that is suitably sharp and contains recognizable data (such as meter values) in acceptable areas of the image.

Figure 32A:
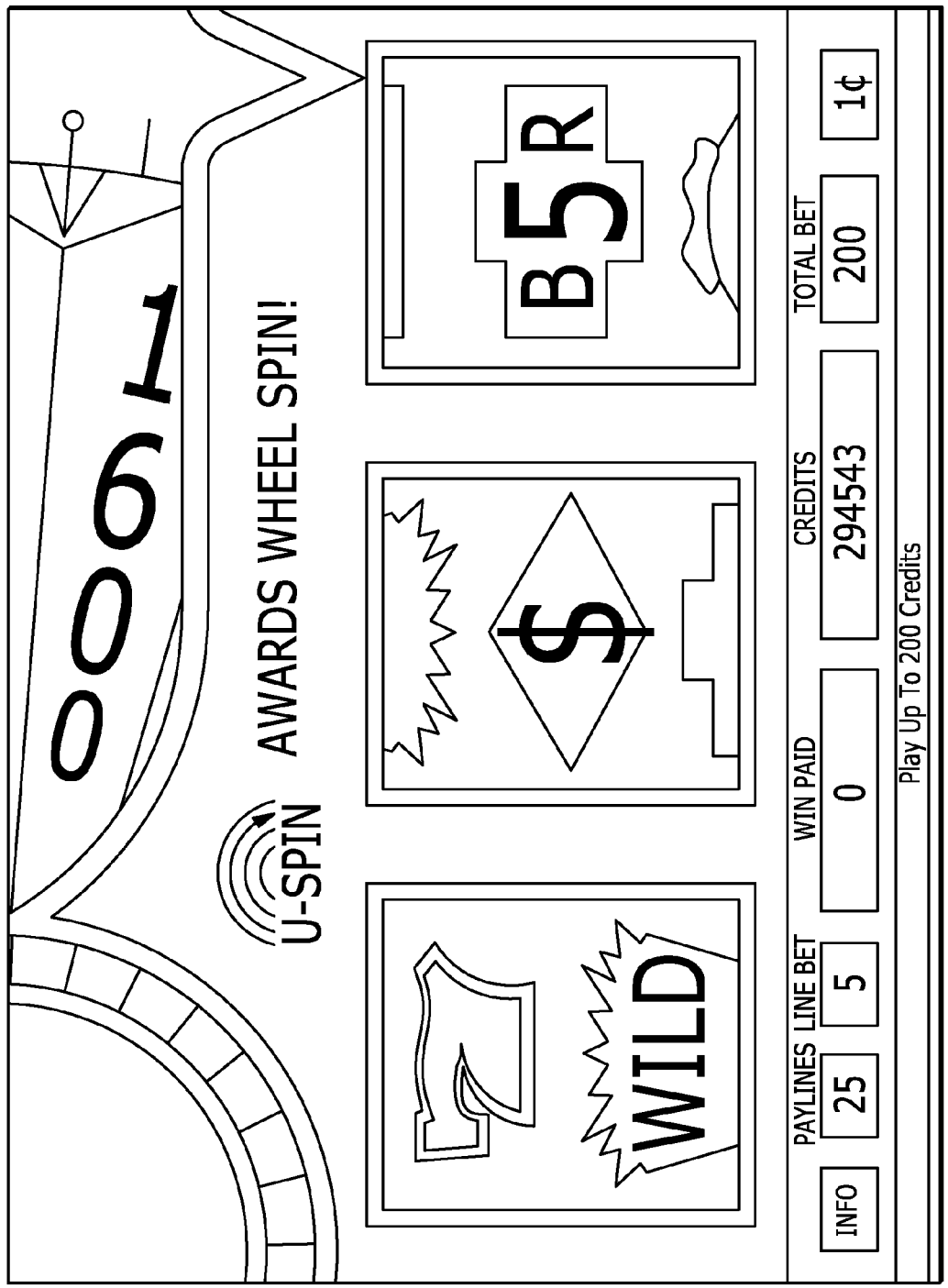
FIG. 32A illustrates a live camera image of a gaming machine screen.
Figure 32B:
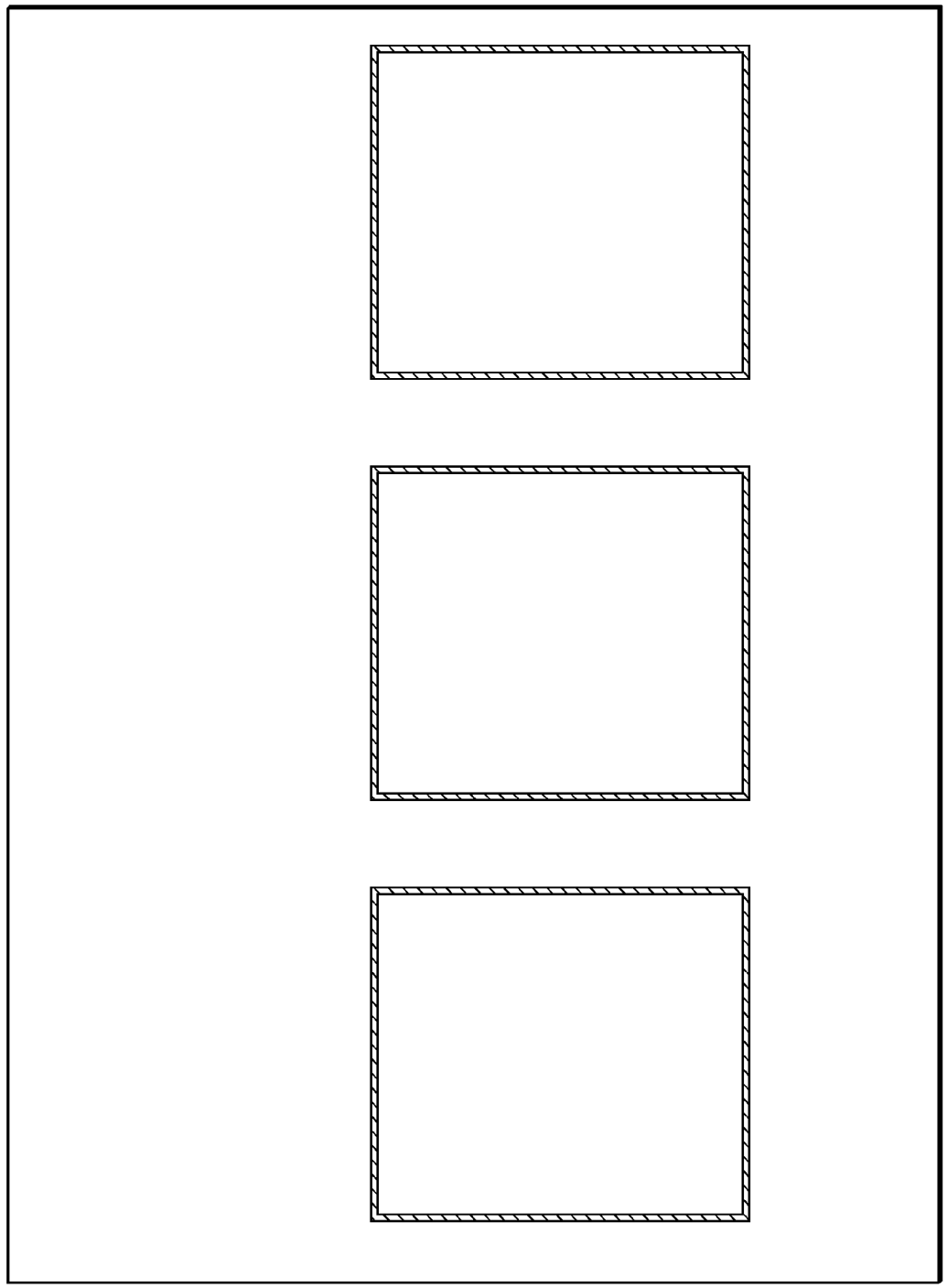
FIG. 32B illustrates alignment boxes that are used by the player to overlay onto the live camera image of FIG. 32A.

In one embodiment of the gaming system having mobile gaming capabilities 2600, when a player wishes to submit a result, the player activates the capture function. After activation, the player starts to receive a live feed of the images being received by the phone's camera on the phone's display, which allows the player to see what they are about to capture. For example, as shown in FIG. 32A, a live camera image of a gaming machine screen is displayed. Referring next to FIG. 32B, alignment boxes may be seen that are used by the player to overlay onto the live camera image. FIG. 32C shows the alignment boxes overlaid onto the live camera image that was displayed in FIG. 32A in the manner of a heads up display.

One purpose of the alignment boxes is to make it very easy for a player to know how to align his camera. Another purpose of the alignment boxes is to ensure that other data (such as meter values) will also be captured for hacker detection or player tracking purposes. In this manner, the alignment boxes are sized dependent upon the individual game and are small enough to ensure the data around the reels is also captured. Notably, the "three alignment box" example shown in FIGS. 32A-32C is a single non-limiting example. In other embodiments, one large box encompassing all three reels may be used. In still another embodiment, a cross hair graphic may be utilized that is aligned with the center of the middle reel.

In another aspect of the gaming system, the Image Encoder module in the smart phone application encodes the image for transmission to the Image Analysis Module. Since the link between the Image Analysis module and the mobile phone is over a public data network such as the internet (in some embodiments), it is important that all communication is encrypted. Furthermore, public key encryption may be used, with server applications only permitting the connection from phones that can prove to be authorized to participate in the bonus system by means of a digital signature. To prevent hacking, it is preferred that the smart phone application platform be relatively secure, with the application only being distributed through authorized channels such as the smart phone manufacturer's Application store or the gaming machines manufacturer's website. In some embodiments of the gaming system, encryption keys and methods are periodically updated to make it more difficult for a hacker to insert their own images into the system. Along with the fraud detection methods disclosed above, these hacker prevention modules are configured to make the risk of significant loss very low.

An alternative for players who do not have access to a smart phone is that casinos or bars may be supplied with phones capable of running the mobile phone application. In the event of a qualifying win, the player calls for assistance and has an attendant or bartender perform the photo verification process.

In some embodiments of the disclosed gaming system, players may use their smart phone to take a photo of the machine and obtain access to the following capabilities: (a) Tournament across venues (e.g., each player signs in, time limited, and the like); (b) take a photo of a game (or barcode) to download a mobile application version of the game; (c) obtain a free copy of the mobile game for winning some trivial amount (which ensures that players play a game for a minimum amount of time); and (d) take a photo of a game to see what gaming machine manufacturer offers are available.

Some preferred implementations of the disclosed embodiments use (1) a smart phone for the client, (2) any suitable web server for communication with the smart phone and registration of players, and (3) OpenCV image analysis software. Additionally, some embodiments provide features that include, by way of example only: (1) alternative player tracking, bonusing, and a marketing method for gaming manufacturers, (2) the capabilities to work with existing games without requiring any modification, and (3) leveraging existing smart mobile phone infrastructure. In other aspects, some embodiments provide: (1) detection of a win by image analysis, without any access to game code; (2) detection of fraudulent entries by analysis of symbols displayed, meters on the screen, location and time of image taken; (3) capture of multiple images to prevent fraud and also more accurately detect wins; (4) alternative method of determining player value (e.g., using win amounts instead of using coin in); (5) enabling the addition of ad-hoc tournaments to existing games; and (6) enabling the targeted marketing of new games for valuable players.

Figure 33:
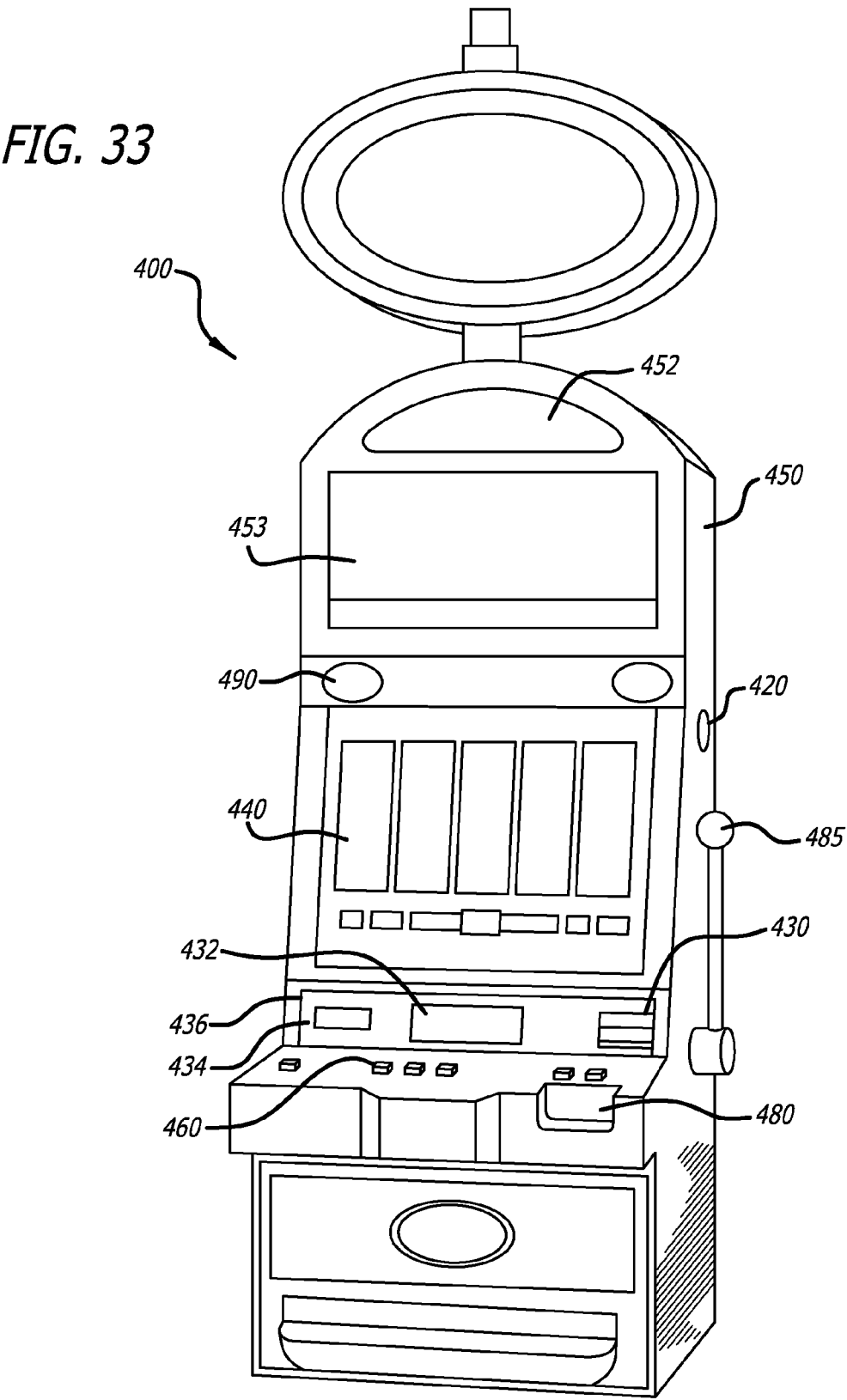
FIG. 33 is a perspective view of a gaming machine in accordance with one or more embodiments.
Figure 34:
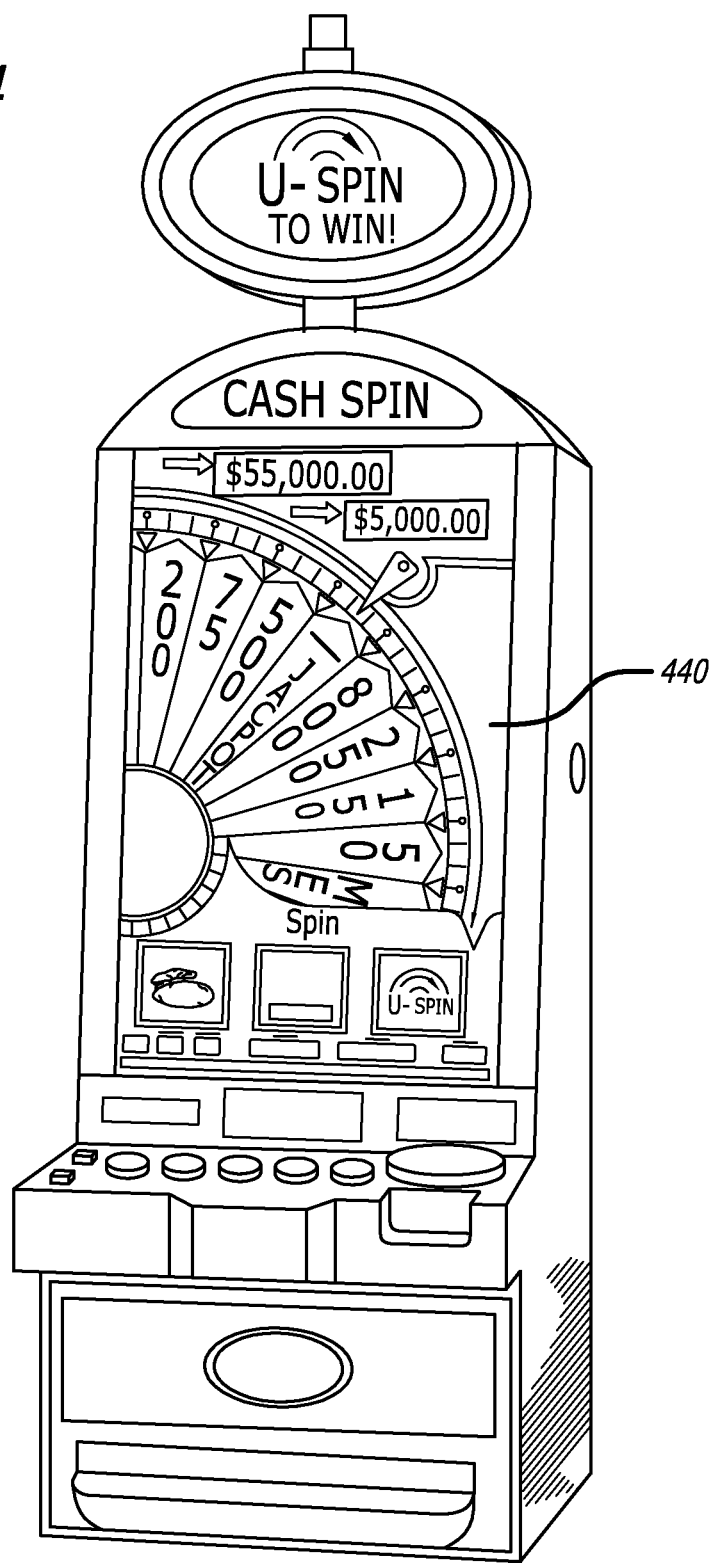
FIG. 34 is a perspective view of another embodiment of a gaming machine.

In accordance with one or more embodiments, FIGS. 33 and 34 illustrate a gaming machine 400 including cabinet housing 420, primary game display 440 upon which a primary game and feature game may be displayed, top box 450 which may display multiple progressives that may be won during play of the primary or feature game, player-activated buttons 460, player tracking panel 436, bill/voucher acceptor 480, and one or more speakers 490. Cabinet housing 420 is a self-standing unit that is generally rectangular in shape and may be manufactured with reinforced steel or other rigid materials which are resistant to tampering and vandalism. Cabinet housing 420 houses a processor, circuitry, and software (not shown) for receiving signals from the player-activated buttons 460, operating the games, and transmitting signals to the respective displays and speakers. Any shaped cabinet may be implemented with any embodiment of gaming machine 400 so long as it provides access to a player for playing a game. For example, cabinet 420 may comprise a slant-top, bar-top, or table-top style cabinet. The operation of gaming machine 400 is described more fully below.

In another aspect of one embodiment, the plurality of player-activated buttons 460 may be used for various functions such as, but not limited to, selecting a wager denomination, selecting a game to be played, selecting a wager amount per game, initiating a game, or cashing out money from gaming machine 400. The Buttons 460 functions to input mechanisms and may include mechanical buttons, electromechanical buttons or touch screen buttons. Optionally, a handle 485 may be rotated by a player to initiate a game.

In other embodiments, buttons 460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, which is hereby incorporated in its entirety by reference.

Cabinet housing 420 may optionally include top box 450 which contains "top glass" 452 comprising advertising or payout information related to the game or games available on gaming machine 400. Player tracking panel 436 includes player tracking card reader 434 and player tracking display 432. Voucher printer 430 may be integrated into player tracking panel 436 or installed elsewhere in cabinet housing 420 or top box 450.

Game display 440 presents a game of chance wherein a player receives one or more outcomes from a set of potential outcomes. For example, one such game of chance is a video slot machine game. In other aspects of the embodiment, gaming machine 400 may present a video or mechanical reel slot machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 440 is typically a CRT or a flat-panel display in the form of, but not limited to, liquid crystal, plasma, electroluminescent, vacuum fluorescent, field emission, or any other type of panel display known or developed in the art. Game display 440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 34 illustrates an example of a portrait mode game display 440 having widescreen dimensions in accordance with one embodiment. Additionally, game display 440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 440 may include transparent portions which cover and may interact with displays on mechanical reels, as described in U.S. application Ser. No. 12/113,112, entitled, "Mechanical Reels With Interactive Display," filed on Apr. 30, 2008, which is hereby incorporated in its entirety by reference.

Game display 440 may also present information such as, but not limited to, player information, advertisements and casino promotions, graphic displays, news and sports updates, or may even offer an alternate game. This information may be generated through a host computer networked with gaming machine 400 on its own initiative, or it may be obtained by request of the player using either (1) one or more of the plurality of player-activated buttons 460; (2) the game display itself, if game display 440 comprises a touch screen or similar technology; (3) buttons (not shown) mounted on game display 440 which may permit selections such as those found on an ATM machine, where legends on the screen are associated with respective selecting buttons; or (4) any player input device that offers the required functionality.

Cabinet housing 420 incorporates a single game display 440. However, in alternate embodiments, cabinet housing 420 or top box 450 may house one or more additional displays 453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 35A:
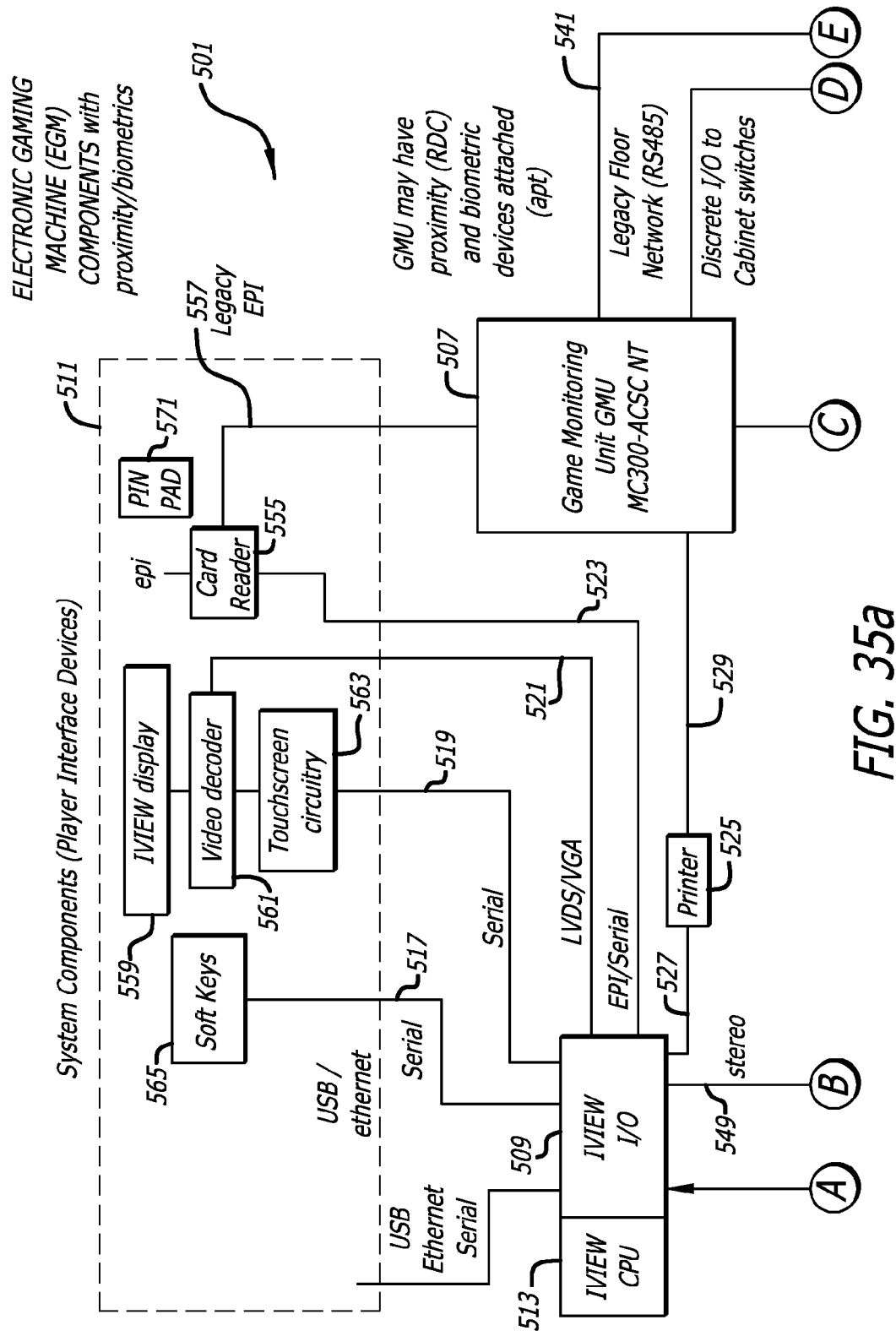
FIGS. 35a and 35b are block diagrams of the physical and logical components of the gaming machine of FIG. 33.
Figure 35B:
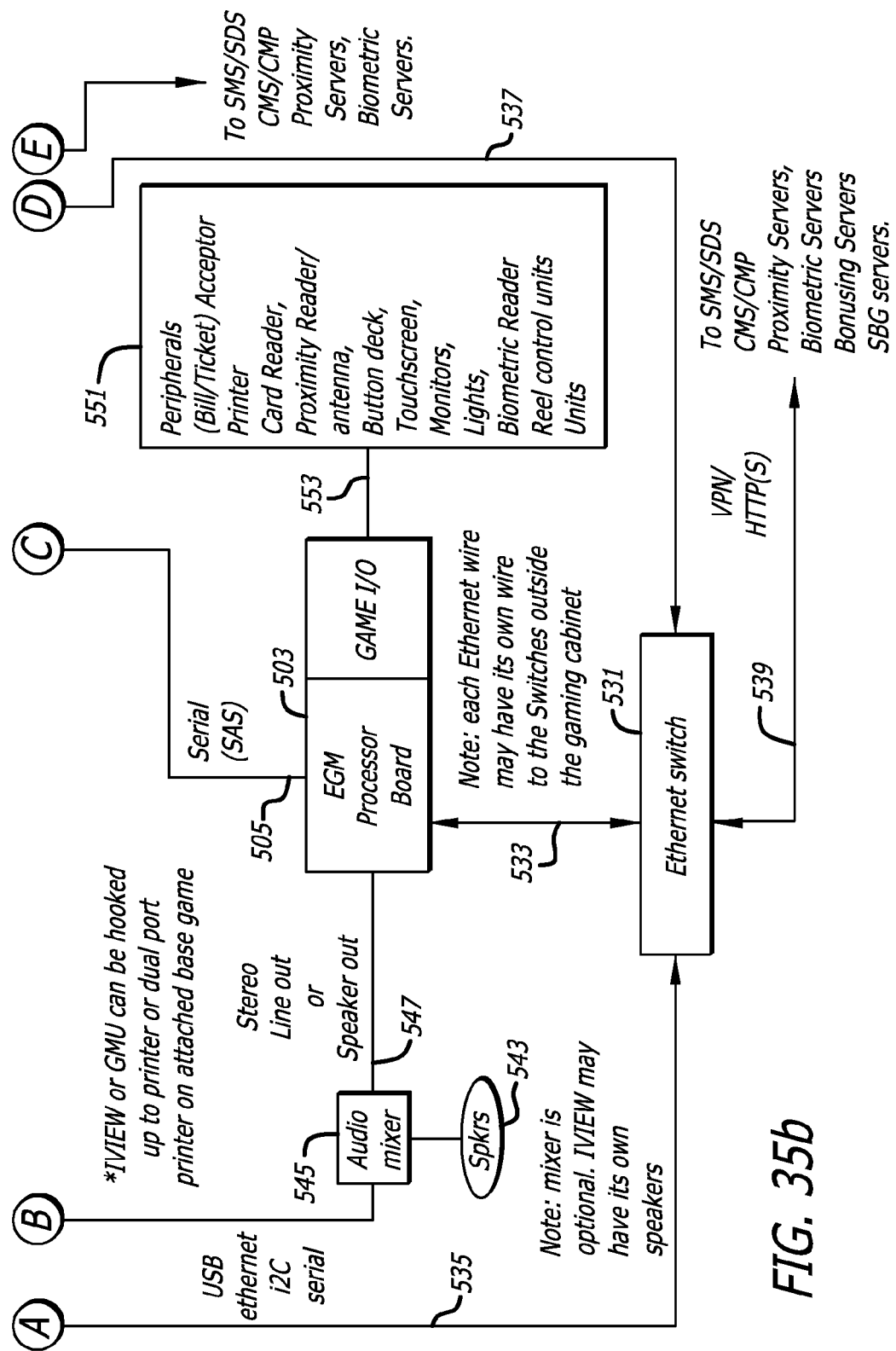

Referring to FIGS. 35a and 35b, electronic gaming machine 501 is shown in accordance with one or more embodiments. Electronic gaming machine 501 includes base game integrated circuit board 503 (EGM Processor Board) connected through serial bus line 505 to game monitoring unit (GMU) 507 (such as a Bally MC300 or ACSC NT), and player interface integrated circuit board (PIB) 509 connected to player interface devices 511 over bus lines 513, 515, 517, 519, 521, 523. Printer 525 is connected to PIB 509 and GMU 507 over bus lines 527, 529. EGM Processor Board 503, PIB 509, and GMU 507 connect to Ethernet switch 531 over bus lines 533, 535, 537. Ethernet switch 531 connects to a slot management system (SMS) and a casino management system (CMS) network over bus line 539. GMU 507 also may connect to the SMS and CMS network over bus line 541. Speakers 543 connect through audio mixer 545 and bus lines 547, 549 to EGM Processor Board 503 and PIB 509. The proximity and biometric devices and circuitry may be installed by upgrading a commercially available PIB 509, such as a Bally iVIEW unit. Coding executed on EGM Processor Board 503, PID 509, and/or GMU 507 may be upgraded to integrate a game having an interactive wheel game as is more fully described herein.

Peripherals 551 connect through bus 553 to EGM Processor Board 503. For example, a bill/ticket acceptor is typically connected to a game input-output board 553 which is, in turn, connected to a conventional central processing unit ("CPU") board 503, such as an Intel Pentium microprocessor mounted on a gaming motherboard. I/O board 553 may be connected to CPU processor board 503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 503 executes a game program that causes processor board 503 to play a game. In one embodiment, the game program provides a slot machine game having an interactive wheel feature game. The various components and included devices may be installed with conventionally and/or commercially available components, devices, and circuitry into a conventionally and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 553 to processor board 503 which, in turn, assigns an appropriate number of credits for play in accordance with the game program. The player may further control the operation of the gaming machine by way of other peripherals 551, for example, to select the amount to wager via electromechanical or touch screen buttons. The game starts in response to the player operating a start mechanism such as a handle or touch screen icon.

The game program includes a random number generator to provide a display of randomly selected indicia on one or more displays. In some embodiments, the random number generator may be physically separate from gaming machine 400. For example, it may be part of a central determination host system which provides random game outcomes to the game program. Thereafter, the player may or may not interact with the game through electromechanical or touch screen buttons to change the displayed indicia. Finally, processor board 503 under control of the game program and OS compares the final display of indicia to a pay table. The set of possible game outcomes may include a subset of outcomes related to the triggering of a feature game. In the event the displayed outcome is a member of this subset, processor board 503, under control of the game program and by way of I/O Board 553, may cause feature game play to be presented on a feature display.

Predetermined payout amounts for certain outcomes, including feature game outcomes, are stored as part of the game program. Such payout amounts are, in response to instructions from processor board 503, provided to the player in the form of coins, credits or currency via I/O board 553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board, a GMU processor, and memory including coding for network communications, such as the G2S (game-to-system) protocol from the Gaming Standards Association, Las Vegas, Nev., used for system communications over the network. As shown, GMU 507 may connect to card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509, which is operable as the player interface. PID 509 connects to card reader 555 through bus 523, display 559 through video decoder 561 and bus 521, such as an LVDS or VGA bus.

As part of its programming, the PID processor executes coding to drive display 559 and provides messages and information to a player. Touch screen circuitry interactively connects display 559 and video decoder 561 to PID 509, such that a player may input information and cause the information to be transmitted to PID 509 either on the player's initiative or responsive to a query by PID 509. Additionally, soft keys 565 connects through bus 517 to PID 509 and operates together with display 559 to provide information or queries to a player and receive responses or queries from the player. PID 509, in turn, communicates over the CMS/SMS network through Ethernet switch 531 and busses 535, 539 and with respective servers, such as a player tracking server.

Player interface devices 511 are linked into the virtual private network of the system components in gaming machine 501. The system components include the iVIEW processing board and game monitoring unit (GMU) processing board. These system components may connect over a network to the slot management system (such as a commercially-available Bally SDS/SMS) and/or casino management system (such as a commercially-available Bally CMP/CMS).

The GMU system component has a connection to the base game through a serial SAS connection and is connected to various servers using, for example, HTTPs over Ethernet. Through this connection, firmware, media, operating system software, or gaming machine configurations can be downloaded to the system components from the servers. This data is authenticated prior to installation on the system components.

The system components include the iVIEW processing board and game monitoring unit (GMU) processing board. The GMU and iVIEW can be combined into one like the commercially available Bally GTM iVIEW device. This device may have a video mixing technology to mix the EGM processor's video signals with the iVIEW display onto the top box monitor or any monitor on the gaming device.

Figure 36:
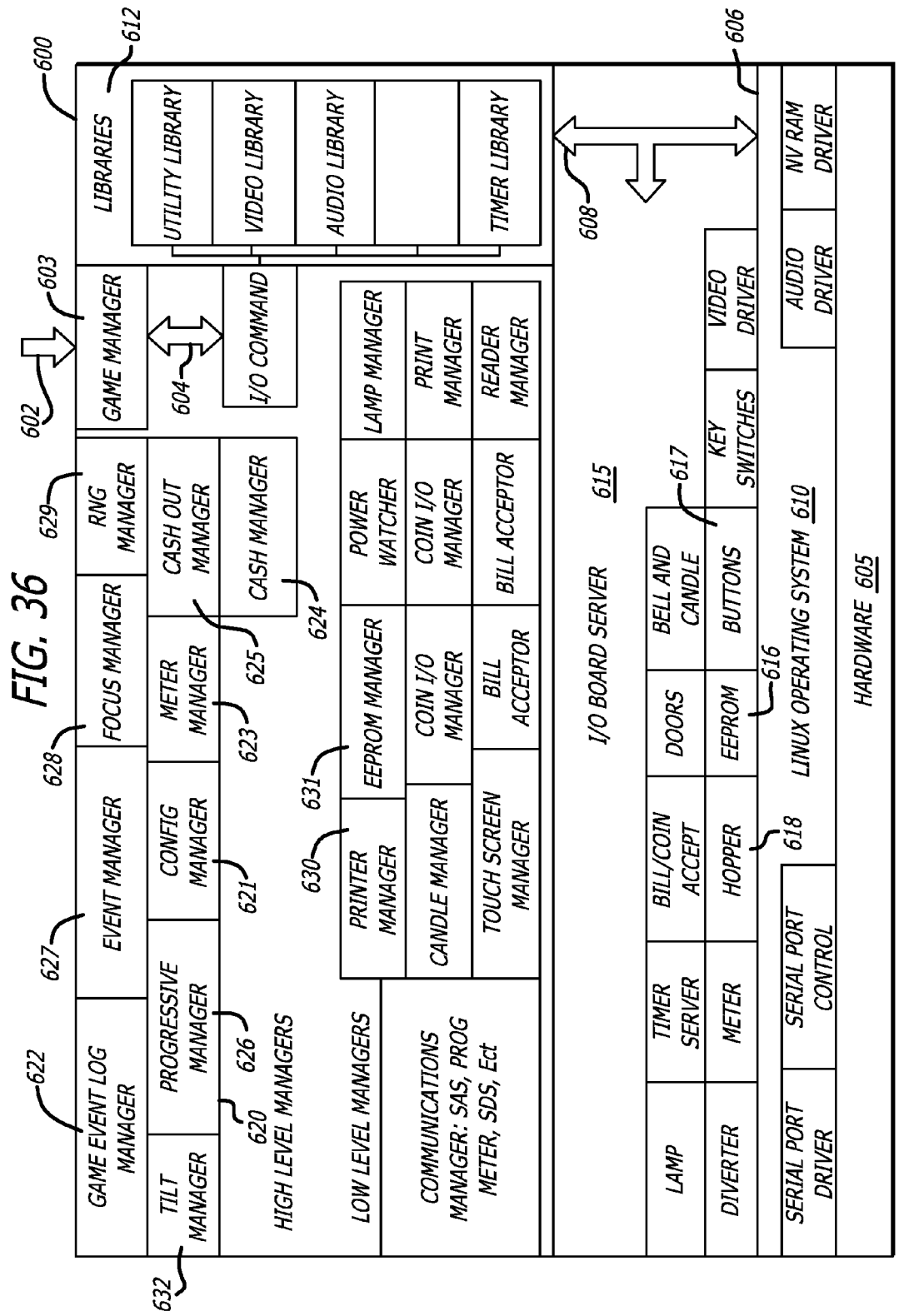
FIG. 36 is a block diagram of the logical components of a gaming kernel in accordance with one or more embodiments.

In accordance with one or more embodiments, FIG. 36 is a functional block diagram of a gaming kernel 600 of a game program under control of processor board 503, using gaming kernel 600 by calling it into application programming interface (API) 602, which is part of game manager 603. The components of game kernel 600, as shown in FIG. 36, are only illustrative and should not be considered limiting. For example, the number of managers may be changed, additional managers may be added or some managers may be removed without deviating from the scope and spirit of the disclosed system.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low-level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general, (ii) kept to a minimum, and (iii) easier to leave than extract. In such cases, the low-level communications are handled within operating system 610, and the content is passed to library routines 612.

Thus, in a few cases, library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 505 connected to a unique, relatively dumb, and as inexpensive as possible I/O adapter board 540, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able to make use of API 602 to use the capability over that of a cabinet having traditional monaural sound).

Game manager 603 provides an interface into game kernel 600, providing consistent, predictable, and backwards-compatible calling methods, syntax, and capabilities by way of game application API 602. This enables the game developer to be free of dealing directly with the hardware, including the freedom to not have to deal with low-level drivers as well as the freedom to not have to program lower-level managers 630, although lower-level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of upper level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started. The configuration manager 621 has the data needed to initialize and correctly configure other objects or servers.

The upper level managers 620 of game kernel 600 may include game event log manager 622 which provides, at the least, a logging or logger base class, enabling other logging objects to be derived from this base object. The logger object is a generic logger. Otherwise stated, the logger object is not aware of the contents of logged messages and events. The log manager's (622) job is to log events in non-volatile event log space. The size of the space may be fixed, although the size of the logged event is typically not. When the event space or log space fills up, one embodiment deletes the oldest logged event (each logged event has a time/date stamp, as well as other needed information such as length), providing space to record the new event. In this embodiment, the most recent events are found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters. The soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during startup, from configuration manager 621. While running, the cash-in (624) and cash-out (625) managers call the meter manager's (623) update functions to update the meters. Meter manager 623 will, on occasion, create backup copies of the soft meters by storing the soft meters' readings in EEPROM. This is accomplished by calling and using EEPROM manager 631.

In accordance with still other embodiments, progressive manager 626 manages progressive games playable from the game machine. Event manager 627 is generic, like log manager 622, and is used to manage various gaming machine events. Focus manager 628 correlates which process has control of various focus items. Tilt manager 632 is an object that receives a list of errors (if any) from configuration manager 621 at initialization, and during game play from processes, managers, drivers, and the like, that may generate errors. A random number generator manager 629 is provided to allow easy programming access to a random number generator (RNG), as an (RNG) is required in virtually all casino-style (gambling) games. The RNG manager 629 includes the capability of using multiple seeds.

In accordance with one or more embodiments, a credit manager object (not shown) manages the current state of credits (cash value or cash equivalent) in the game machine, including any available winnings, and further provides denomination conversion services. Cash-out manager 625 has the responsibility of configuring and managing monetary output devices. During initialization, cash out manager 625, using data from configuration manager 621, sets the cash-out devices correctly and selects any selectable cash-out denominations. During play, a game application may post a cash-out event through the event manager 627 (the same way all events are handled), and using a callback posted by cash-out manager 625, and cash-out manager 625 is informed of the event. Cash-out manager 625 updates the credit object, updates its state in non-volatile memory, and sends an appropriate control message to the device manager that corresponds to the dispensing device. As the device dispenses dispensable media, there typically are event messages being sent back and forth between the device and cash-out manager 625 until the dispensing finishes. After the dispensing finishes, the cash-out manager 625, having updated the credit manager and any other game state (such as some associated with meter manager 623) that needs to be updated for this set of actions, sends a cash-out completion event to event manager 627 and to the game application thereby. The cash-in manager 624 functions similarly to cash-out manager 625, addressing requirements for controlling, interfacing, and managing actions associated with cashing in events, cash-in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of an 8-bit command, and data writes to the EEPROM device to write the appropriate data in the proper location within the device. Any errors detected are sent as IPC messages to game manager 603. Preferably, all of this processing is asynchronously performed.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have an intelligently-distributed I/O which debounces the buttons, in which case button module 617 may be able to communicate with the remote intelligent button processor to retrieve the button events and simply relay them to game manager 603 via IPC messages. In still another embodiment, the I/O library may be used for pay-out requests from the game application. For example, hopper module 618 must start the hopper motor, constantly monitoring the coin sensing lines of the hopper, debounce them, and send an IPC message to the game manager 603 when each coin is paid.

Further details, including disclosure of lower-level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional application are both fully incorporated herein by explicit reference.

Figure 37A:
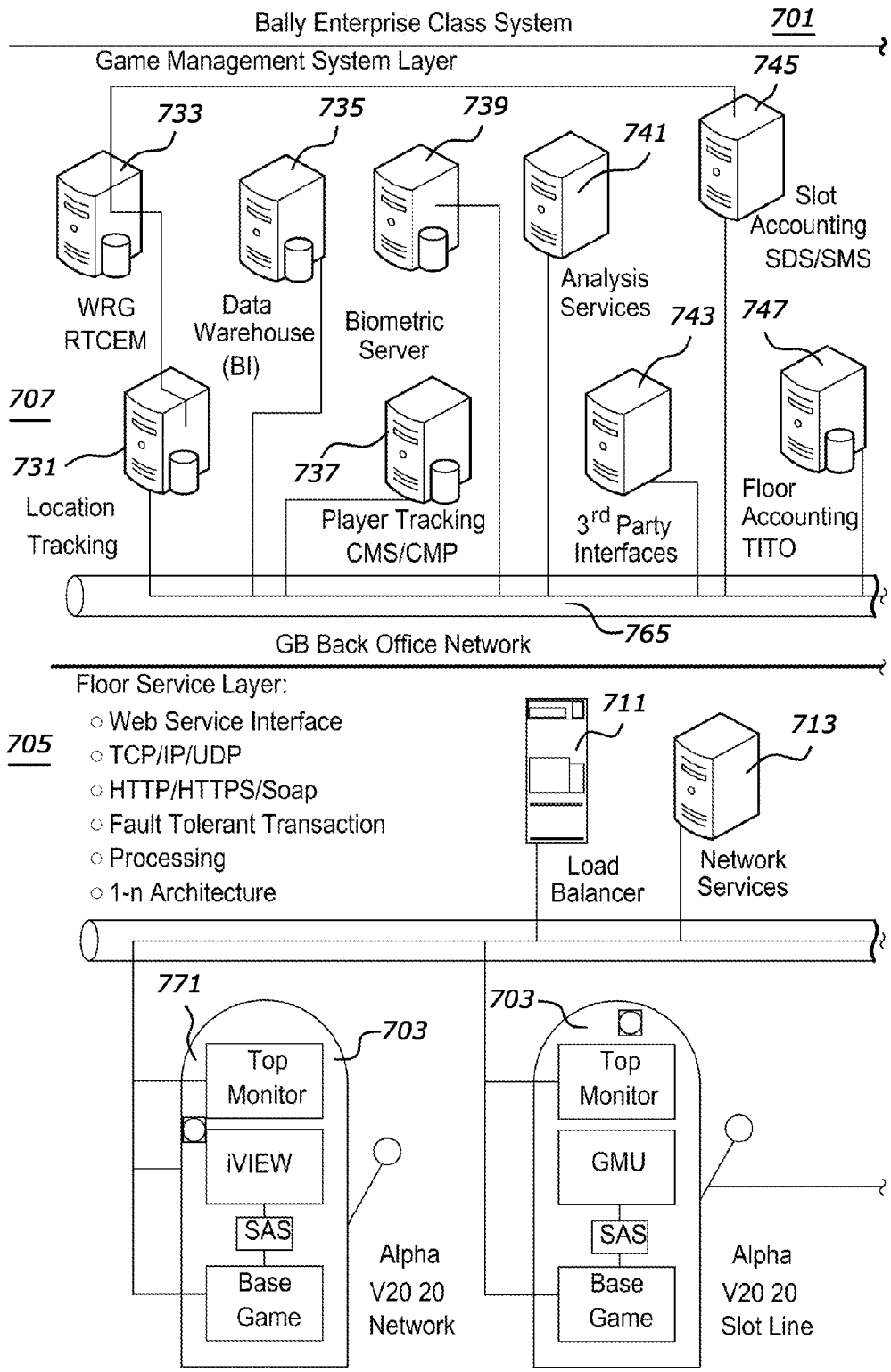
FIGS. 37a and 37b are schematic block diagrams showing the hardware elements of a networked gaming system in accordance with one or more embodiments.
Figure 37B:
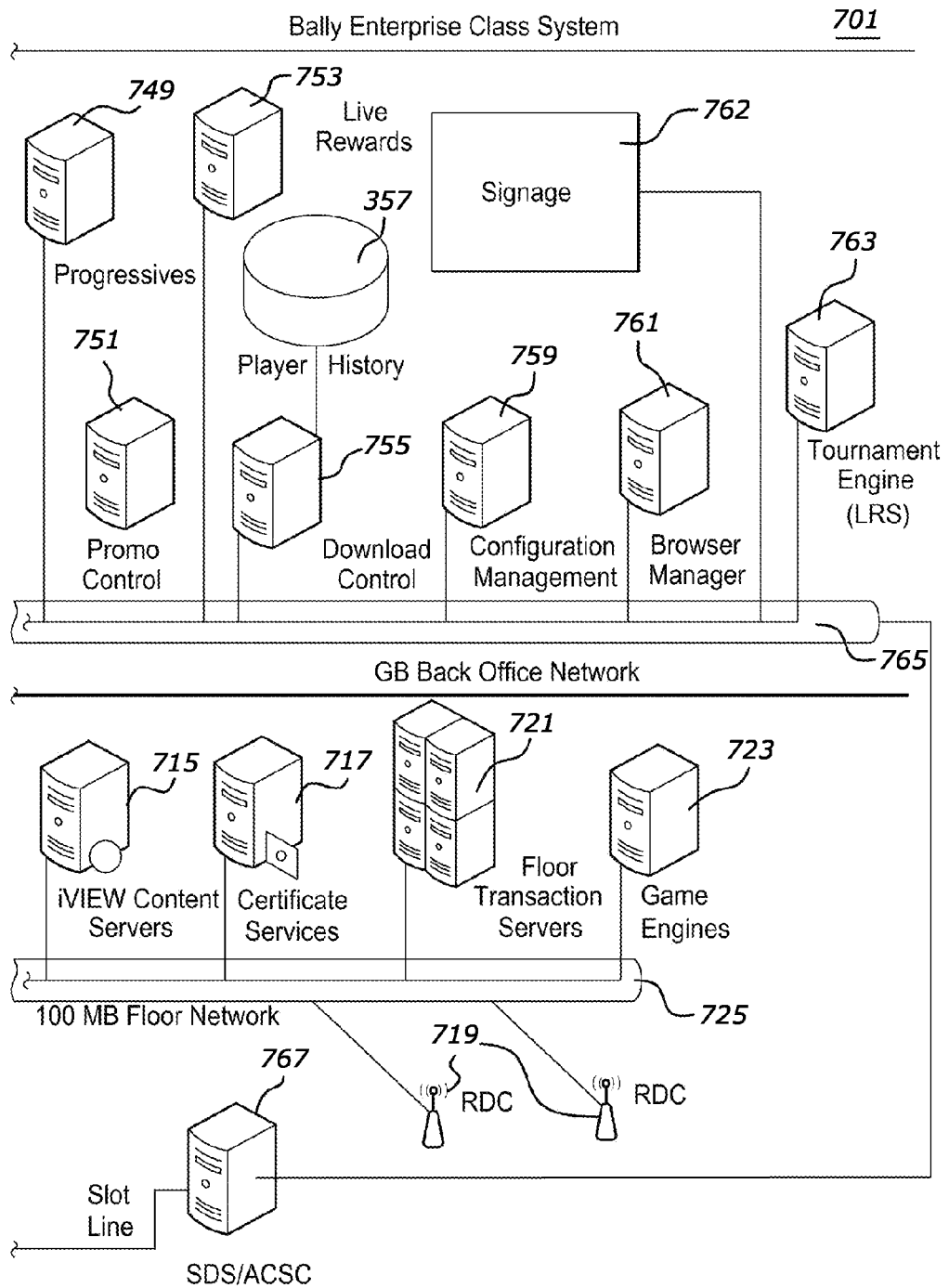

Referring to FIGS. 37a and 37b, enterprise gaming system 701 is shown in accordance with one or more embodiments. Enterprise gaming system 701 may include one casino or multiple locations and generally includes a network of gaming machines 703, floor management system (SMS) 705, and casino management system (CMS) 707. SMS 705 may include load balancer 711, network services servers 713, player interface (iVIEW) content servers 715, certificate services server 717, floor radio dispatch receiver/transmitters (RDC) 719, floor transaction servers 721 and game engines 723, each of which may connect over network bus 725 to gaming machines 703. CMS 707 may include location tracking server 731, WRG RTCEM server 733, data warehouse server 735, player tracking server 737, biometric server 739, analysis services server 741, third party interface server 743, slot accounting server 745, floor accounting server 747, progressives server 749, promo control server 751, bonus game (such as Bally Live Rewards) server 753, download control server 755, player history database 757, configuration management server 759, browser manager 761, tournament engine server 763 connecting through bus 765 to server host 767 and gaming machines 703.

The various servers and gaming machines 703 may connect to the network with various conventional network connections (such as, for example, USB, serial, parallel, RS485, and Ethernet). Additional servers which may be incorporated with CMS 707 include a responsible gaming limit server (not shown), advertisement server (not shown), and a control station server (not shown) where an operator or authorized personnel may select options and input new programming to adjust each of the respective servers and gaming machines 703. SMS 705 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases is maintained and utilized in performing their respective functions.

Gaming machines 703 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 707 and/or SMS 305 servers and devices, firmware, media, operating systems, and configurations may be downloaded to the system components of respective gaming machines for upgrading or managing floor content and offerings in accordance with operator selections or automatically depending upon CMS 707 and SMS 705 master programming. The data and programming updates to gaming machines 703 are authenticated using conventional techniques prior to installation on the system components.

In various embodiments, any of the gaming machines 703 may be a mechanical reel spinning slot machine, video slot machine, video poker machine, video bingo machine, keno machine, or a gaming machine offering one or more of the above-described games including an interactive wheel feature. Alternately, gaming machines 703 may provide a game with an accumulation-style feature game as one of a set of multiple primary games selected for play by a random number generator, as described above. A gaming system of the type described above also allows a plurality of games in accordance with the various embodiments to be linked under the control of a group game server (not shown) for cooperative or competitive play in a particular area, carousel, casino or between casinos located in geographically separate areas. For example, one or more examples of group games under the control of a group game server are disclosed in U.S. application Ser. No. 11/938,079, entitled "Networked System and Method for Group Gaming," filed on Nov. 9, 2007, which is hereby incorporated by reference in its entirety for all purposes.

System and Method for Augmented Translation of Gaming Content:

Embodiments disclosed herein utilize various different types of augmented reality technology. One such example of augmented reality technology enables a mobile device to overlay rendered 3D objects over a live video image being captured in real-time by the mobile device's camera. Notably, the 3D objects maintain a consistent appearance as the camera moves, so "augmented reality" effects are produced.

Such embodiments of augmented reality technology analyze each image as it is captured, and determining the presence (or not) of one or more "tags." Typically, a tag is a 2D image. In tradition implementation of augmented reality technology, a tag is a physically printed, non-animated (i.e., static) image.

Some embodiments of the System and Method for Augmented Translation of Gaming Content also interact well with tags that are displayed on an LCD screen (in contrast to physically printed images. Accordingly, the System and Method for Augmented Translation of Gaming Content may be incorporated into video gaming systems and methods.

Figure 38:
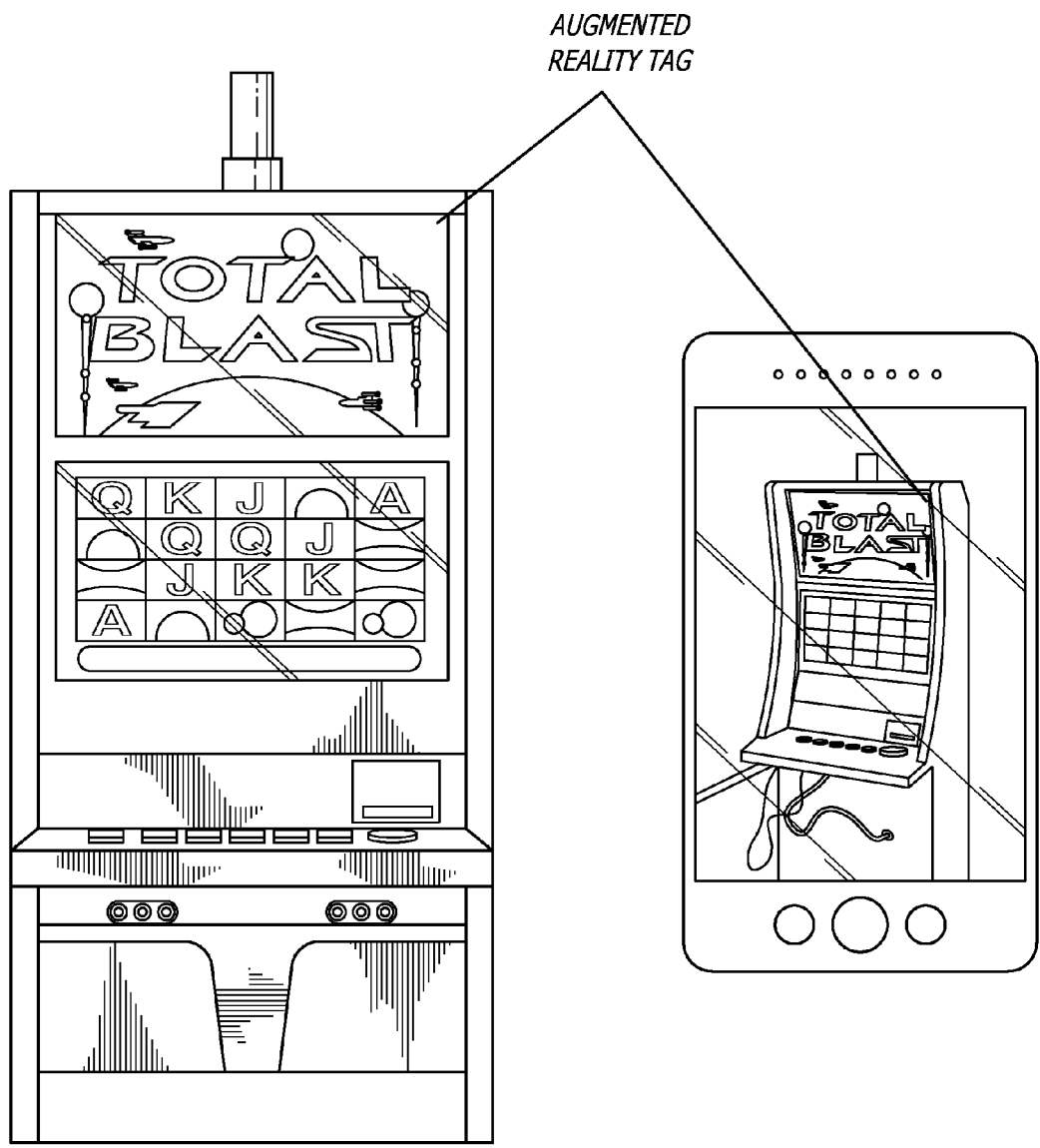
FIG. 38 illustrates an embodiment that shows augmented reality from user's perspective.

FIG. 38 shows an example of how a user may operate the augmented reality system. In one embodiment, the user starts up a custom application on their mobile device (e.g., smartphone). This application is loaded with a set of one or more image tags. In the embodiment shown in FIG. 38, illustrates the top glass artwork of "Total Blast." The application makes calls to the augmented reality technology SDK (Software Developers Kit) to determine if a tag is present in the current live camera image, and if so, the SDK returns the position of the tag relative to the user in 3D space.

In this embodiment of the System and Method for Augmented Translation of Gaming Content, augmented reality image tags are used to provide language translation. This is a function that is otherwise difficult to retrofit to existing games. FIG. 39 illustrates a help screen from a game (e.g., "Total Blast"). As shipped, this particular game includes a number of help screens, all of which are in English. For some games, multiple language versions of help screens are developed, and a particular language may be configured by the operator. This is not practical; however, for some markets. For example, this is not particle in South America, since it may be difficult to go back to games that were developed some time ago and insert new versions of help screens. Changing help screens also requires re-approval of game content by gaming regulators, which maybe expensive and onerous.

A further problem occurs when a player is outside of their native country, or does not adequately speak the language of the country in which they are playing a game. Some previous solutions have relied upon having a menu of languages from which a player may choose, but for the above-mentioned approval reasons (e.g., regulatory re-approval, and the like), this requires all versions of help screens in the anticipated languages to be installed at the initial time of game development. This solution is expensive and wasteful because a high proportion of games are not successful, and do not reach a wide enough audience to warrant the cost of producing translated help screens. This type of activity also undesirably extends game development time.

This embodiment of the System and Method for Augmented Translation of Gaming Content overcomes these issues by enabling a game developer to retrospectively produce translated help screen text, without requiring a game to be re-approved or modified in any way. In one such embodiment, a player is provided with an application to be loaded onto their mobile device (e.g., smartphone, tablet, or the like). This application (which is a component of the System and Method for Augmented Translation of Gaming Content) may be targeted at a particular game, or more likely at a range of games. In some embodiments, at least 100 different image tags may be supported in a phone-based database.

Figure 44:
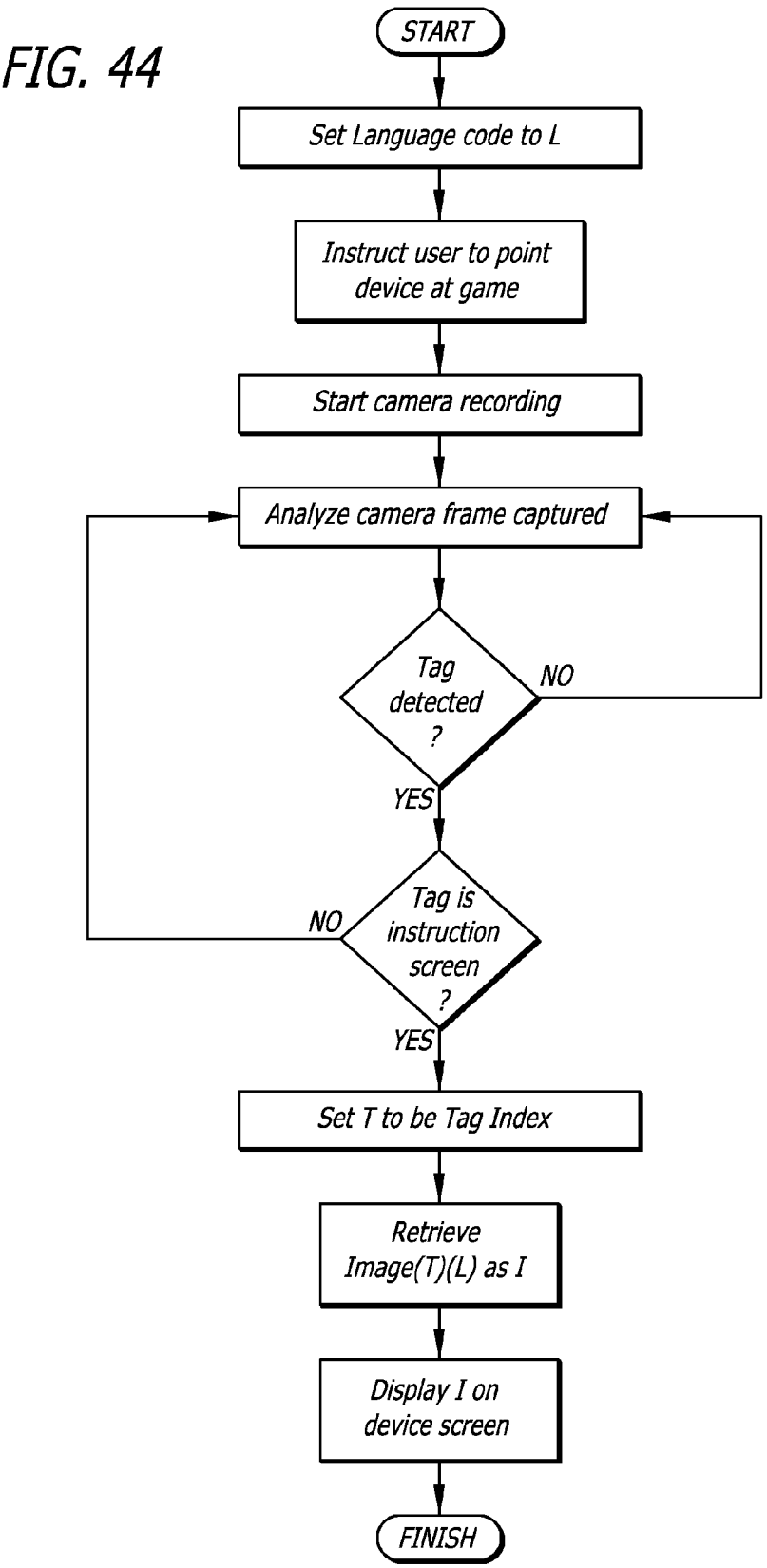
FIG. 44 is a logic flow diagram that shows translation with augmented reality.

Referring now to FIG. 44, an embodiment of the System and Method for Augmented Translation of Gaming Content in operation. Initially, a user downloads or obtains the application from a gaming machine manufacturer or operator. Next, the user sets their desired language preference. This action in turn derives an index value that is inserted into a table, which is shown in FIG. 44 by the reference "L."

Figure 41:
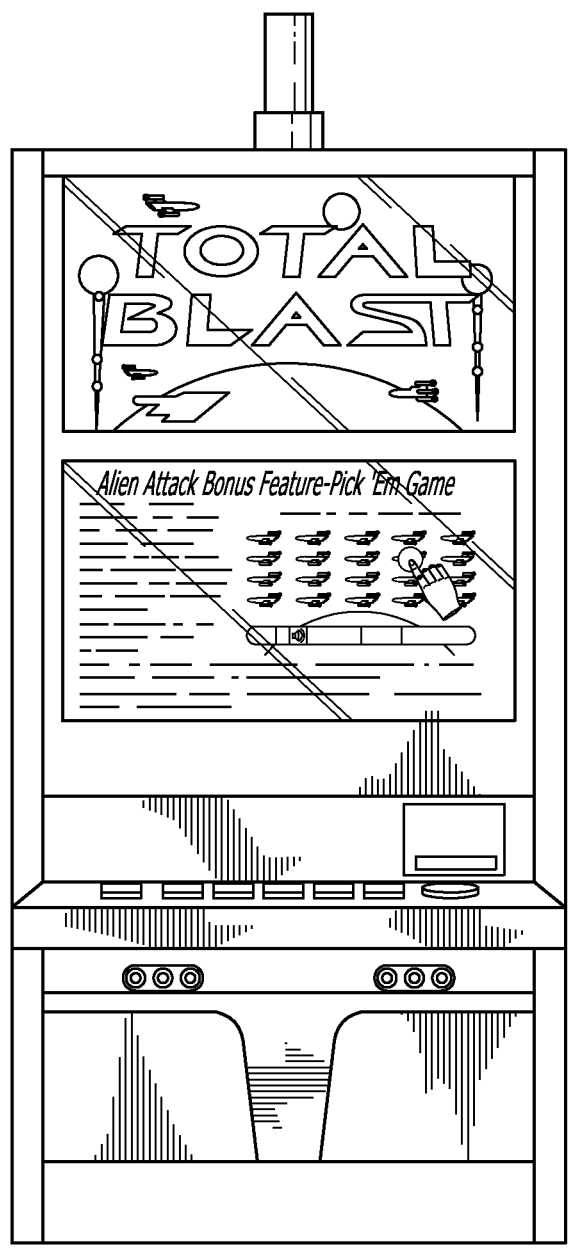
FIG. 41 illustrates an embodiment that shows a cabinet with a help screen to be augmented.

Continuing, in this embodiment of the System and Method for Augmented Translation of Gaming Content the user then begins playing a game. At a point when the user would like to access a help screen, they select the "help" touchscreen button. This typically launches an English help screen (as shown in FIG. 41). In this scenario, the user's native language is Spanish. As such, the user would like the help screen to be translated to Spanish. To accomplish this task, the user activates the translation application (which is a component of the System and Method for Augmented Translation of Gaming Content) or enters a "translation" mode of the translation application. The translation application instructs the user to direct the camera of the mobile device (e.g., smartphone, tablet, or the like) at the game screen.

The translation application then begins recording the camera input from the live video feed. Each frame of camera video is captured and analyzed by the translation application. In one non-limiting embodiment, a Vuforia™ module may be used. The System and Method for Augmented Translation of Gaming Content checks for the presence of any image tags, and if present, returns an associated image tag value to the translation application.

Figure 42:
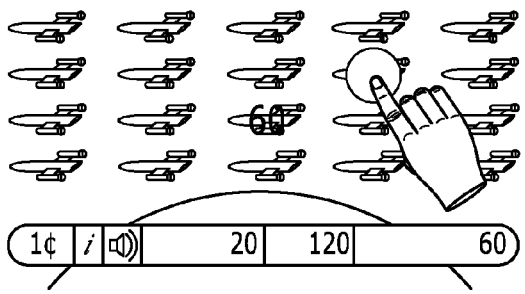
FIG. 42 illustrates an embodiment that shows a Translated Help Screen.

FIG. 40 shows an example of image tag data. This image tag may be derived from the help screen shown in FIG. 39. Typically, it is produced offline before the translation application is deployed. In another embodiment, the translation application may periodically download an updated database of image tags and corresponding translated images. If an image tag is recognized that is a known help screen, the tag index "T" and language index value "L" are used to look up a suitable translated help screen, such as shown in FIG. 42.

Figure 43:
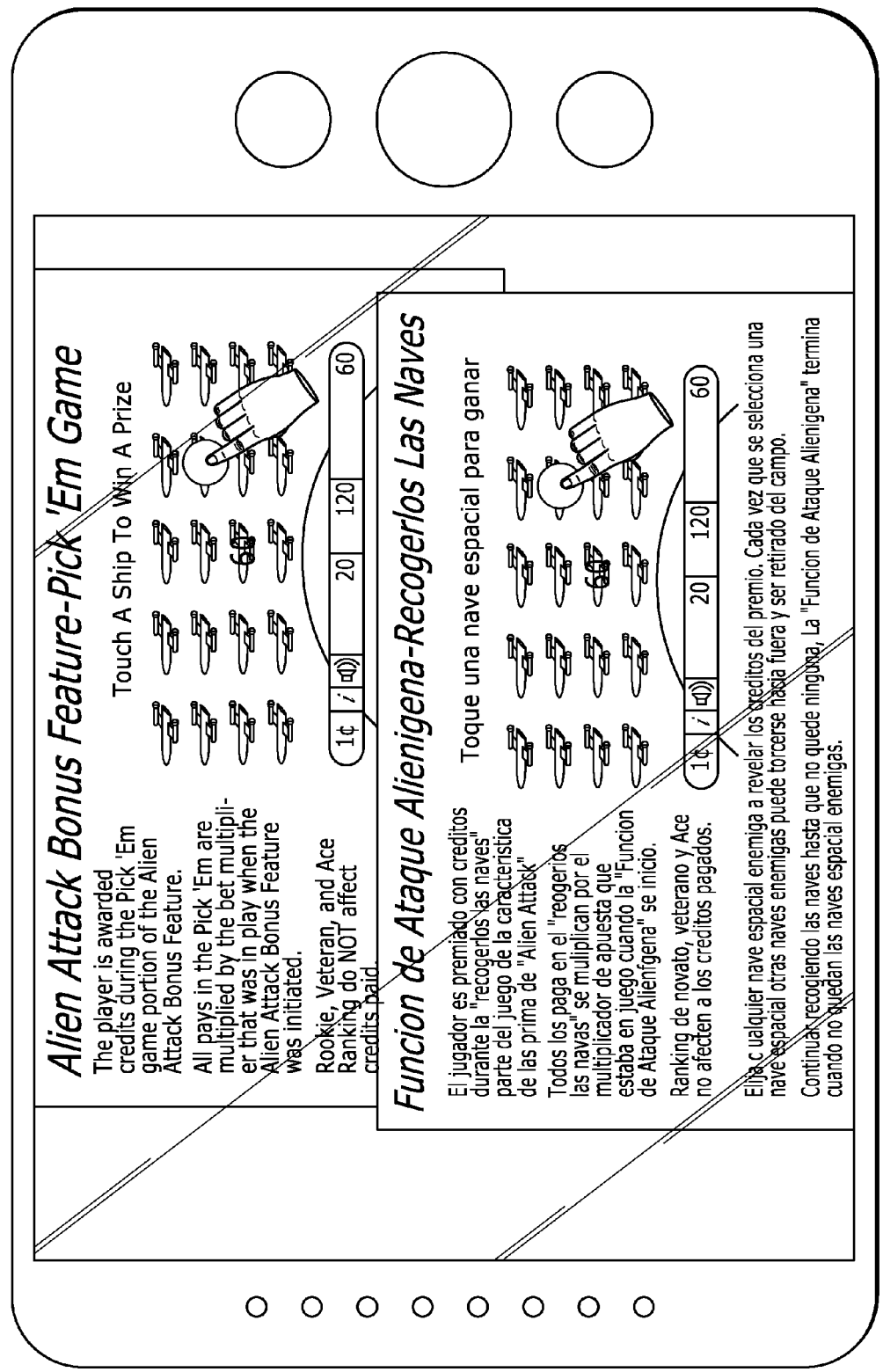
FIG. 43 illustrates an embodiment that shows an augmentation from user's perspective.

In one embodiment of the System and Method for Augmented Translation of Gaming Content, this help screen is then overlaid onto the smartphone or tablet, as shown in FIG. 43. Notably, from a user's perspective, the only action that required was to hold up a mobile device and direct it towards a gaming machine. No understanding of the English language or complex operations are required.

Figure 45:
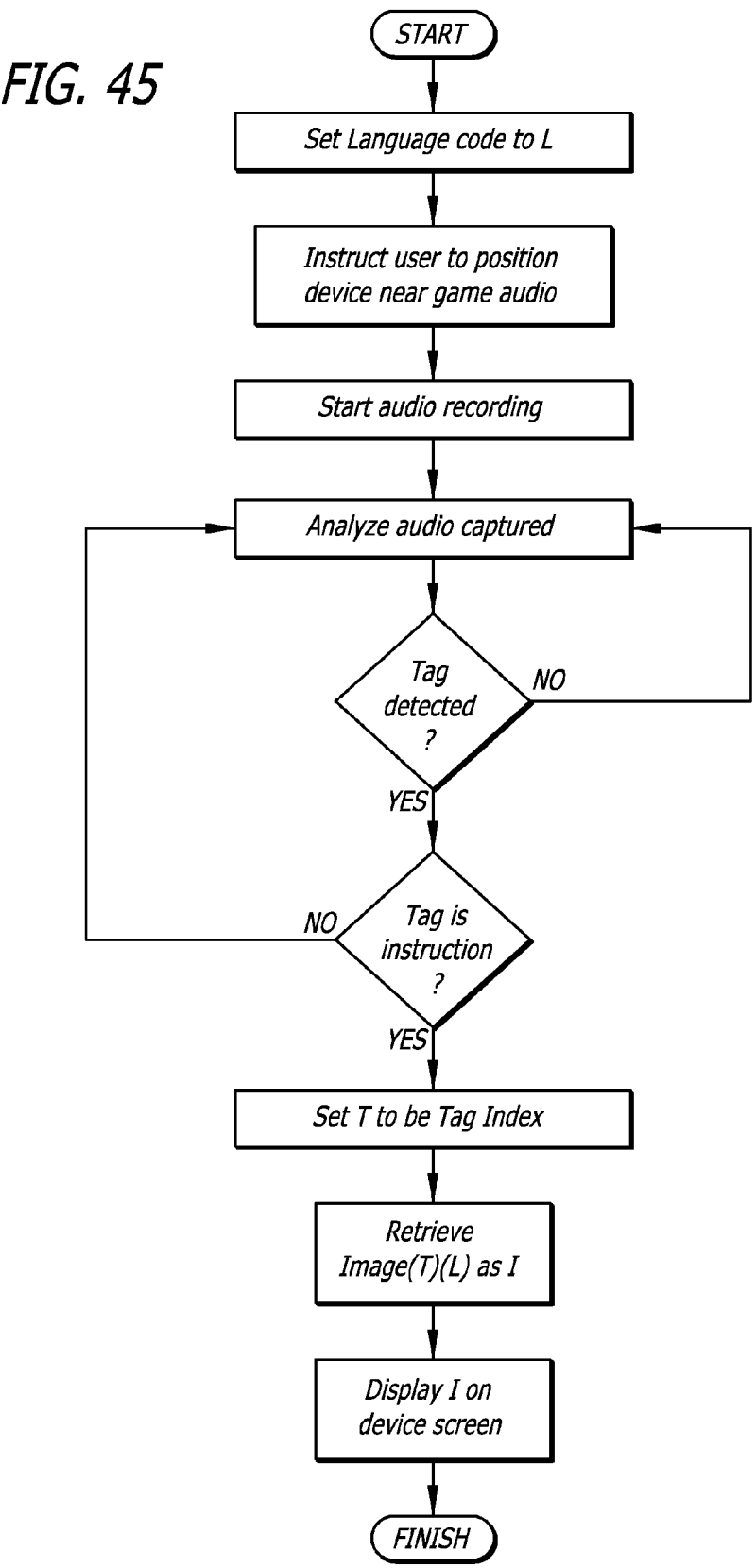
FIG. 45 is a logic flow diagram that shows augmentation using audio.

FIG. 45 shows another of the System and Method for Augmented Translation of Gaming Content that employs audio signatures rather than augmented reality. Particular sounds or segments of music may be identified by software algorithms. An example of such an application that performs this is type of audio recognition is the application, "Shazam." This application is available for most smartphones. The application "Shazam" enables a user to identify a music track by sampling the audio for a few seconds, and then using this sample to generate an audio signature. This audio signature is then compared against a database. If a match is made between the audio signature and the information in the database, then the corresponding music track information (e.g., artist, album, genre) is retrieved for the user.

In one embodiment of the System and Method for Augmented Translation of Gaming Content, audio events in an existing game are encoded into signatures. For example, in one such embodiment, the audio of the "Spin the Wheel" game is played during the "Cash Spin" bonus round. In another embodiment, a musical sample from a Michael Jackson track may be played at the beginning of a bonus round.

FIG. 45 shows another of the System and Method for Augmented Translation of Gaming Content that follows a similar process to the previously-described, image-based process. In this embodiment, when the sound signature (or tag) is detected, the application on the mobile device (e.g., smartphone, tablet, or the like) is able to provide a translation for the user. This translation may be either video or audio-based. Accordingly, while the audio tag may be a musical sample, the translation may be text-based instructions. In the example using a Michael Jackson song, the audio from the song "Smooth Criminal" may prompt the smartphone to tell the user to "touch and slide" the wheel. This prompt may also incorporate the use of a video representation to aid in the understanding of the message being delivered.

Some embodiments of the System and Method for Augmented Translation of Gaming Content disclosed herein do not require re-approval of gaming content needed to deploy alternative languages. Additionally, the disclosed system is very user-friendly for a player. Notably, the disclosed system leverages existing mobile devices, such as smartphones/tablets (e.g., requires no hardware cost to an operator or manufacturer to deploy. Continuing, the disclosed system enables players to receive translations of games outside of their native country. In another aspect of the disclosed system, existing games may be retrofitted with translations after the games are proven successful, or many years later when deployed in a secondary market.

One specific, non-limiting embodiment of the System and Method for Augmented Translation of Gaming Content employs: a Qualcomm™ Vuforia™ SDK with Unity plugin; an Android or Apple smartphone/tablet with a rear-facing camera and ARM processor (almost all current Android/Apple phones are adequate); and a video gaming machine with LCD or other flatscreen displays. Additionally, some embodiments of the System and Method for Augmented Translation of Gaming Content disclosed herein incorporate (1) the use of video tags as opposed to printed material; (2)

the translation of gaming content without modification of gaming machine software or hardware; (3) the use of audio signatures in addition to image tags.

Figure 46:
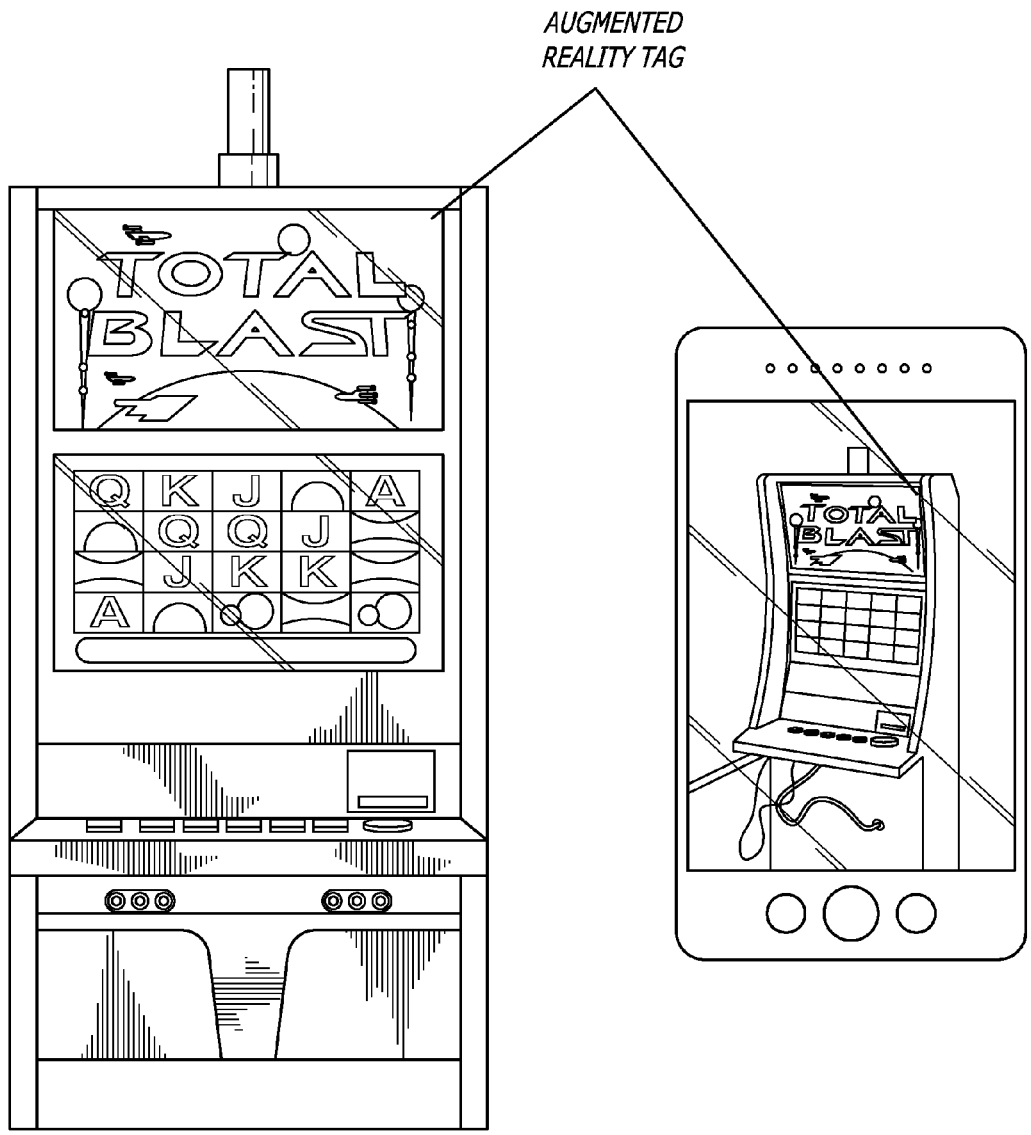
FIG. 46 illustrates an embodiment that shows augmented reality from a user's perspective.
Figure 47:
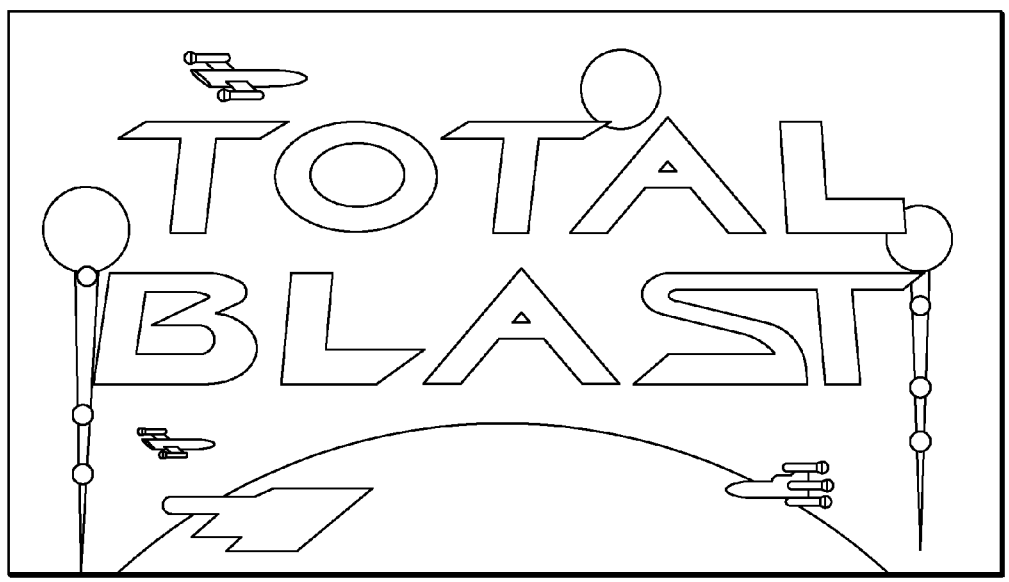
FIG. 47 illustrates an embodiment that shows a Total Blast top glass artwork.
Figure 48:
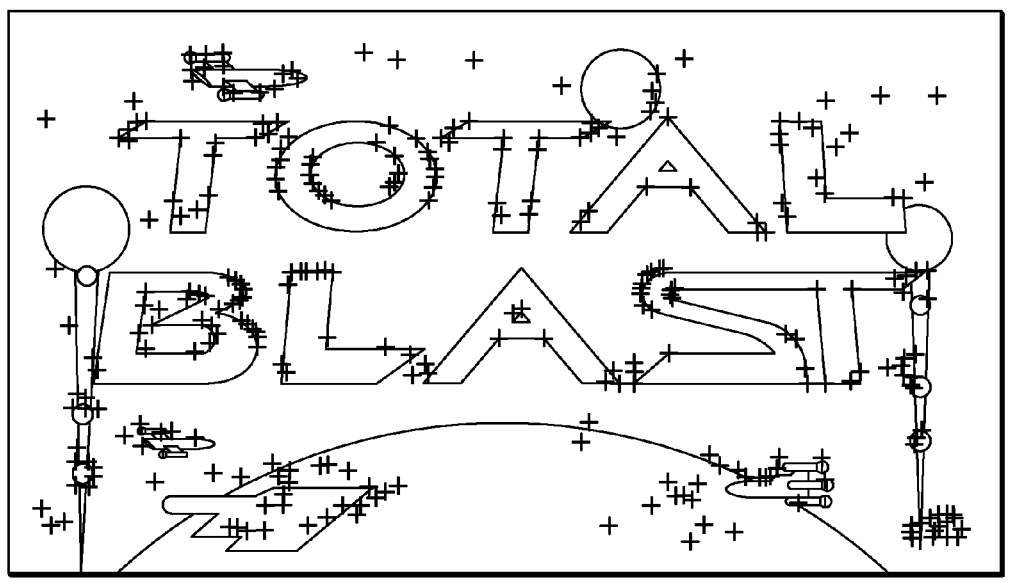
FIG. 48 illustrates an embodiment that shows a Total Blast top glass artwork encoded as an augmented reality tag.
Figure 49:
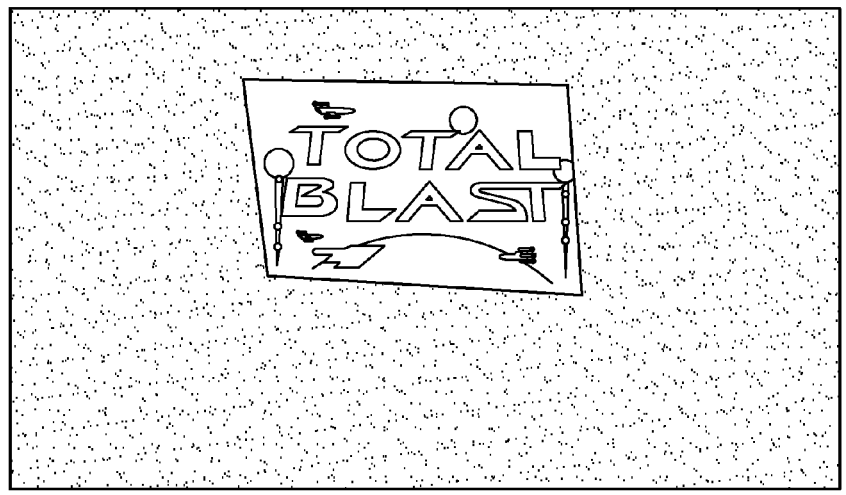
FIG. 49 illustrates an embodiment that shows a simple augmentation to enhance a Total Blast cabinet.

Augmented Reality with Interaction Between Real and Virtual Objects:

Referring now to FIG. 47, in traditional augmented reality techniques, a developer encodes an image "tag" to produce data. As shown in FIG. 48, the augmented reality module can use this data to locate and orient the tag from a live camera video feed. This camera video feed is normally generated by a camera in a mobile device (e.g., smartphone, PDA, or tablet). In this regard, the user is able to point their mobile device at an image tag and receive an augmented display on their mobile device, with 3D objects overlaying the camera video feed. An example of this type of 3D object overlay in a camera video feed is shown in FIG. 46.

Conventionally, image tags are printed onto paper rather than displayed on a video screen. Accordingly, the image tag may be viewed as simply a surface, with no reference to any other physical object. In this manner, the image tag may be displayed on a video screen at a known position within a gaming machine cabinet.

Figure 50:
FIG. 50 illustrates an embodiment that shows an augmentation result of a simple example.

Referring now to FIG. 48, a simple augmentation is shown. In this example, the 3D extruded text "Cold Game" is displayed to the user whenever an image tag is behind it. The virtual glass artwork is detected by the Augmented Reality technology. This is used by a casino to market a particular game, set of games, or even a particular gaming machine if the gaming machine is uniquely identified. FIG. 50 shows the result of this augmentation. Notably, in this embodiment, if the user moves the camera, the "Cold Game" text moves with the tag, and the effect on a player looking at the mobile device is as if the "Cold Game" text was actually present in the real world.

Figure 51:
FIG. 51 illustrates an embodiment that shows Complex 3D elements to augment a Total Blast cabinet.
Figure 52:
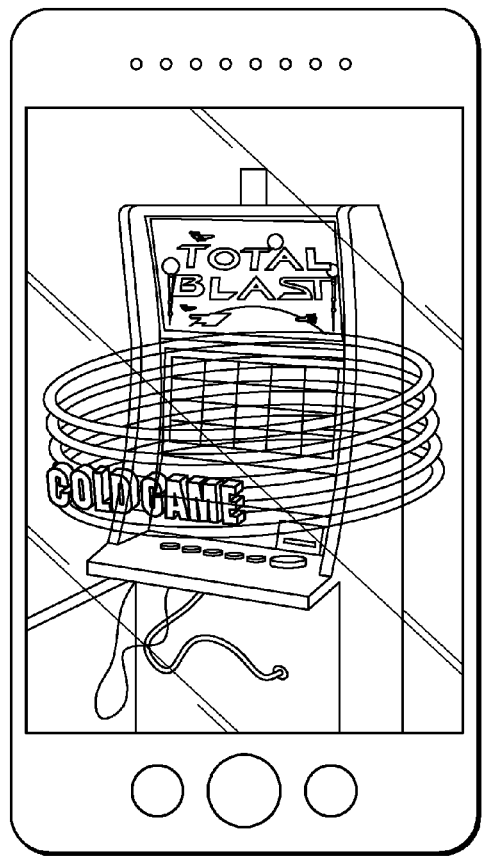
FIG. 52 illustrates an embodiment that shows an augmentation result using existing technology.

However, there are significant limitations with this approach, which may be seen with reference to FIG. 51. In FIG. 51, the "Cold Game" text is displayed on a set of 3D rings. The rings are sized in proportion to the "Total Blast" artwork that surrounds the gaming machine cabinet. If these 3D elements are used in an augmented reality application, the result is as shown in FIG. 52, namely, the rings do not go behind the cabinet. The reason that the rings do not go behind the cabinet is because there is no way for the augmented reality technology to interpret the physical presence of the cabinet (since the actual cabinet in FIG. 52 is merely a 2D camera image). Accordingly, conventional augmented reality solutions are limited to only overlaying 3D elements on a 2D image. These conventional augmented reality solutions are unable to display 3D elements interacting with a 2D image of an actual 3D object.

Figure 53:
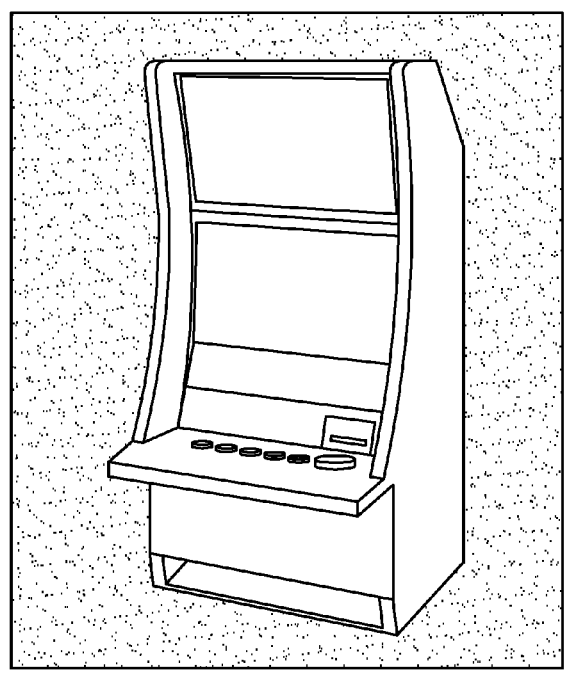
FIG. 53 illustrates an embodiment that shows a CAD model of an Alpha 2 cabinet.

Referring now to FIG. 53, the 3D/2D interaction system 5300 incorporates the use of spatial information with respect to the gaming machine cabinet. Specifically, the 3D/2D interaction system 5300 incorporates the use of spatial information with respect to the top box (and its artwork), which is mounted to a gaming machine cabinet. FIG. 53 illustrates a CAD model of such a gaming machine cabinet that contains spatial parameters.

FIG. 53 was rendered using a 3D design system, which is useful for rendering the 3D design concept of a depth (or z-axis) buffer. A depth buffer is generated during 3D rendering. In one embodiment, the depth buffer decides which elements of a 3D rendering are visible to a virtual camera. As each element (which are typically triangles or quads in 3D rendering) of a 3D model is drawn, before each pixel of the element is drawn. In this manner, the z-value of each element is compared against an existing depth buffer z-value at the same screen co-ordinate. If the existing z-value is greater, then this pixel is determined to be nearer, and the pixel is drawn accordingly. The z-buffer value is then updated to this pixel's z-value. However, if the existing z-value is less than an existing depth buffer z-value at the same screen co-ordinate, then this pixel is discarded and not drawn, since the pixel is determined to be behind the gaming machine cabinet (or other object of reference), and thus, is not viewable.

Figure 54:
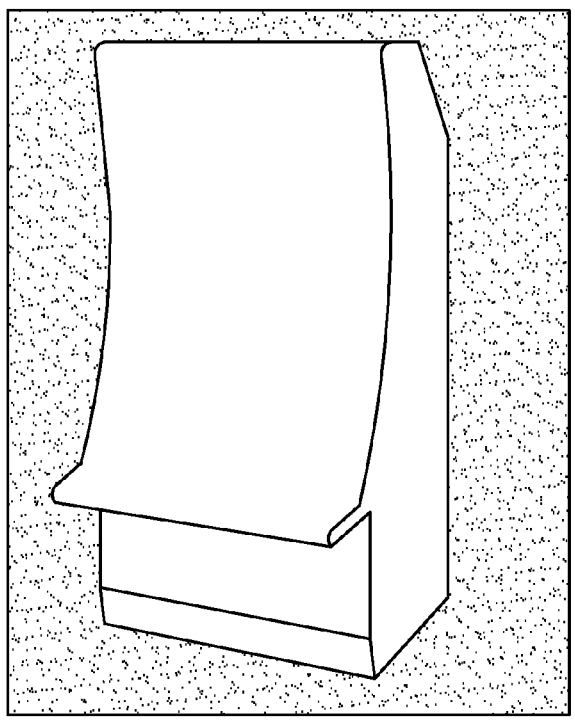
FIG. 54 illustrates an embodiment that shows a Depth buffer channel produced by rendering a CAD model.

Referring now to FIG. 54, the contents of a depth buffer for the CAD cabinet are shown from FIG. 53. Each z-value is rendered as intensity. Accordingly, in this embodiment a small value is shown as very dark or black, and a high value is pale or white. In this manner, a depth buffer of the 3D/2D interaction system 5300 enables images with 3D elements to have areas masked. In another aspect of this embodiment, these 3D elements need not be visible.

Figure 55:
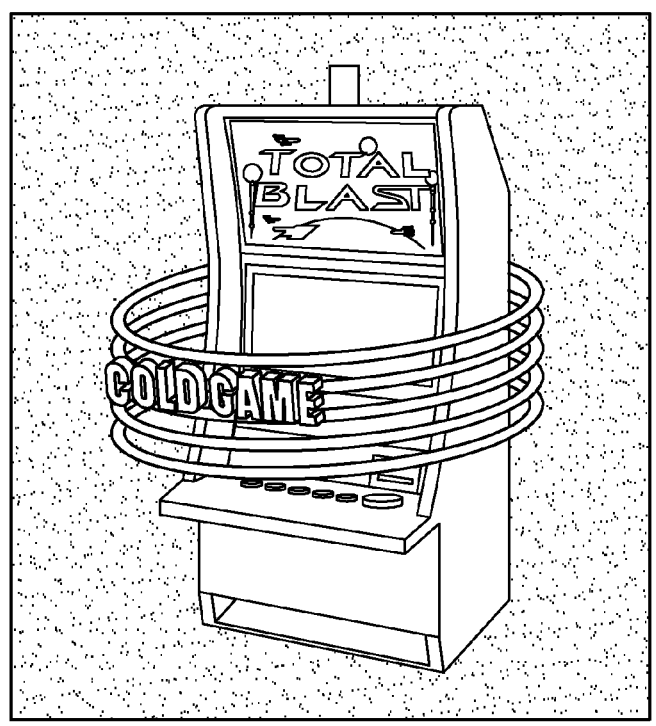
FIG. 55 illustrates an embodiment that shows a Low polygon version of a CAD cabinet interacting with augmented elements.
Figure 56:
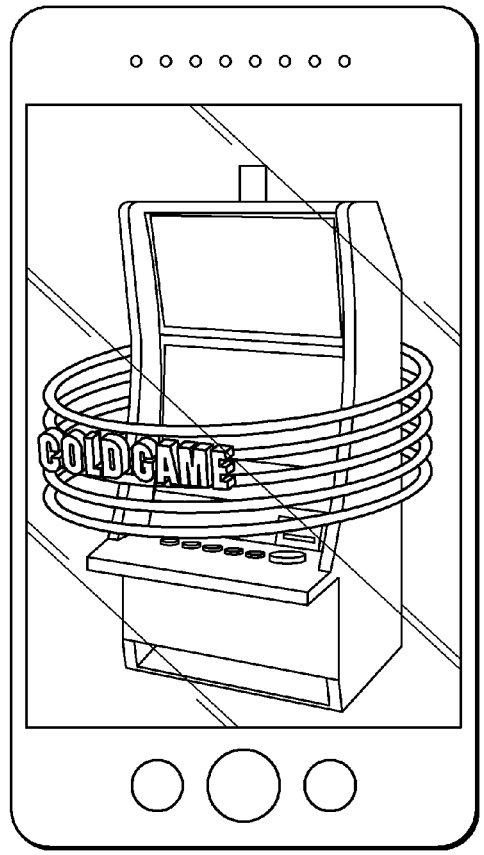
FIG. 56 illustrates an embodiment that shows a Low polygon model of a CAD cabinet augmentation.

In such an embodiment of the 3D/2D interaction system 5300, a CAD (Computer Aided Design) model of a gaming machine cabinet is accessible. As shown in FIG. 55, the CAD model is turned into a low-polygon representation. FIG. 56 shows an effect that may be achieved when this CAD model is rendered in the augmented reality system.

Figure 59:
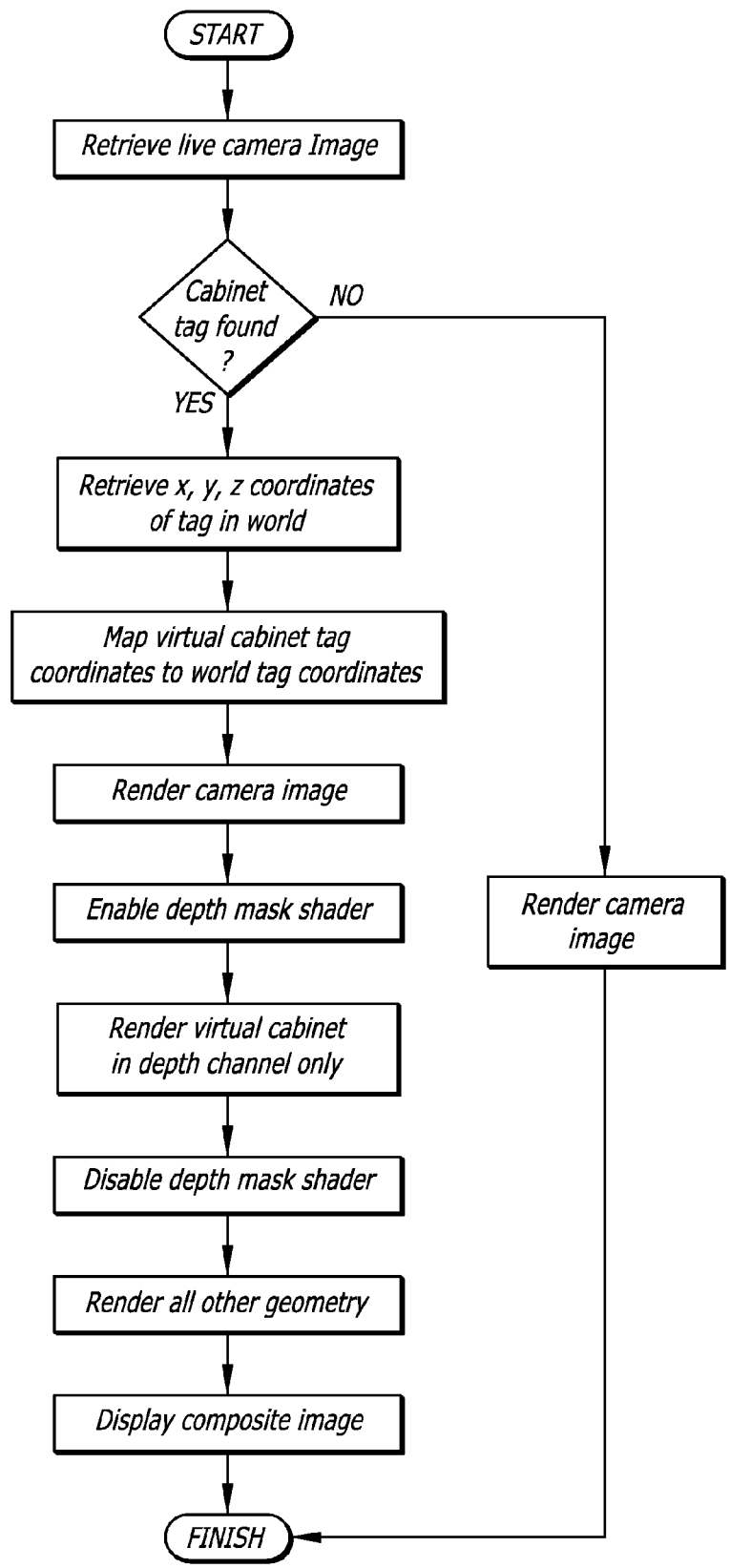
FIG. 59 is a logic flow diagram that shows a process to render enhanced augmentation using depth masking.

In another embodiment shown in the logic flow diagram of FIG. 59, the augmented reality 3D elements are rendered using a different process. The first two steps of the process shown in FIG. 59 are performed by a standard augmented reality SDK (Software Developers Kit). First, an image tag is found in the camera video image. In this embodiment, the image tag is found in the "Total Blast" top box video artwork. Next, the location of this image tag, with respect to the user, is passed to the application.

Continuing, in this embodiment of the 3D/2D interaction system 5300, the location of the image tag is given as a set of (x, y, z) co-ordinates. These coordinates describe the position of the top-left corner of the "Total Blast" image. Also known is the corresponding position of the top-left corner of the top box LCD screen in the low-polygon version of the CAD gaming machine cabinet. By mapping (e.g., a vector subtraction) the image tag co-ordinates to the cabinet co-ordinates, the proper rendering of the virtual cabinet may be determined. This virtual gaming machine cabinet represents the real gaming machine cabinet.

In another aspect of the 3D/2D interaction system 5300, the rendering process then proceeds. Specifically, the camera image is drawn on the smartphone display, as normal. Next, the rendering mode is changed from normal (opaque or transparent) to depth buffer only. This may be accomplished using a depth mask shader. In an embodiment using the Unity 3D engine, such a shader would be set forth as follows:

```
Shader "Masked/Mask" {
SubShader {
// Render the mask before regular geometry
Tags {"Queue" = "Geometry-10" }
// Don't draw in the RGBA channels; just the
depth buffer
ColorMask 0
ZWrite On
// Do nothing specific in the pass:
Pass { }
}
}
```

Figure 57:
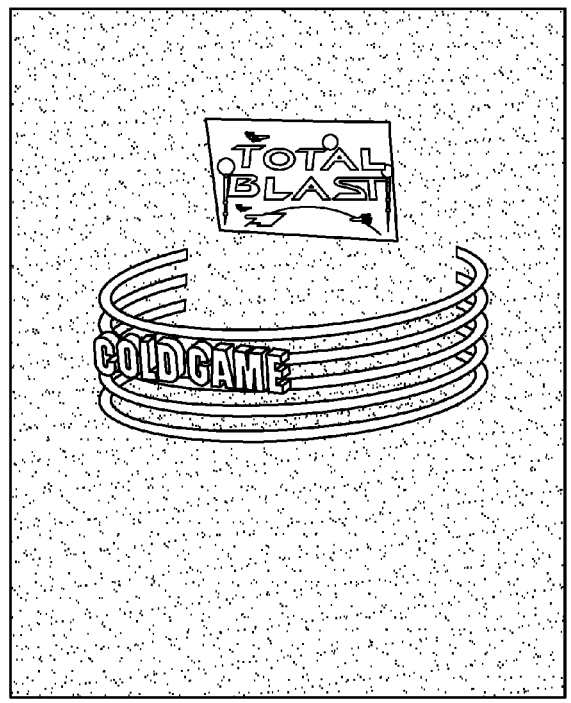
FIG. 57 illustrates an embodiment that shows a Low polygon version of a CAD cabinet rendered only into depth buffer, interacting with augmented elements.
Figure 58:
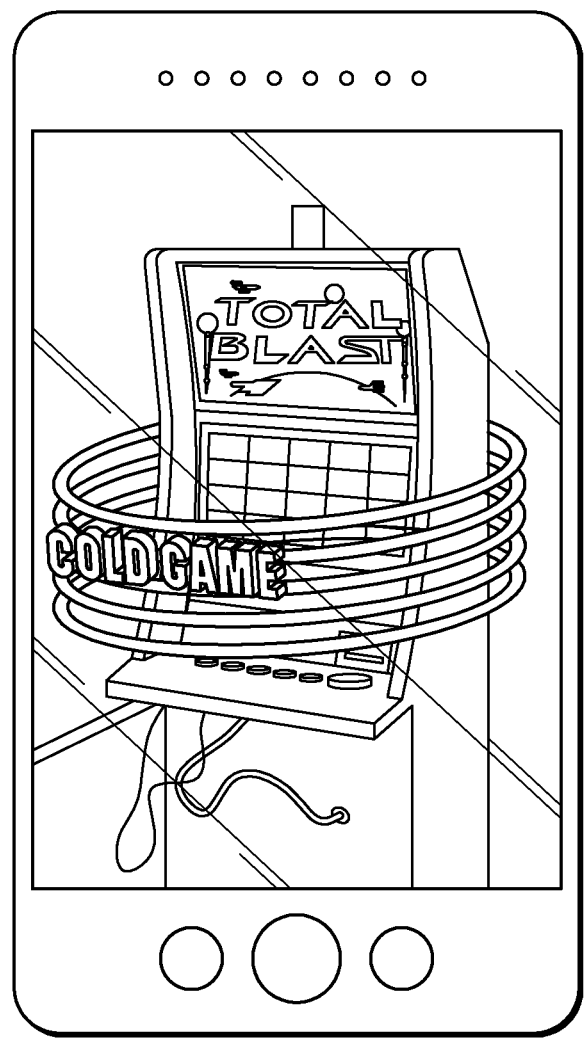
FIG. 58 illustrates an embodiment that shows an enhanced augmentation from the user's perspective.

Continuing, the low-polygon gaming machine cabinet is then rendered in depth-only mode. After the low-polygon gaming machine cabinet has been rendered, the 3D/2D interaction system 5300 returns to normal, opaque and transparent rendering. The result of this approach is shown in FIG. 57. When FIG. 55 is compared to FIG. 57, it may be seen that the rings of the "Cold Game" elements have been similarly obscured in FIG. 57 where the cabinet has been drawn, but no cabinet is visible. When the 3D/2D interaction system 5300 combines this rendering of FIG. 57 with the camera video image, the final desired result is achieved, which is shown in FIG. 58.

This effect produced by the 3D/2D interaction system 5300 is quite striking, since a physical 3D experience is interacting with a virtual 3D experience. Furthermore, since the 3D/2D interaction system 5300 provides a way of mapping any point on the real gaming machine cabinet into the 3D virtual world, the 3D/2D interaction system can enhance any other gaming (or non-gaming) element (e.g., a candle, a topper, a bill acceptor, an iDeck or any other known physical element).

Turning now to another 3D augmented reality example, using the conventional 3D approach, an augmented reality system may enable 3D spaceships flying in front of the cabinet. However, using the 3D/2D interaction system 5300, an augmented reality experience may be created in which 3D spaceships are orbiting the cabinet (e.g., going behind the cabinet (at which point they "disappear") and "re-appear" when the spaceships emerge in front of the cabinet). In another embodiment, the 3D/2D interaction system 5300 is implemented to enable another physical 3D experience to interact with a virtual 3D experience that does not involve gaming machines (or even a gaming machine environment). Any physical body that can be modeled may be augmented using the 3D/2D interaction system 5300 as described above.

Notably, the rendering and depth buffering performed with the 3D/2D interaction system 5300 is within the capabilities of current smartphone and tablet technology. In this regard, the virtual depth-only rendering of the gaming machine cabinet need not be of a particularly high resolution. As may be seen in FIG. 55, the low polygon representation may be quite rudimentary, but because this representation is never seen by the user. In such an embodiment, as long as the representation is approximate, the 3D/2D interaction results are impressive.

Figure 60:
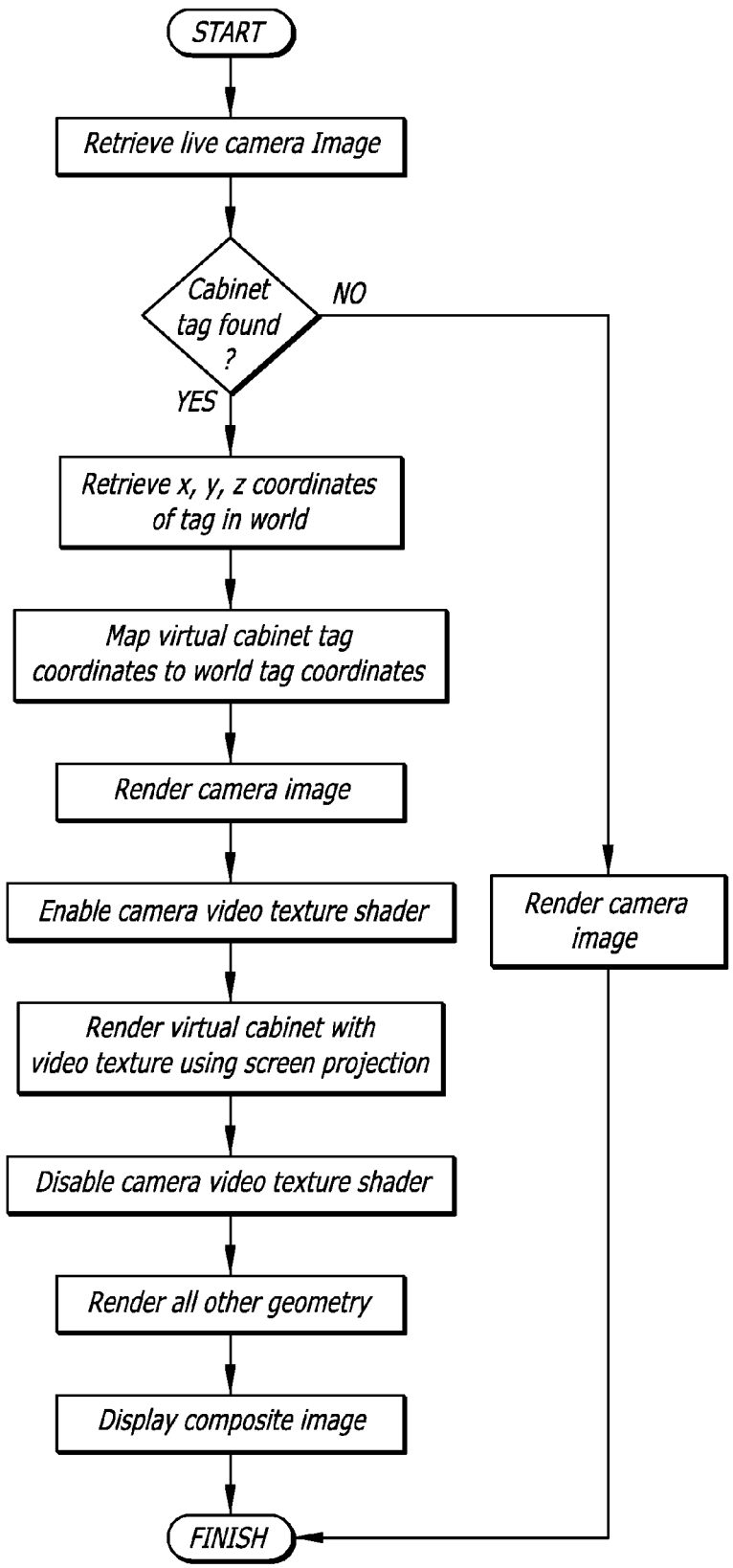
FIG. 60 is a logic flow diagram that shows a process to render enhanced augmentation using camera video texture copying.

Referring now to the logic flow diagram of FIG. 60, an alternative embodiment of the 3D/2D interaction system 5300 is shown that achieves the same effect. This embodiment is suitable for some mobile devices in which the depth buffer performance is not as good (or maybe not even possible). Instead, this embodiment of the 3D/2D interaction system 5300 is associated with raw pixel fill-rate performance. Some systems use a tiled-based rendering approach which, in some implementations, does not lend itself to rendering into only a depth buffer. These systems do not lend themselves to this type of rendering because the rendering ordering is not under the same degree of control as in a conventional depth-buffered solution. Accordingly, some embodiments of the 3D/2D interaction system 5300 do not rely on a "depth-buffer" only version of the cabinet early in the rendering queue.

Thus, in another embodiment of the 3D/2D interaction system 5300 shown in the logic flow diagram of FIG. 60, some of the steps are the same as in the process of FIG. 59; however, there is one notable difference. Instead of rendering the virtual cabinet in "depth-buffer-only mode," the 3D/2D interaction system renders the cabinet in "normal mode." However, there are significant differences from the output shown in FIG. 55.

First, lighting is disabled when rendering the cabinet. Second, the cabinet is rendered with a texture derived from the live camera image. Third, each pixel of the cabinet is rendered with (u,v) co-ordinates mapped to screen projection. The effect of this embodiment of the 3D/2D interaction system is that each pixel of the cabinet is rendered to be the same pixel as the underlying camera image, but at the correct depth. This causes any objects that were previously rendered in the scene to be replaced with the camera image pixel. Otherwise, the output is the same as shown in FIG. 58.

Some embodiments of the 3D/2D interaction system disclosed herein provide interaction of virtual elements with physical objects rather than simply overlaying, as well as more impressive augmentations. Additionally, embodiments of the 3D/2D interaction system enable the use of only one tag within a cabinet as sufficient to enable special augmented reality effects on top of the cabinet, behind the cabinet, and around the whole of the cabinet. Notably, the performance capabilities of current smartphones and tablets are sufficient for use with the 3D/2D interaction system.

In one embodiment of the 3D/2D interaction system, the following components are used: (1) Qualcomm Vuforia SDK with Unity plugin; (2) Android or Apple smartphone/tablet with a rear-facing camera and ARM processor (almost all android/apple phones for the last 2 years are adequate to the task); (3) PowerVR, Snapdragon, Tegra 2 or equivalent 3D hardware in smartphone; (4) A video gaming machine with LCD or other flatscreen displays; and (5) Unity 3D authoring tool to render augmented 3D and import CAD files.

Some embodiments of the 3D/2D interaction system disclosed herein provide (1) mapping of image tag to location within a virtual object representing a physical object, and (2) rendering of virtual representations of physical objects using a depth buffer only to enable interaction with rendered 3D elements. Alternative embodiments of the 3D/2D interaction system use video textures for suitable hardware.

System and Method for Complex Augmented Video Image Tags:

As discussed above, embodiments disclosed herein utilize various different types of augmented reality technology (e.g., Vuforia). One such example of augmented reality technology enables a mobile device (e.g., smartphone) to overlay rendered 3D objects over a live video image being captured in real-time by the camera of a mobile device. Notably, when using the augmented reality technology, the 3D objects maintain a consistent appearance as the camera moves, so "augmented reality" effects may be produced.

Such augmented reality technology analyzing each image as it is captured, and determining the presence (or not) of one or more "tags." Typically, an image tag is a 2D image. Traditionally, a tag is a physically printed, non-animated (i.e., static) image.

Some embodiments of the System and Method for Complex Augmented Video Image Tags, also interact well with tags that are displayed on an LCD screen (in contrast to physically printed images). Accordingly, the System and Method for Complex Augmented Video Image Tags may be incorporated into video gaming systems and methods.

Figure 61:
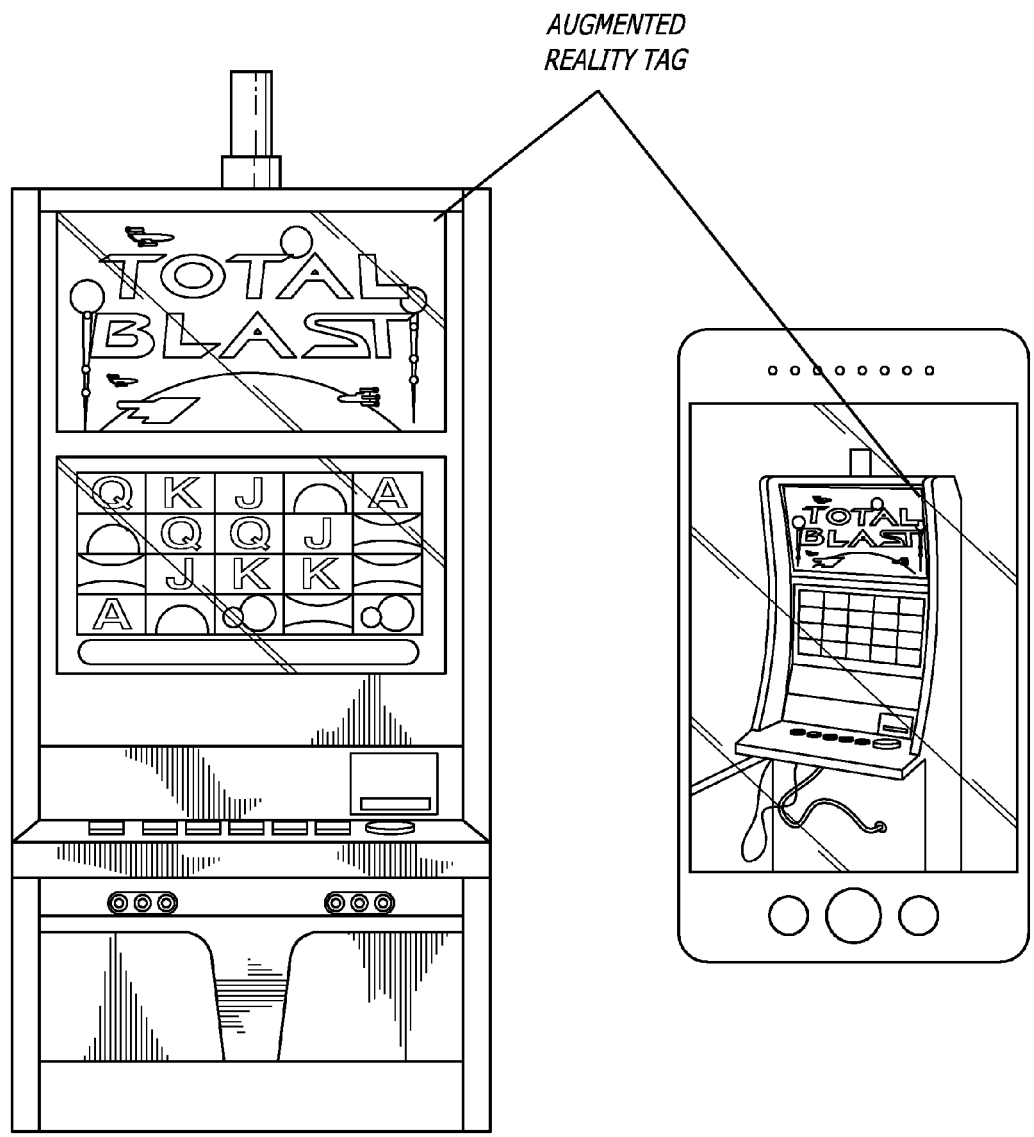
FIG. 61 illustrates an embodiment that shows an augmented reality from a user's perspective.

FIG. 61 shows an example of how a user may operate the System and Method for Complex Augmented Video Image Tags 6100. In this embodiment, the user starts up a custom application on their mobile device (e.g., smartphone). This application is loaded with a set of one or more image tags. The embodiment shown in FIG. 61 illustrates the top glass artwork of the "Total Blast" game. The application makes calls to the augmented reality technology SDK (Software Developers Kit) to determine if a tag is present in the current live camera image, and if so, the SDK returns the position of the tag relative to the user in 3D space.

Figure 62:
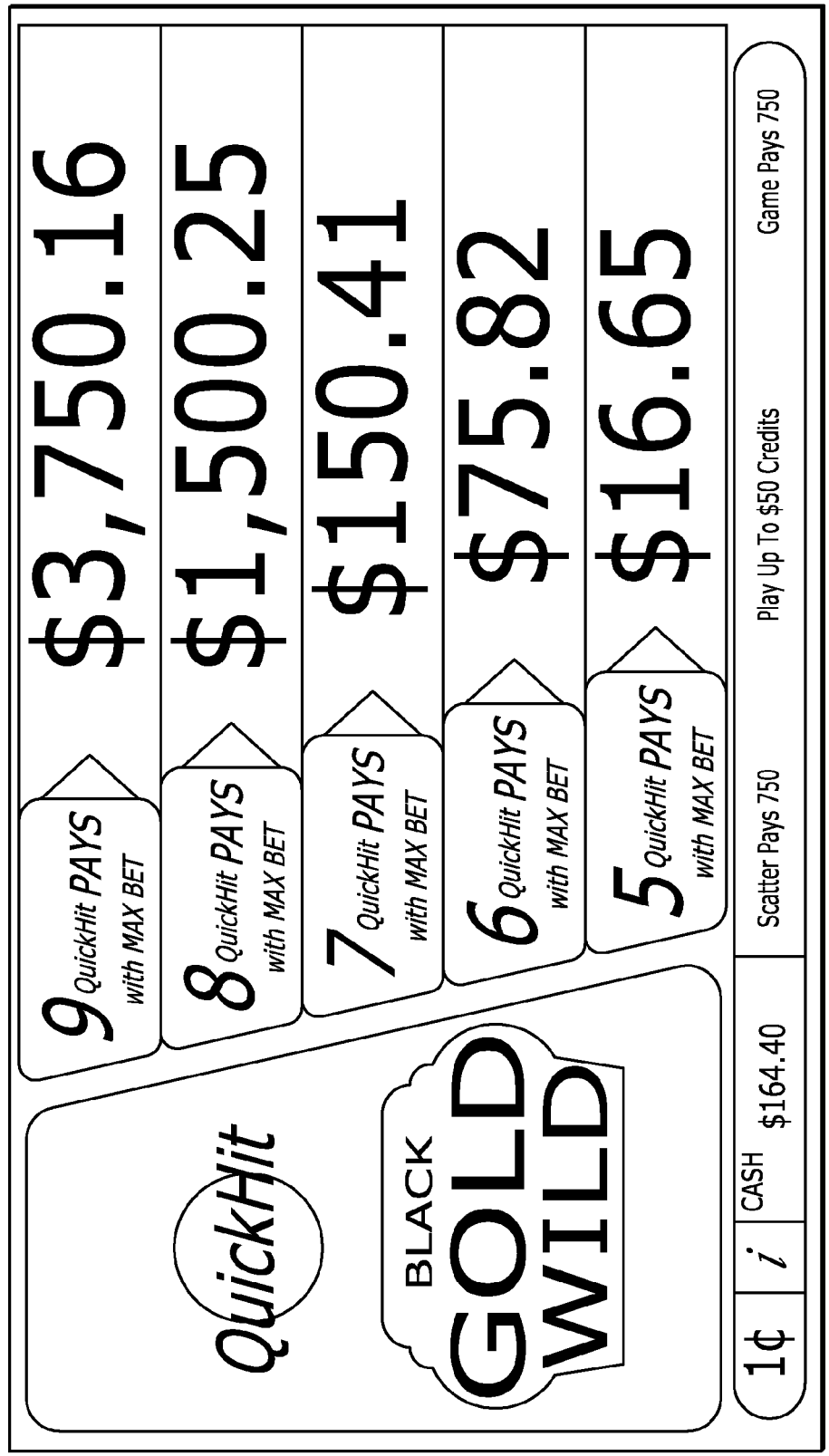
FIG. 62 illustrates an embodiment that shows a 'Black Gold Wild' Top box progressive display.

In some other embodiments disclosed herein, the image in the top glass artwork is static. However, in other embodiments, this is not necessarily the case. For example, as shown in FIG. 62, some of the top glass artwork is from the "Black Gold Wild" game, which is a progressive game. As such, the progressive values are displayed and updated on the top box display (i.e., the progressive values are not static).

In one embodiment of the System and Method for Complex Augmented Video Image Tags 6100, only a small portion of the display is used as the tag (e.g., only the top left hand corner). However, the limiting factor for this approach is that the tag is harder to detect. Additionally, in this embodiment of the System and Method for Complex Augmented Video Image Tags 6100, there is not a rectangle that encompasses all of the non-moving elements (e.g., the "Black Gold Wild" logo, the "Quick Hit" logo, and the "Pays" elements).

Figure 63:
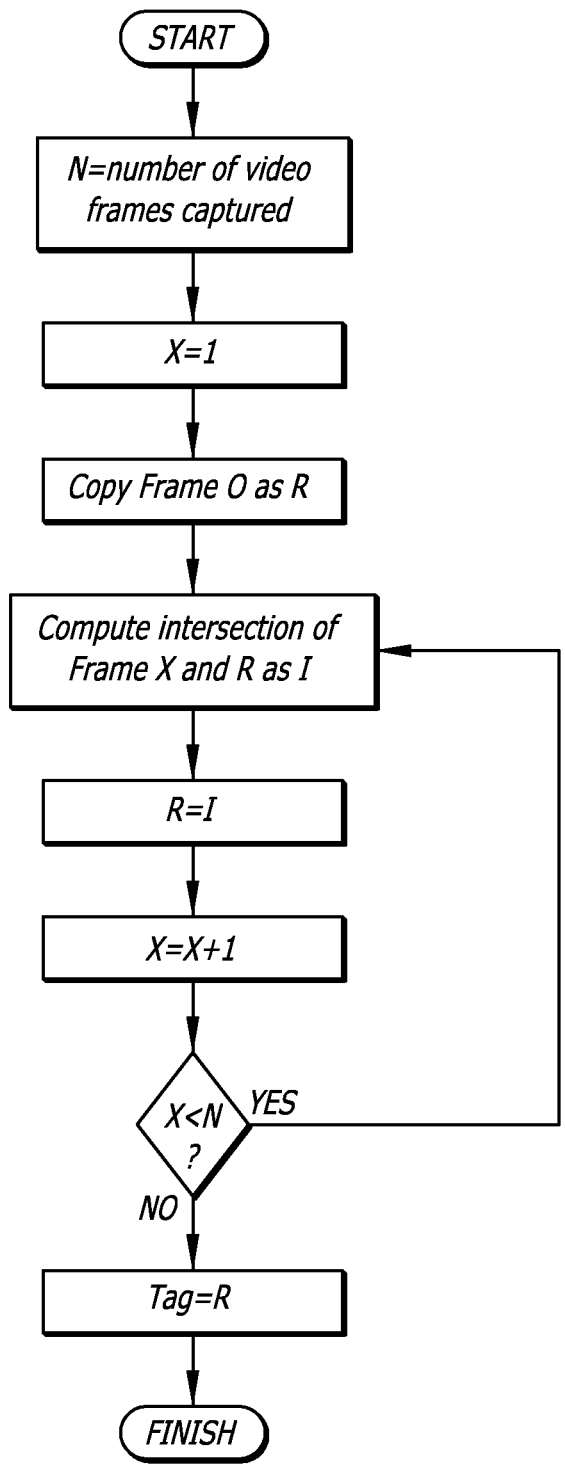
FIG. 63 is a logic flow diagram that shows a process to extract non-moving parts of a display.

In this embodiment of the System and Method for Complex Augmented Video Image Tags 6100, instead of using a smaller tag, the whole image is used and moving or video areas are masked off. FIG. 63 shows an embodiment of a process in which this is achieved. In some embodiments, this process is run offline, and uses as an input, a video recording of the game display output. In another embodiment, this video recording is done at the highest quality possible, preferably with no analog steps being utilized.

First, in one embodiment of the System and Method for Complex Augmented Video Image Tags 6100 the number of video frames captured is used. The number of frames to capture is at the discretion of the developer, and is large enough to encompass all relevant game play. For games such as "Mayan Treasures," the frames captured do not encompass frames from the free games feature, since this feature causes all of the pixels on the screen to be updated, and thus these frames are unusable.

For each frame captured, an intersection of this frame and the previous result is generated as R. For the first frame, the previous result is set to also be the first frame, so that the resulting frame R is also the first frame. The intersection continues, with R being iteratively used as both the result and the input into the next iteration. Using Boolean logic, the simplest way of describing R would be:

F1 AND F2 AND . . . Fn

Where F1 . . . Fn represents the video frames captured.

Figure 64:
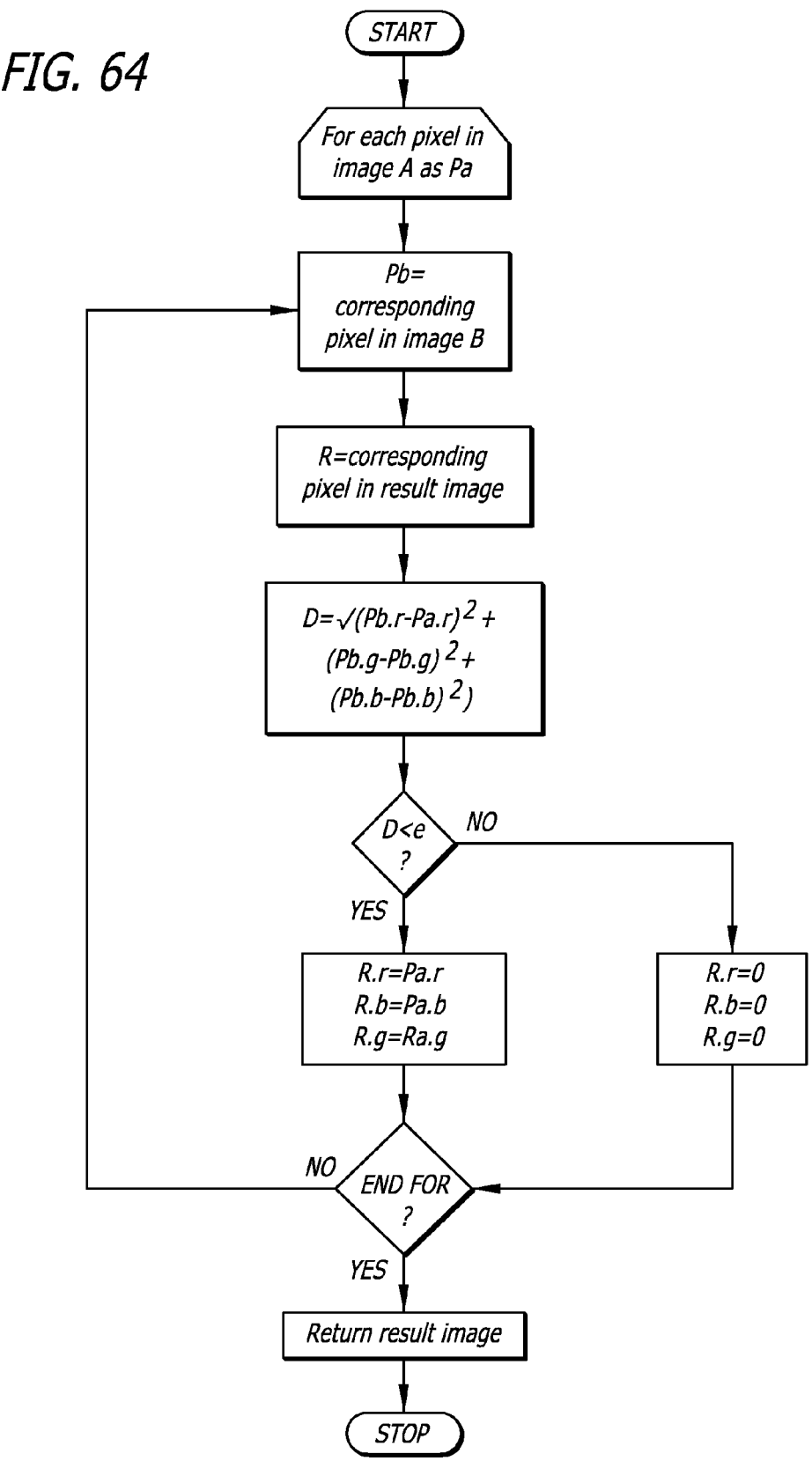
FIG. 64 is a logic flow diagram that shows a process to compute the intersection of two images.

Since there are compression artifacts, both within the video recording and also within lossy codecs used in video games, it cannot reasonably be expected that each pixel within a frame will not change slightly from frame to frame. To address this issue, the process shown in FIG. 64 is used to produce the intersection of two frames, rather than a simple Boolean "AND" operation. Accordingly, in FIG. 64 each corresponding pixel of two images is put into the function (e.g., in FIG. 63 these images are the current frame and the result of all previous frames).

$$D=\sqrt{(Pb \cdot r - Pa \cdot r)^2 + (Pb \cdot g - Pb \cdot g)^2 + (Pb \cdot b - Pb \cdot b)^2}$$

Where Pa is image A, Pb is image B and both Pa and Pb are formed from a structure of r,g,b color values.

In this embodiment of the System and Method for Complex Augmented Video Image Tags, D is the vector length in color space between the two pixel values. If D is smaller than a trigger value "e" (a typical value for "e" may be 0.1, if (0<r,g,b<1)) then it is presumed that the pixel has not changed color from the previous frame to this one. If, however, D is greater than "e," then the result pixel is set to black–r,g,b=0.

Figure 65:
FIG. 65 illustrates an embodiment that shows a 'Black Gold Wild' Top box progressive display with no animated elements.
Figure 66:
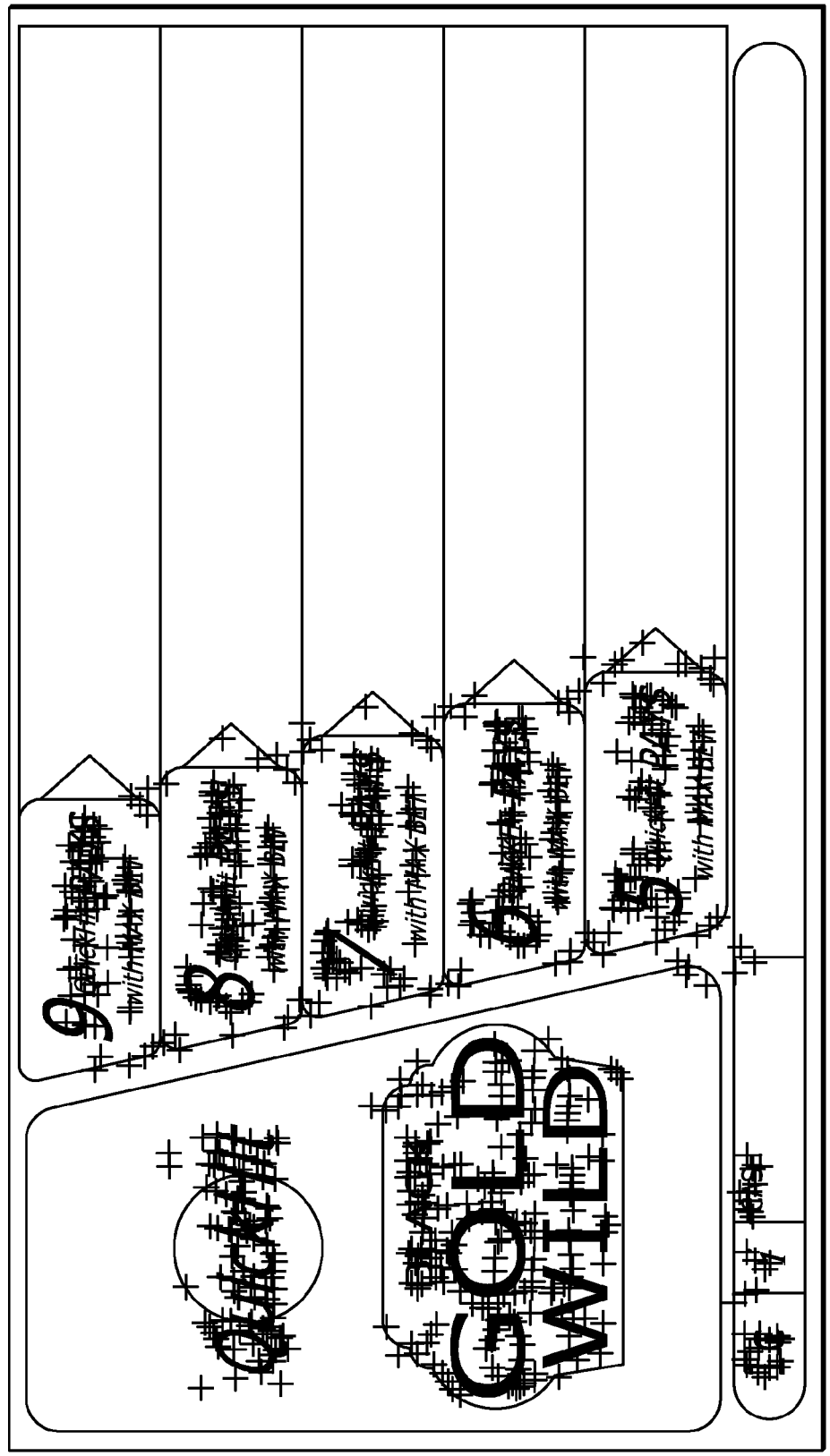
FIG. 66 illustrates an embodiment that shows an augmented reality image tag for 'Black Gold Wild.'

Running these processes against "Black Gold Wild" using the System and Method for Complex Augmented Video Image Tags, the image shown in FIG. 65 is produced. Continuing, passing this image to the Augmented Reality tag generator creates a tag, as shown in FIG. 66.

Referring again to FIG. 66, the tag is still rectangular, but there are no tag marks against any of the areas that are going to be animated. Instead, the System and Method for Complex Augmented Video Image Tags treats these areas as obscured when it identifies the tag.

Figure 67:
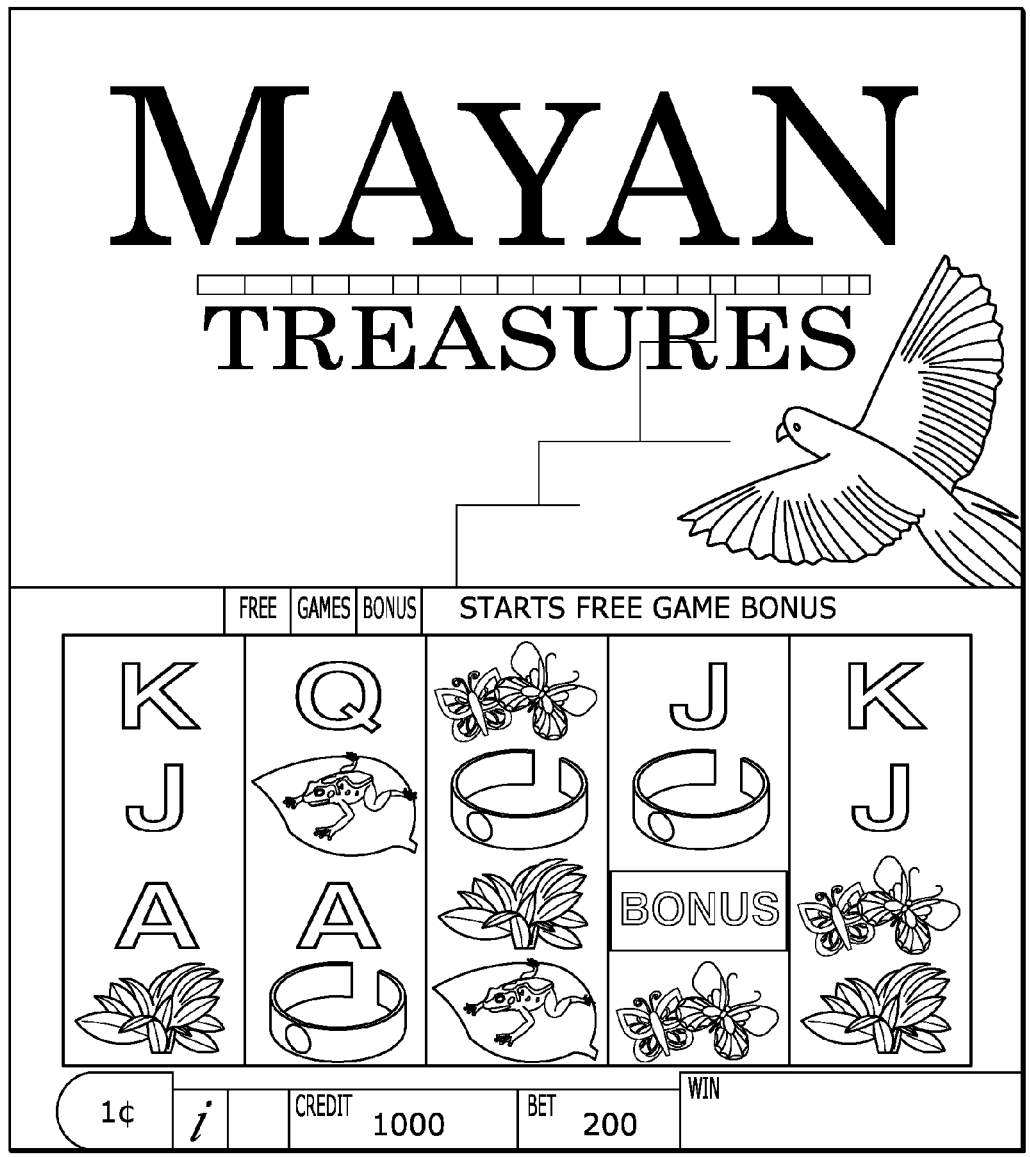
FIG. 67 illustrates an embodiment that shows a Mayan Treasures game display.

Referring now to FIG. 67, a much more complex image is shown. In this embodiment, the video output for the game "Mayan Treasures" is shown. Careful viewing of FIG. 67 shows that the lettering of "Mayan" glows. Additionally, there is a particle effect across the word "Treasures." Also, the reel windows show twenty symbols that obviously move during a reel spin, and thus, can never be relied upon to be present for use by the tag.

Figure 68:
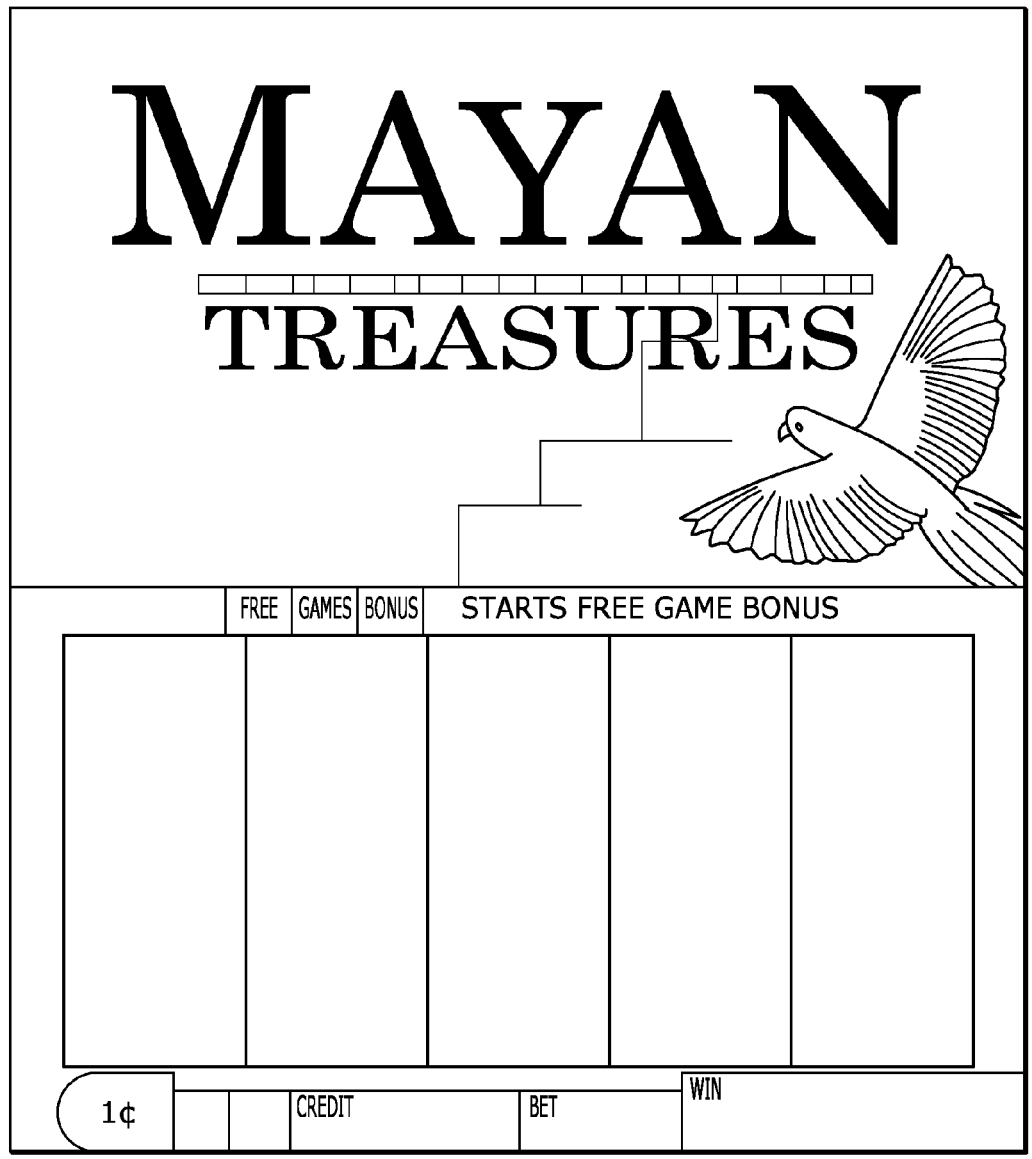
FIG. 68 illustrates an embodiment that shows a Mayan Treasures game display with moving elements removed.
Figure 69:
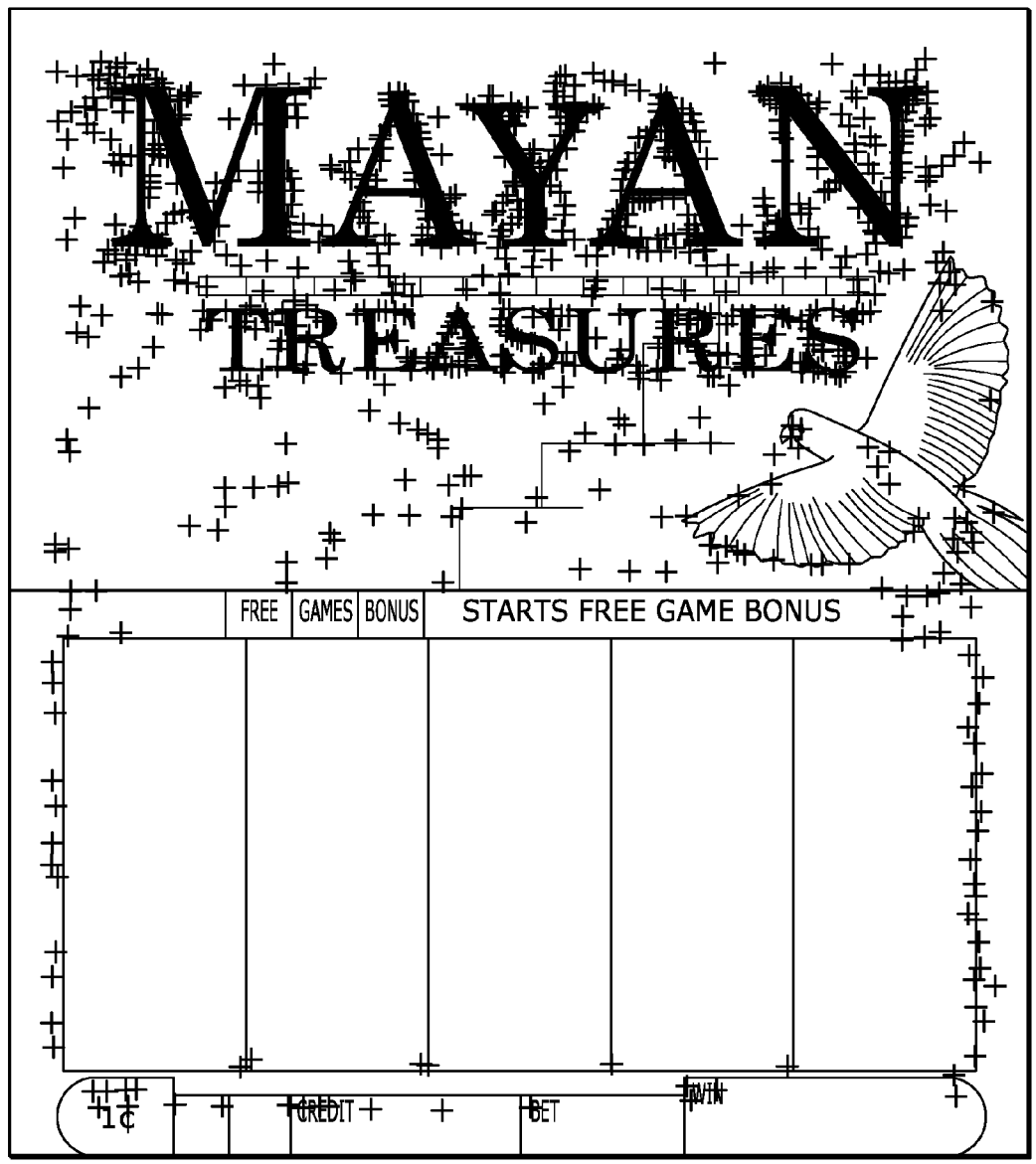
FIG. 69 illustrates an embodiment that shows an augmented reality image tag for 'Mayan Treasures.'

Running the video output of "Mayan Treasures" through the processes shown in FIG. 63 and FIG. 64 produces the image shown in FIG. 68. This image has all of the moving elements removed and is thus suitable for use by the System and Method for Complex Augmented Video Image Tags. FIG. 69 shows the tag generated for this image in the Augmented Reality tag generator. Notably, there are no yellow crosshair tag marks on any of the reels, meters or other black areas.

One specific, non-limiting, embodiment of the System and Method for Complex Augmented Video Image Tags uses the following specific components: (1) Qualcomm Vuforia SDK with Unity plugin; (2) Android or Apple smartphone/tablet with a rear-facing camera and ARM processor (almost all current Android/Apple phones employ sufficient software and hardware); and (3) a gaming machine with LCD or other flatscreen displays. Notably, most embodiments of the System and Method for Complex Augmented Video Image Tags use video tags and masked animated areas. Additionally, automatic processing of existing games may be employed to determine non-animated areas that may be used as Augmented Reality tags.

Augmented Maintenance of Gaming Machines:

One embodiment of a System and Method for Augmented Maintenance of a Gaming Machine 7000 assists with the maintenance of a gaming machine. In another embodiment, the System and Method for Augmented Maintenance of a Gaming Machine 7000 is used for other maintenance tasks (e.g., changing the toner in a printer, or clearing a paper jam in a photocopier, and the like). This embodiment of the System and Method for Augmented Maintenance of a Gaming Machine 7000 further improves the maintenance experience with augmented reality effects.

Notably, maintenance of gaming machines is a major expenditure for a casino or other gaming establishment. Gaming machine technicians must be trained in the multitude of gaming machines that are typically on a game floor. Additionally, these gaming machines may also be combined with a further multitude of peripheral devices that are installed within (or onto) a gaming machine cabinet. A seemingly simple task (e.g., re-connecting a loose wire, or filling a ticket printer) may be difficult to perform since the task may require knowledge of hundreds, if not thousands, of configurations on a wide variety of possible gaming machines.

One embodiment of the System and Method for Augmented Maintenance of a Gaming Machine 7000 helps a slot technician by guiding them through various maintenance tasks. Notably, the System and Method for Augmented Maintenance of a Gaming Machine 7000 provides augmented reality effects that enable a technician to perform various maintenance tasks (e.g., direct a technician where to insert keys, which buttons to press, or which connectors to check). A preferred embodiment of the System and Method for Augmented Maintenance of a Gaming Machine 7000 uses a casino management system (CMS) to deliver targeted content to a mobile application held on a mobile device by the gaming machine technician. An alternative embodiment of the System and Method for Augmented Maintenance of a Gaming Machine 670 is also described that does not use a CMS.

Figure 70:
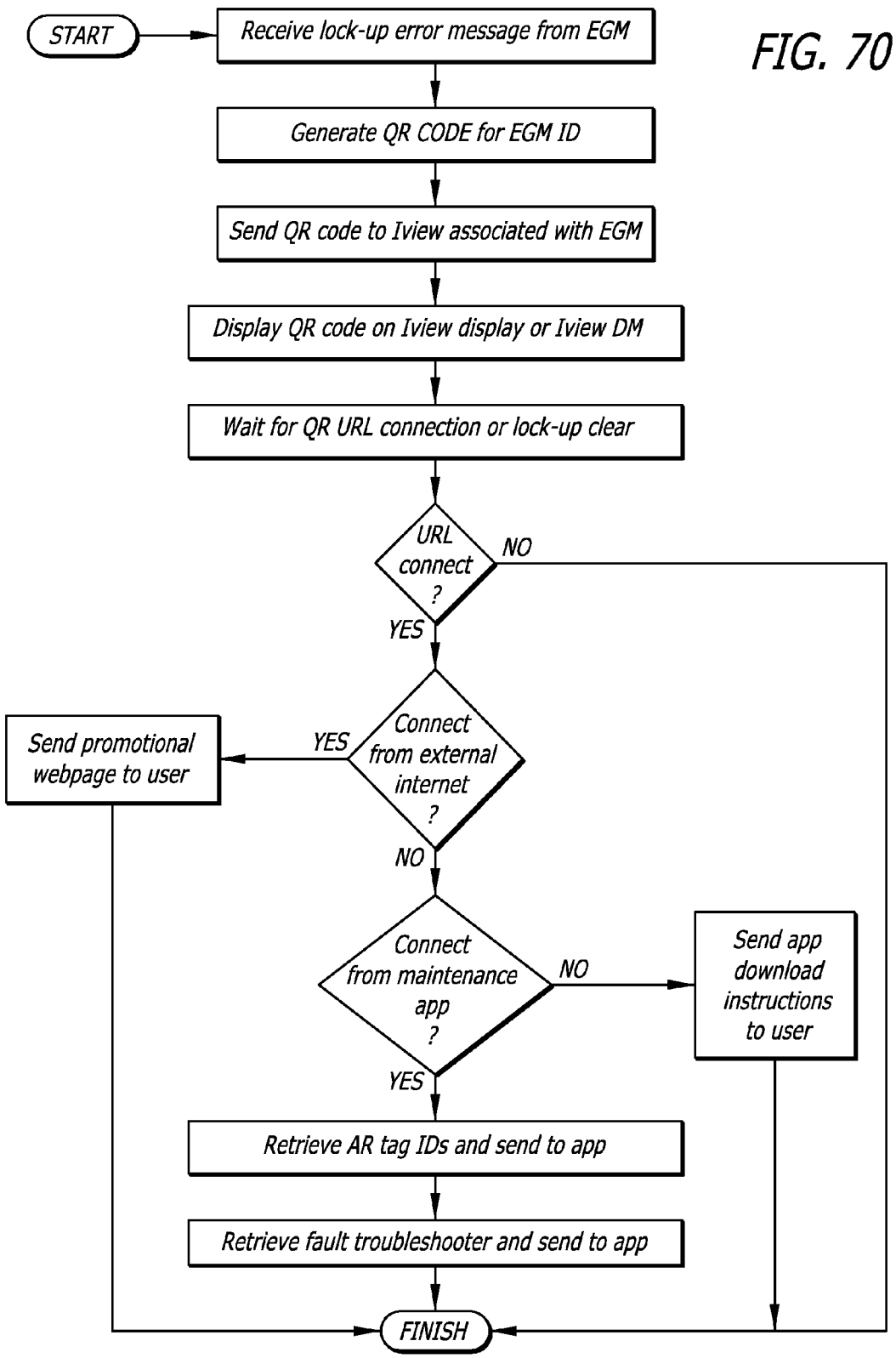
FIG. 70 is a logic flow diagram that shows a casino management server process.

FIG. 70 shows the operation of one embodiment of the System and Method for Augmented Maintenance of a Gaming Machine 7000 from the perspective of the CMS. In this embodiment, the CMS receives a lock-up message from the gaming device. This lock-up function is already integrated into CMS and gaming machine protocols (e.g., SAS or G2S). The lock-up message indicates to the CMS that there is a fault at the gaming machine that must be rectified. In this specific, non-limiting, example, the ticket printer has exhausted its supply of tickets. Accordingly, the CMS may then interface with a technician dispatch system, which dispatches a technician to the gaming machine to address the issue of the exhausted ticket printer. In smaller venues without such a system, a technician may be alerted by a flashing candle light atop the gaming machine. Nevertheless, in either situation, a technician will approach the gaming machine.

Figure 73:
FIG. 73 illustrates an embodiment that shows a sample QR code with an encoded URL.
Figure 74:
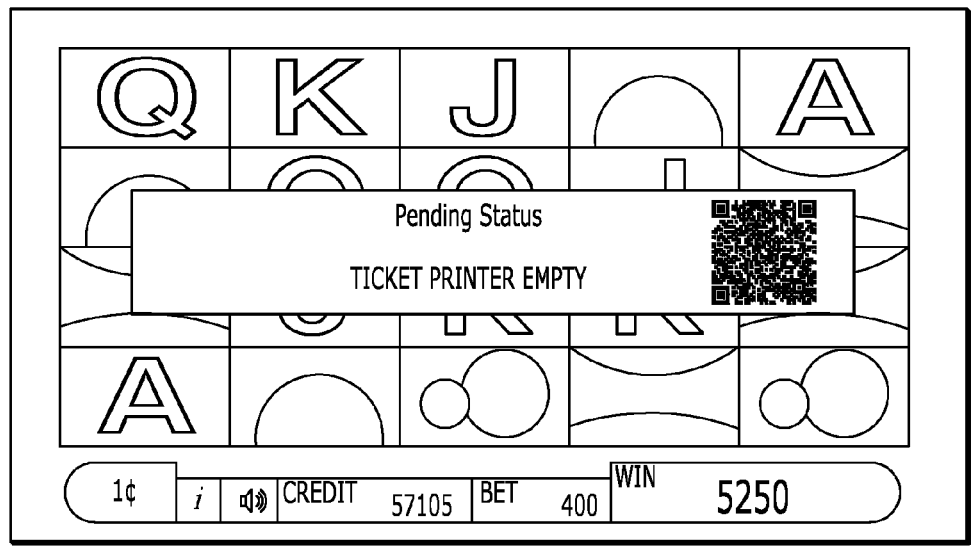
FIG. 74 illustrates an embodiment that shows a maintenance lockup with an overlaid QR code.

In one embodiment of the System and Method for Augmented Maintenance of a Gaming Machine 7000, the CMS generates a QR code for display on the gaming machine. Referring now to FIG. 73, an example of a QR code is shown which is well known for the ability to encode a URL. The QR code that is generated uniquely identifies the gaming machine so that when the technician approaches the gaming machine, the CMS may be certain of at which gaming machine the technician is standing. As shown in FIG. 74, the QR code is then sent to the gaming machine over the CMS network and displayed on either the iView display or, using display manager (DM) technology, overlaid on top of the gaming machine's main LCD display. The CMS then waits for a connection from the mobile application held by a technician.

In this embodiment of the System and Method for Augmented Maintenance of a Gaming Machine 7000, the QR code generated is preferably a URL which points to a resource that may be interpreted differently depending upon the DNS server being used. For example, if one were to visit a website URL of http://casino6601.com/EGMFault/EGMID12345 from a mobile phone not connected to the casino intranet or VPN, the user receives a promotional webpage thanking the user for their curiosity and informing them of current casino special offers.

Additionally, if a technician correctly connects the mobile device to the intranet or VPN uses a generic QR code reading application such as "Google Goggles" or "QR Reader for IPhone," the in-casino DNS server connects the mobile device browser to the CMS server. In this situation, the URL may lead the user to instructions on how to install the augmented maintenance application. The System and Method for Augmented Maintenance of a Gaming Machine 7000 may detect the use of a generic application such as "Google Goggles" by inspecting the "User-Agent" field of the HTTP request. In one embodiment, any request not from the System and Method for Augmented Maintenance of a Gaming Machine 7000 is redirected to the installation instructions webpage.

Figure 72:
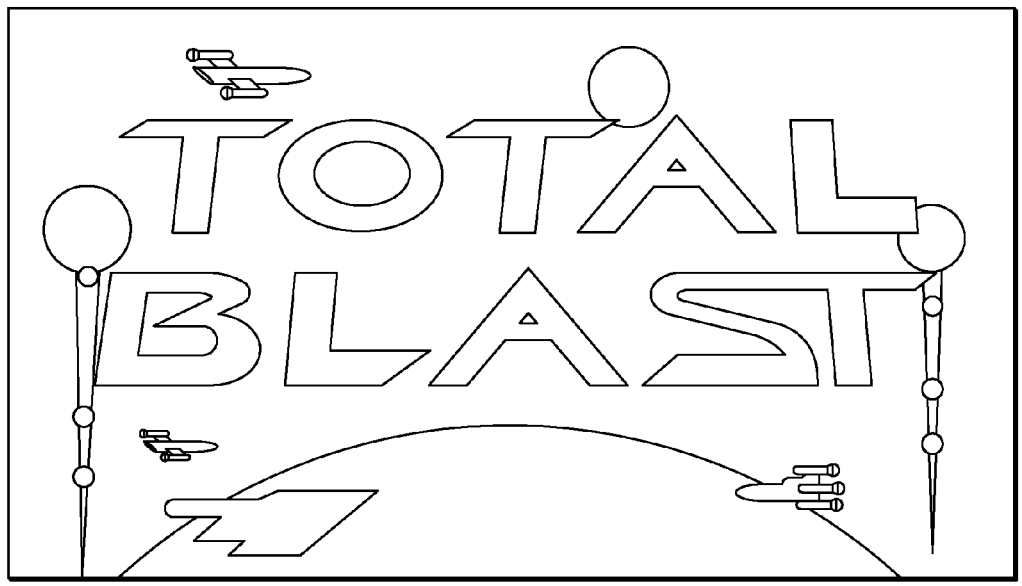
FIG. 72 illustrates an embodiment that shows a sample game artwork used to orient the augmented reality view of a cabinet.
Figure 78:
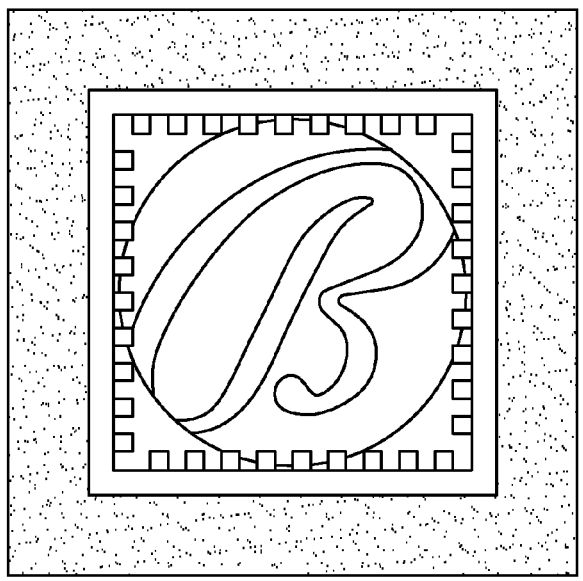
FIG. 78 illustrates an embodiment that shows a paper-based tag with company artwork for easy user identification.

Once the System and Method for Augmented Maintenance of a Gaming Machine 7000 has ascertained that the request has been sent, the correct AR tags or tag identifiers are sent to the System and Method for Augmented Maintenance of a Gaming Machine. Tags may be of either a video or glass artwork type (as seen in FIG. 72) or a paper "frame marker" type as seen in FIG. 78. A notable distinction between these types of tags is that video artwork tags are used to initially orient the augmented reality application before the cabinet is opened. Once the cabinet has been opened and the user is looking inside the cabinet, it may not be possible to continue to orient using the tags in the external artwork. Thus, while "dead-reckoning" may be used to keep orientation after tags are no longer visible, most embodiments of the System and Method for Augmented Maintenance of a Gaming Machine 7000 uses additional paper "frame marker" tags mounted in suitable, known locations within the cabinet to maintain orientation when viewing inside the cabinet.

As previously described with respect to the embodiments of the Augmented Reality with Interaction between Real and Virtual Objects, real objects (e.g., a gaming cabinet) may interact in an augmented reality scene with virtual objects by using the known positions of tags, such as video artwork. Some embodiments of the System and Method for Augmented Maintenance of a Gaming Machine 7000 leverage the embodiments of the Augmented Reality with Interaction between Real and Virtual Objects by using paper frame markers at known positions within the gaming machine cabinet.

Figure 71:
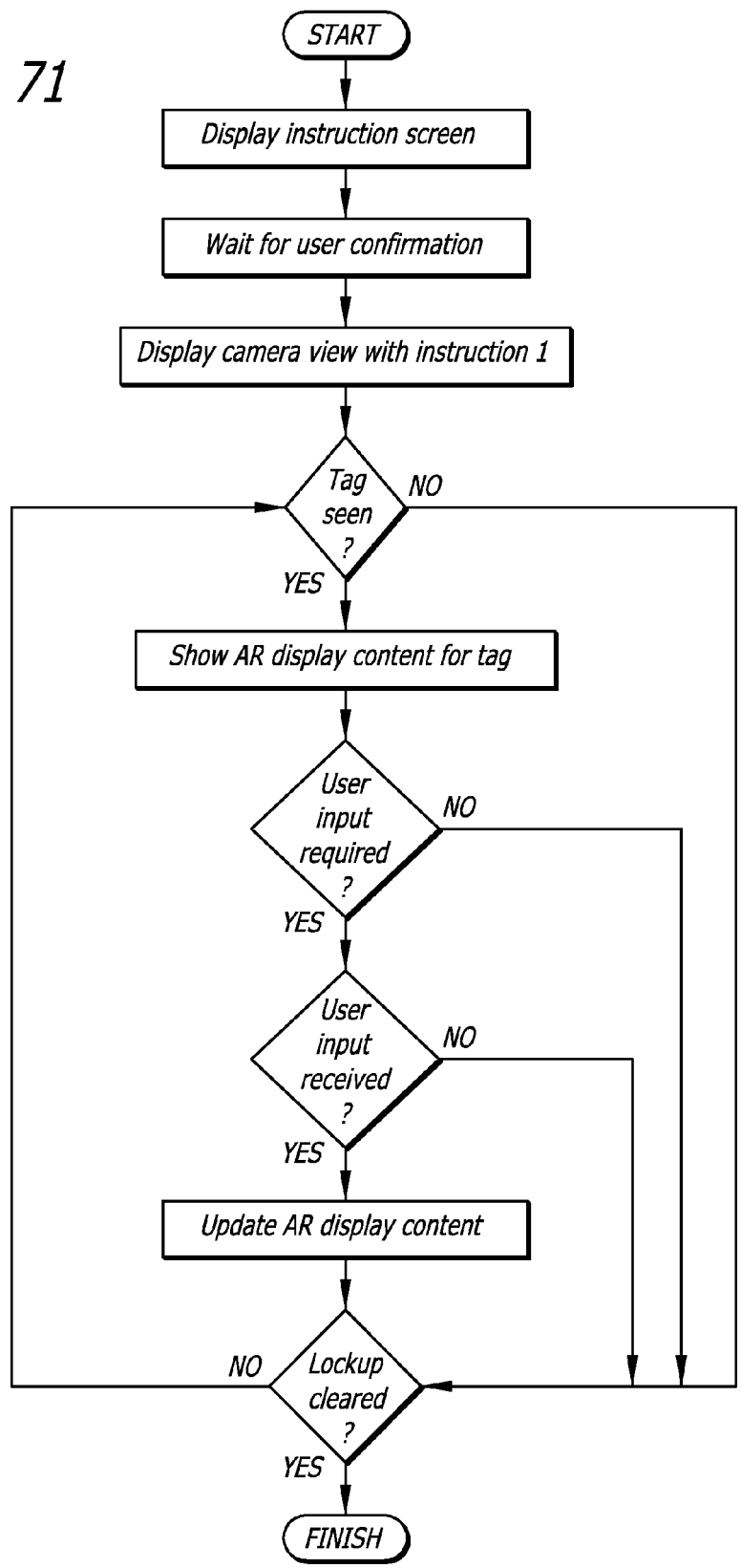
FIG. 71 is a logic flow diagram that shows an augmented maintenance mobile application process.

In one embodiment of the System and Method for Augmented Maintenance of a Gaming Machine 7000 that is incorporated into a mobile application on a mobile device (e.g., a smartphone), the technician starts the application and is instructed to point a camera of the mobile device at a QR code. The technician performs this step by pointing the camera at an LCD display of a malfunctioning gaming machine, as shown in FIG. 74. In this embodiment, the mobile application decodes the QR code to generate a URL that is associated with the CMS. In particular, the QR code generates a URL that identifies this particular gaming machine to the CMS. This action then initiates the download of tag information and instruction data from the CMS to the mobile application associated with current lockup information for that gaming machine. The System and Method for Augmented Maintenance of a Gaming Machine 7000 then performs the process set forth in FIG. 71.

Figure 75:
FIG. 75 illustrates an embodiment that shows a mobile application with initial instructions.
Figure 76:
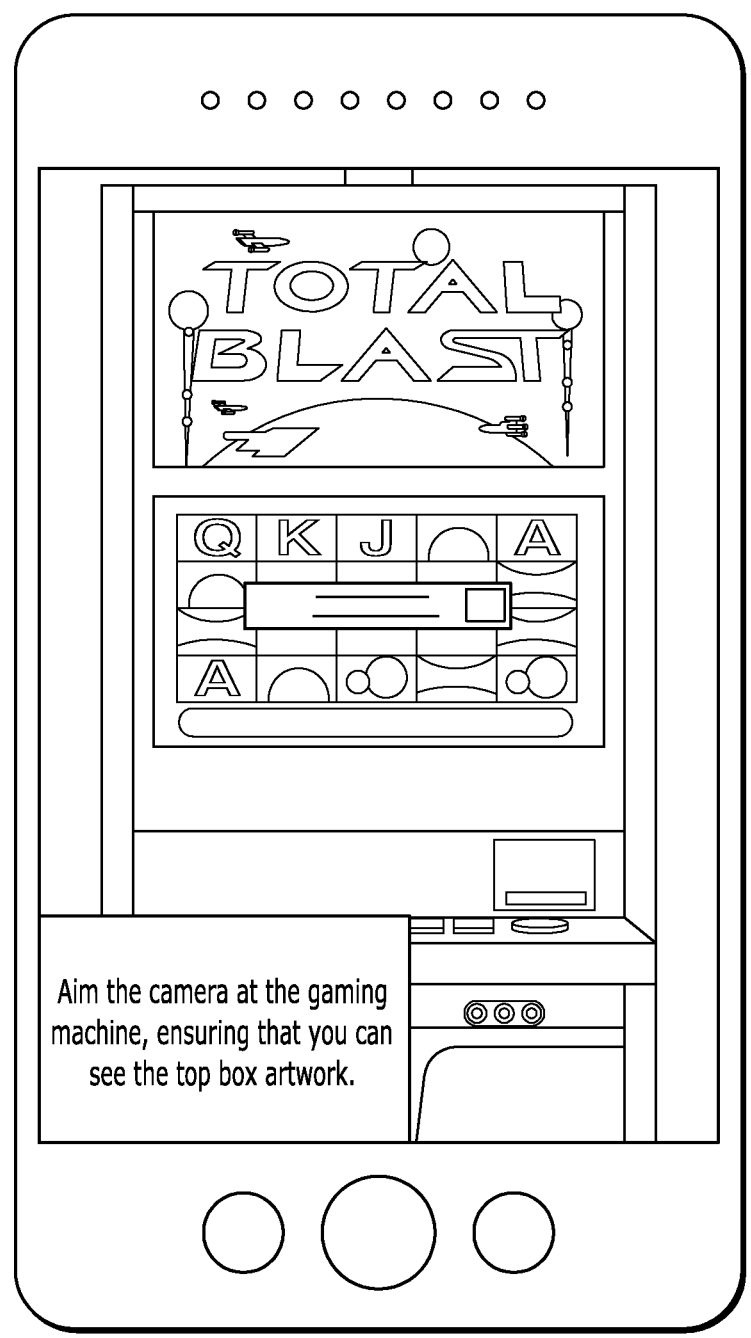
FIG. 76 illustrates an embodiment that shows instructions to aim the camera to obtain an augmented "lock."

In one embodiment of the System and Method for Augmented Maintenance of a Gaming Machine 7000, the first data downloaded from the CMS is an introductory instruction screen that is displayed to the user. An example of such a screen is shown in FIG. 75. Once the technician has confirmed that he is able to proceed, the System and Method for Augmented Maintenance of a Gaming Machine 7000 goes through a number of iterative steps. In each step, the System and Method for Augmented Maintenance of a Gaming Machine 7000 requests that the user hold the phone up towards the gaming machine so that the camera of the mobile device may see a tag, as shown in FIG. 76. Then, if a tag is identified in the captured image, related augmented reality content is shown to the technician by overlaying the augmented reality content over the captured camera image.

Figure 77:
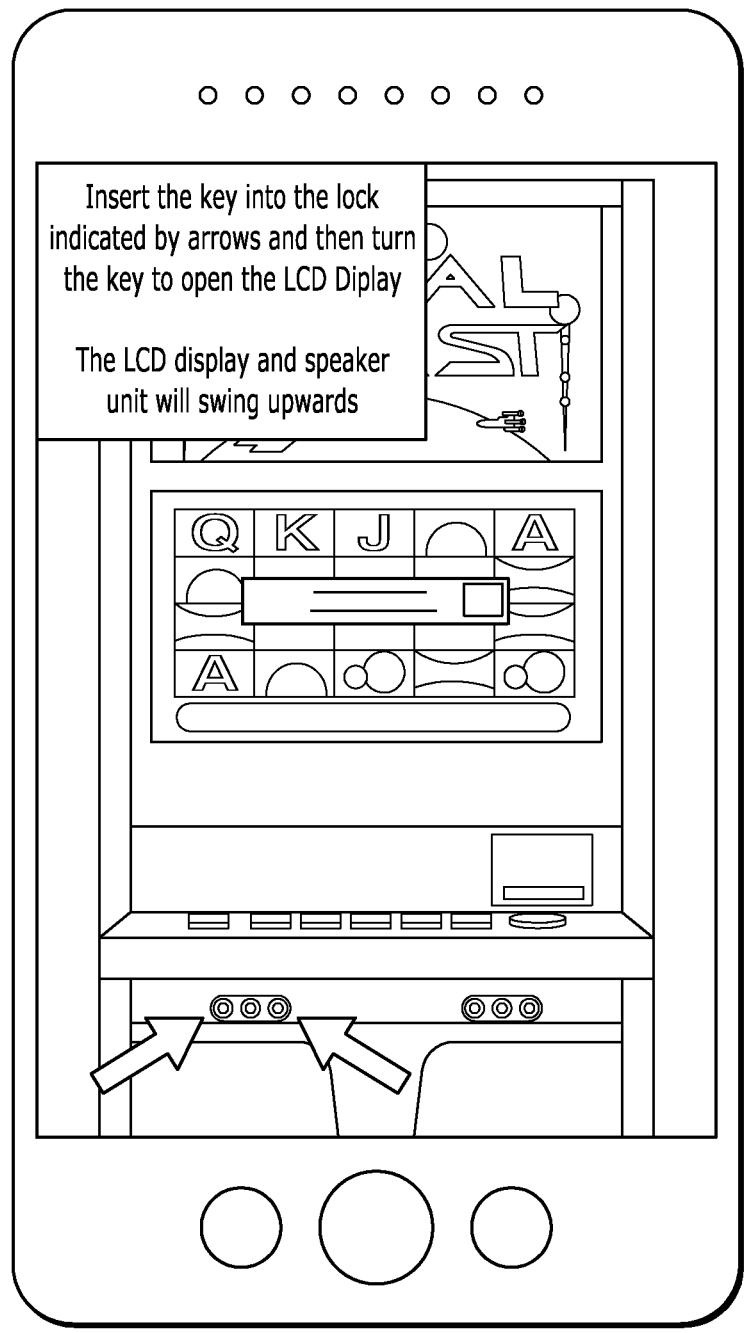
FIG. 77 illustrates an embodiment that shows an augmented 'lock' with first instructions and augmented arrows.

Referring now to FIG. 77, the first example of such an overlay is shown using the System and Method for Augmented Maintenance of a Gaming Machine 7000. In this embodiment, the tag (as shown in FIG. 72) has been identified. This tag is the top box artwork for the game "Total Blast." Since the tag has been identified, the System and Method for Augmented Maintenance of a Gaming Machine 7000 can determine that the gaming machine cabinet has not been opened. Accordingly, instructions are displayed on how to open the cabinet. In one embodiment, these instructions are aided by the correct positioning of overlaid 3D arrows with respect to the physical cabinet in the captured image. As the technician moves, these arrows also move with respect to the technician and the gaming machine cabinet.

With the aid of the System and Method for Augmented Maintenance of a Gaming Machine 7000, the technician now has enough information to know where the lock is situated on the gaming machine to open the correct door. In some embodiments, there may be multiple locks on a gaming machine cabinet. In this manner, opening the wrong door may result in further problems. Thus, the System and Method for Augmented Maintenance of a Gaming Machine 7000 produces a more reliable technician for the casino.

Figure 79:
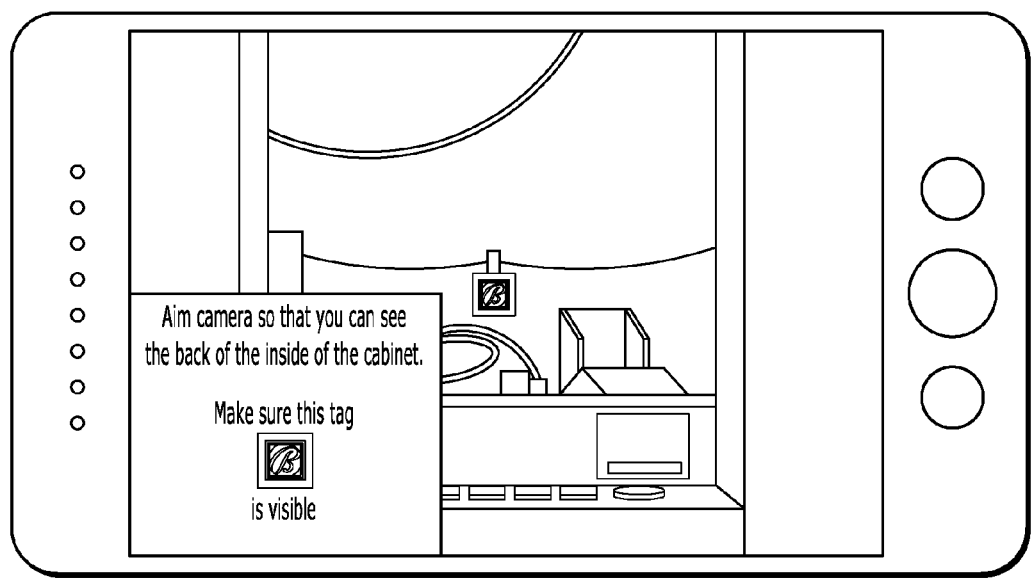
FIG. 79 illustrates an embodiment that shows instructions on how to obtain a 'lock' using the paper tag.

As shown in FIG. 79, once the cabinet door has been opened, the technician has access to the internal components of the gaming machine. At this stage, the top box "Total Blast" video artwork is no longer present in the captured video image. Therefore, this artwork (and its included tags) cannot be used for augmented reality tracking. To address this issue, one or more further tags are placed within the gaming machine cabinet. An example of such a tag is shown in FIG. 78.

In this embodiment, this tag is a robust "Frame Marker" where there is an identifier encoded around an arbitrary image. In this example, the arbitrary image is a "Bally" logo, but the arbitrary image could also be a casino logo or other identifier, or even a blank. Since this frame marker is within the cabinet, this frame marker would not normally be seen by casino patrons, so the frame marker may be more functional than the aesthetics of the tags in the top box video artwork.

Figure 80:
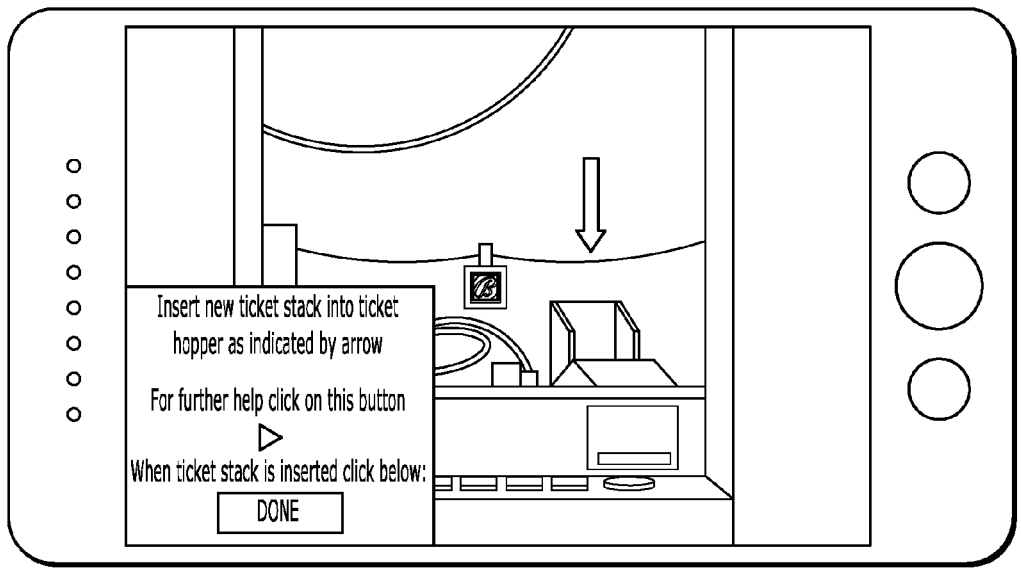
FIG. 80 illustrates an embodiment that shows instructions on how to fill the ticket hopper with an augmented arrow.

Once the tag from FIG. 78 is identified by the System and Method for Augmented Maintenance of a Gaming Machine 7000, the augmented content is displayed to aid the technician in addressing the maintenance issue, as shown in FIG. 80. In this embodiment, the technician is instructed to insert a new stack of tickets into the ticket hopper. The technician is also provided with the opportunity of receiving further help at this stage. This help may consist of text, a pre-recorded video showing the correct procedure, or even an augmented virtual ticket printer overlaid over the real ticket printer, with animation of virtual tickets being inserted into this virtual printer. Alternatively, the animation may show virtual tickets being inserted into the real printer as it is being shown in the camera image. This embodiment leverages the embodiments of the Augmented Reality with Interaction between Real and Virtual Objects, as discussed above.

Figure 81:
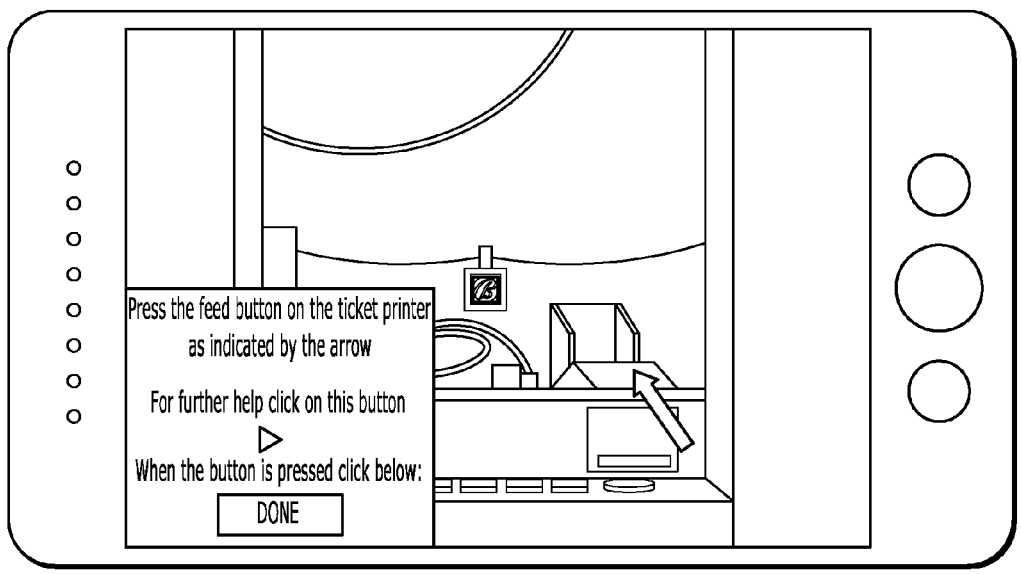
FIG. 81 illustrates an embodiment that shows instructions on how to feed the tickets into the printer with an augmented arrow.

After the technician has inserted the tickets, the technician then presses the "Done" area of the touchscreen on the mobile device. This action advances the instructions onto another page, as shown in FIG. 81. Referring to FIG. 81, the same paper tag is used, but the instructions and augmented content now assist the user in feeding the tickets into the ticket printer. In this embodiment, the correct button to press is highlighted by an augmented virtual arrow that is correctly positioned within the cabinet. Again, further help may be provided by the System and Method for Augmented Maintenance of a Gaming Machine 7000 if required. Once the technician has performed the maintenance action, the ticket printer should be correctly loaded.

If the ticket printer has been correctly loaded, the associated lockup function is cleared by the gaming machine. This information is then passed onto the CMS. In some embodiments, the CMS passes this information back to the System and Method for Augmented Maintenance of a Gaming Machine 7000. As such, a "Done" touchscreen button may not be necessary before advancing onto the next step.

Figure 82:
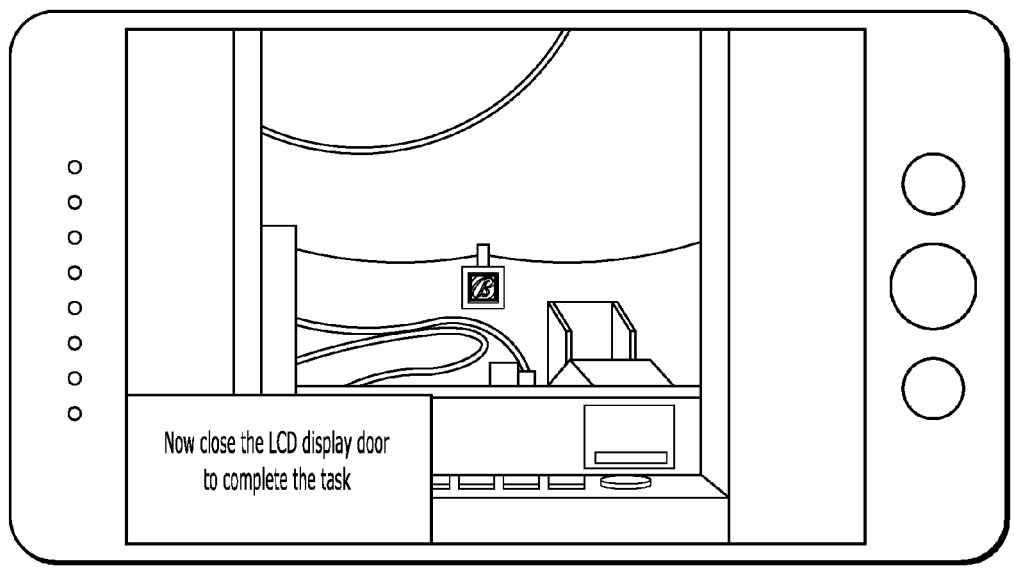
FIG. 82 illustrates an embodiment that shows closing instructions to end the maintenance.

In some embodiments, there may still be a "lockup" function resulting from the gaming machine associated with the open LCD display. FIG. 82 presents an illustration of a screen that may be shown to the technician while a "lockup" is present. Once the technician closes the LCD display door, the System and Method for Augmented Maintenance of a Gaming Machine 7000 has completed its functions. The System and Method for Augmented Maintenance of a Gaming Machine 7000 may then return to waiting for a further QR code.

In the above-described embodiment of the System and Method for Augmented Maintenance of a Gaming Machine 7000, a CMS (Casino Management System) is utilized; however, a CMS is not necessary for some implementations of the System and Method for Augmented Maintenance of a Gaming Machine. For example, in some embodiments the System and Method for Augmented Maintenance of a Gaming Machine has access to all data related to every gaming machine on a property. In such an embodiment, a database enables the System and Method for Augmented Maintenance of a Gaming Machine to retrieve a machine configuration from a barcode attached to the gaming machine. This data may be stored on the mobile device or be available over an intranet or the Internet.

Figure 83:
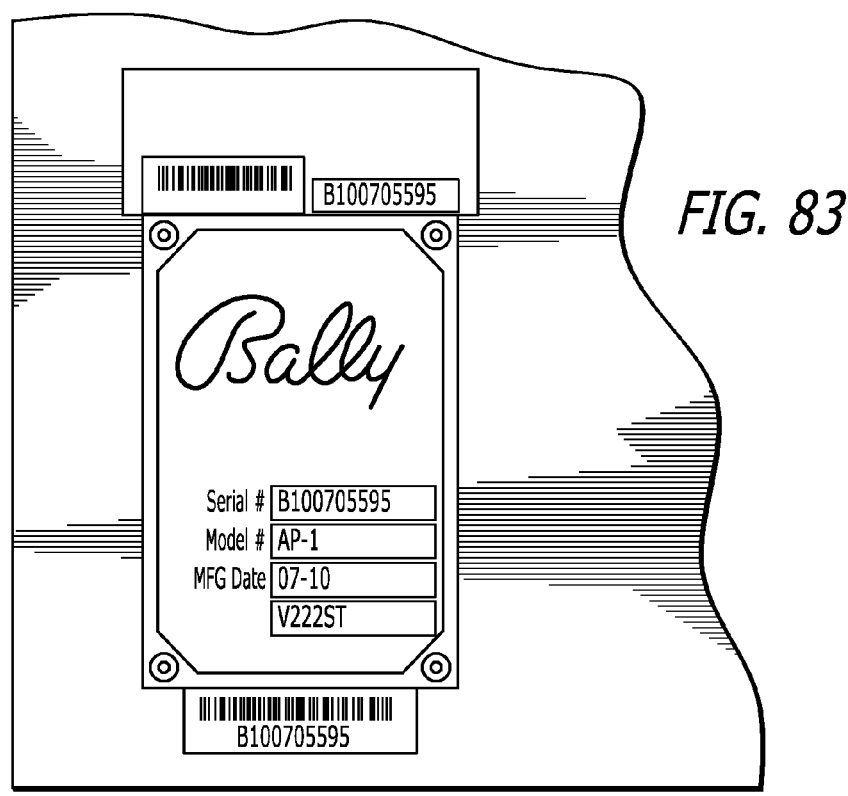
FIG. 83 illustrates an embodiment that shows an asset tag alternative to the QR code.

FIG. 83 shows an example of a barcode that may be used as the "asset tag" that is applied to a gaming machine. To use such an asset tag, the System and Method for Augmented Maintenance of a Gaming Machine instructs the technician to scan the asset tag with the camera of the mobile device, and then point the camera of the mobile device at the main gaming machine screen. In some embodiments, the gaming machine itself may generate a QR code which may be read by the camera. The QR code indicates the type of "maintenance lockup" along with the information in the asset tag. In an embodiment that incorporates existing gaming machines with no inbuilt QR code capability, the System and Method for Augmented Maintenance of a Gaming Machine may read the text of the "maintenance lockup" from the gaming machine screen using OCR (Optical Character Recognition) technology. From this information, the System and Method for Augmented Maintenance of a Gaming Machine may then determine the correct procedure to be followed to correct the problem.

Some embodiments of the System and Method for Augmented Maintenance of a Gaming Machine disclosed herein do not require any modification of existing gaming machines beyond the attachment of one or more paper tags within the gaming machine cabinet. This results in significantly easier maintenance of a gaming machine. Additionally, many variants of gaming machines may easily be accessed using the System and Method for Augmented Maintenance of a Gaming Machine. Furthermore, instructions regarding how to fix a gaming machine problem are delivered by the System and Method for Augmented Maintenance of a Gaming Machine, and in a user friendly manner. Notably, the System and Method for Augmented Maintenance of a Gaming Machine is cost effective to deploy since the only infrastructure utilized beyond CMS and DM networks are mobile devices for each technician and one or more paper tags per gaming machine.

One specific, non-limiting embodiment of the System and Method for Augmented Maintenance of a Gaming Machine uses a CMS system connected to an iView PTM (Player Tracking Machine); an iView DM (Display Manager) for each gaming machine (or iView LVDS display for stepper machines); a Vuforia™ augmented reality SDK plugin for Unity-3D; and an Apple I-Pad 2 or better (and/or an android mobile device). Moreover, some embodiments of the System and Method for Augmented Maintenance of a Gaming Machine use of tags within artwork to locate objects such as locks associated with a gaming machine, augmented content to show how to fix a gaming machine; animated interaction of virtual and physical elements (e.g., virtual tickets shown being fed into a physical ticket printer); and combinations thereof. As described above, a non-CMS-based System and Method for Augmented Maintenance of a Gaming Machine may use existing asset tags. Finally, QR codes may be used by the System and Method for Augmented Maintenance of a Gaming Machine to seamlessly refer to different content depending upon a user's access level.

Enhanced Augmented Reality Tracking:

As previously described, augmented reality (AR) applications allow a user holding a mobile device (e.g., a smartphone, tablet or HUD glasses) to receive additional content superimposed over a live video stream (in the case of a smartphone) or a semi-transparent display (in the case of glasses).

In some embodiments, augmented reality functions by capturing the live video stream from a camera of a mobile device and analyzing the live video stream for the presence of augmented reality "image tags." Image tags may take to form of QR codes or barcodes; however, image tags may also be printed images. Additionally, as discussed above, image tags may also be embedded in video content, such as from a gaming machine. Continuing, in some embodiments augmented reality content may be overlaid on existing games (or objects in a gaming environment) without any modification to the game (or associated objects in a gaming environment). In contrast, an embodiment of a System and Method for Enhanced Augmented Reality Tracking is configured to enable game content to be generated that is aware of the Enhanced Augmented Reality Tracking System, thereby enabling the game content to interact with the augmented reality functions of the Enhanced Augmented Reality Tracking System.

Typically, existing augmented reality applications are limited in that the content to be augmented is unaware of the augmentation. As such, the augmented reality application must treat the existing content as essentially a static surface, so augmented reality effects cannot influence this content. A further limitation of typical existing augmented reality applications is that these applications or unable to handle tracking fast moving or complex arrangements of image tags. While this limitation may sometimes be related to current camera performance and the processing power of the mobile device, more complex game content provides its own unique challenges to be addressed.

Still another limitation of existing augmented reality applications is that some content is not suitable for being tagged, which is generally necessary for direct augmentation. This limitation may sometimes be related to technical limitations in camera technology and the image tag recognition processes. For example, some manufacturers suggest that image tags have a high amount of visual detail, clearly defined edges, and high local contrast. These image tag characteristics may not be possible for some types of content that were not designed (or optimized) for being tagged.

This embodiment of the System and Method for Enhanced Augmented Reality Tracking is configured to overcome these limitations by establishing a communication channel between the augmented reality mobile application and the gaming machine, thereby enabling additional elements of the game to be successfully augmented on the mobile device. Additionally, elements of the game content may be influenced by the augmented state.

Figure 84:
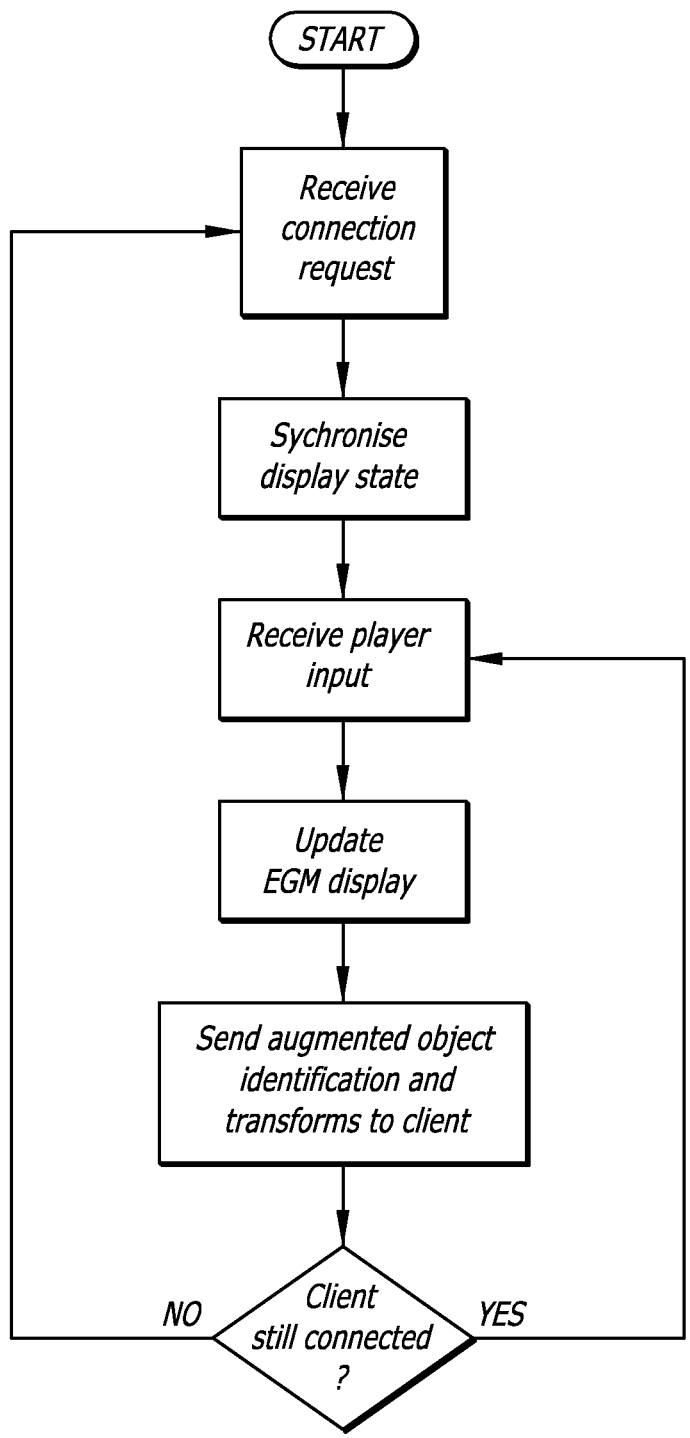
FIG. 84 is a logic flow diagram that shows an EGM process.
Figure 85:
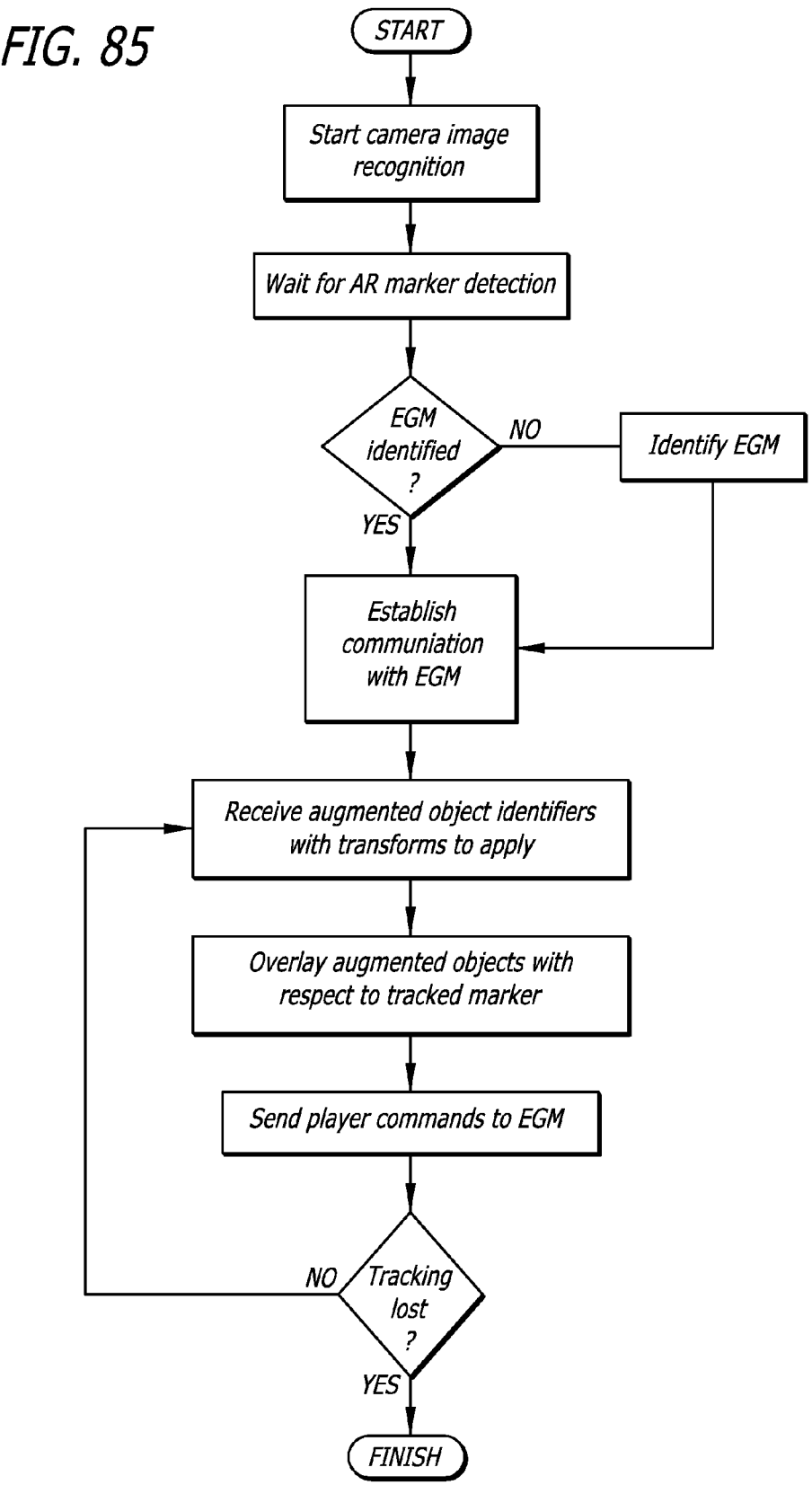
FIG. 85 is a logic flow diagram that shows a mobile device process.

FIGS. 84 and 85 illustrate a logical flow diagram showing the operation of one embodiment of a System and Method for Enhanced Augmented Reality Tracking Specifically, the process shown in FIG. 84 operates within the gaming machine. Continuing, the process shown in FIG. 85 operates on a mobile device performing the augmented reality effects.

Referring again to FIG. 84, in one embodiment of the System and Method for Enhanced Augmented Reality Tracking, the gaming machine hosts a process that waits for incoming network connection requests. There are a number of ways a connection may be established. In one embodiment, the mobile device has a Wireless (Wifi) connection to an Ethernet network to which the gaming machine is connected. The mobile device establishes a connection by connecting to a network "socket" at the IP address of the gaming machine.

FIG. 85 illustrates the methods by which the mobile device may identify the IP address of the gaming machine to make a socket connection. In alternative embodiments of the System and Method for Enhanced Augmented Reality Tracking, the Wifi connection may include Bluetooth, NFC, or even higher-level APIs (e.g., Qualcomm's "AllJoyn"), which enable applications to communicate without regard to the physical transport.

Once a connection is established, the gaming machine sends to the mobile device the current state of relevant display elements being shown on any (or all) of the gaming machine displays. This embodiment leverages the embodiments of the Augmented Reality with Interaction between Real and Virtual Objects, as discussed above. In this manner, multiple displays may thus be augmented with reference to one augmented reality image tag. Examples of such display elements are described below.

In one embodiment of the System and Method for Enhanced Augmented Reality Tracking, the gaming machine process then performs a number of actions while the communication channel is still active. In one aspect, data from the mobile device is used to adjust the gaming machine display content. One example of such data may include a player selecting a touchscreen button on the mobile device to perform the same action as pressing a physical (or iDeck) gaming machine on the gaming machine. Another example may include the mobile device signaling that an augmented tag has been sighted (or is no longer sighted).

Continuing, in one embodiment of the System and Method for Enhanced Augmented Reality Tracking, the gaming machine may modify the content to be displayed, depending upon this input. The gaming machine may also send back to the mobile device, a list of content to be augmented on the mobile display, along with relevant positioning and orientation information. Examples of these augmentations are described below.

Figure 86:
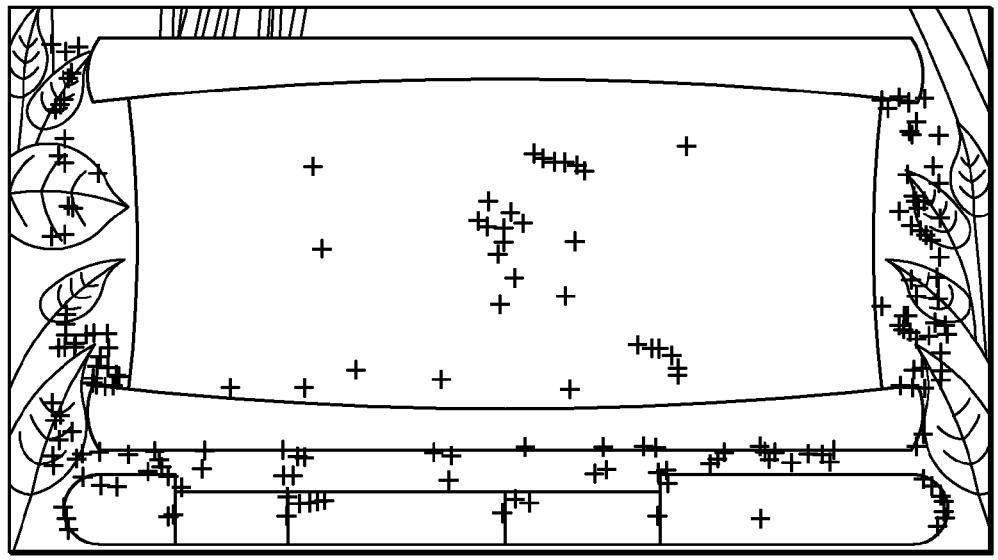
FIG. 86 illustrates an embodiment that shows an example AR image marker tag.

Referring now to FIG. 85, the augmented reality process of the System and Method for Enhanced Augmented Reality Tracking is shown from the mobile device perspective. Once the augmented reality application of the System and Method for Enhanced Augmented Reality Tracking is initialized, the augmented reality application starts displaying a live video feed from the camera mounted on the smartphone. In addition, augmented reality recognition technology of the System and Method for Enhanced Augmented Reality Tracking is used to detect the presence of an augmented reality marker or image tag. FIG. 86 shows an example of such an image tag. This type of image tag is the backdrop for a game (i.e., "Cash Wizard"). In some embodiments, this type of image tag is embedded in a video image, as discussed above with respect to the System and Method for Complex Augmented Video Image Tags. Once identified in the camera image, the augmented reality application determines at which gaming machine cabinet the player is looking.

Figure 87:
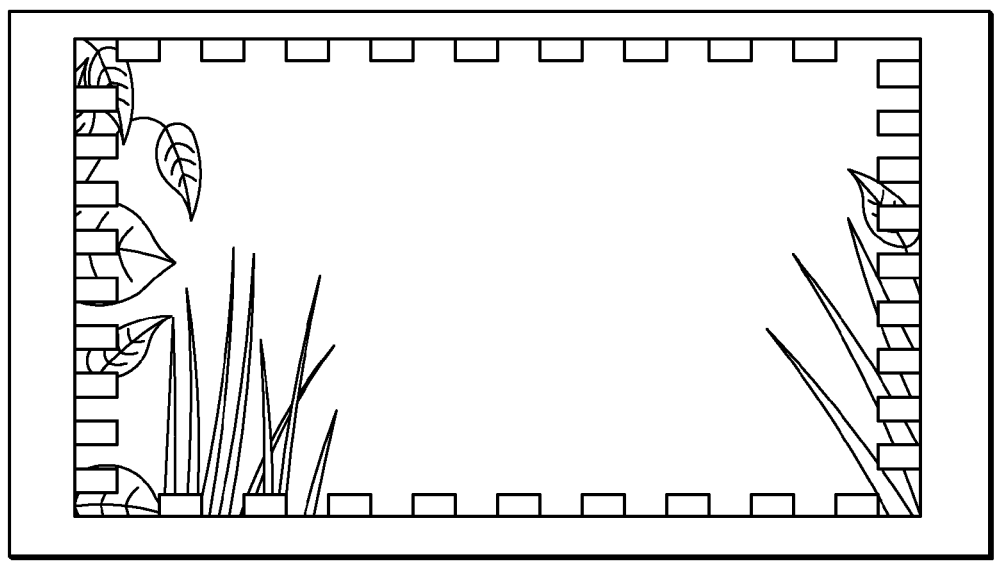
FIG. 87 illustrates an embodiment that shows an example frame marker using top screen background artwork.

Numerous approaches may be used in such an embodiment. FIG. 87 shows one embodiment in which the top-display artwork has additional "frame marker" content applied to the artwork. In some embodiments, this "frame marker" content is relatively inconspicuous. In other embodiments, the "frame marker" content is not as large, since it is not necessary that the "frame marker" content be used for tracking movement. In such an embodiment, the "frame marker" content only requires that one successful identification occurs.

In still another System and Method for Enhanced Augmented Reality Tracking, known individual pixels of a game cycle through colors to uniquely identify the gaming machine, or some associated information such as its IP address. These techniques are described in greater detail above. These approaches are particularly useful when also leveraging the embodiments of the Augmented Reality with Interaction between Real and Virtual Objects, since the location of frame-markers or individual pixels may be derived from the location of the main LCD display being tracked (See FIG. 86).

Yet another embodiment of the System and Method for Enhanced Augmented Reality Tracking uses Bluetooth or NFC technology, either as a transport technology or simply to identify a particular gaming machine. By triangulation or measuring signal strength, the mobile device may determine the gaming machine in question if multiple augmented reality-enhanced gaming machines are present. Alternatively, augmented reality-enhanced gaming machines may be arranged such that only one of a particular game type is within Bluetooth or NFC range at any one time.

Once the gaming machine is uniquely identified, its IP address may be obtained directly from the frame marker or cycling pixel data. Alternatively, the IP address of the gaming machine may be obtained by contacting a server hosting a table of mappings from a gaming machine identifier to an IP address. The IP address is then used to establish a socket connection with the gaming machine.

As described above, the mobile application of the System and Method for Enhanced Augmented Reality Tracking then begins receiving descriptions of display objects to be augmented, as well as their position and orientation. In the embodiments described below, these may consist of transformation matrices from which position and orientation may be derived. Notably, these transformations are sent by the gaming machines in a co-ordinate system that is oriented with respect to the game display. For example, a position co-ordinate of (0, 0, 0) may refer to the bottommost, leftmost pixel of the main LCD display. Once received, these co-ordinates are interpreted with respect to the tracked image tag by the System and Method for Enhanced Augmented Reality Tracking So if the mobile device is to the left and above the gaming display, the co-ordinates are similarly transformed using existing matrix algebra. Examples of these display objects are described below.

Figure 88:
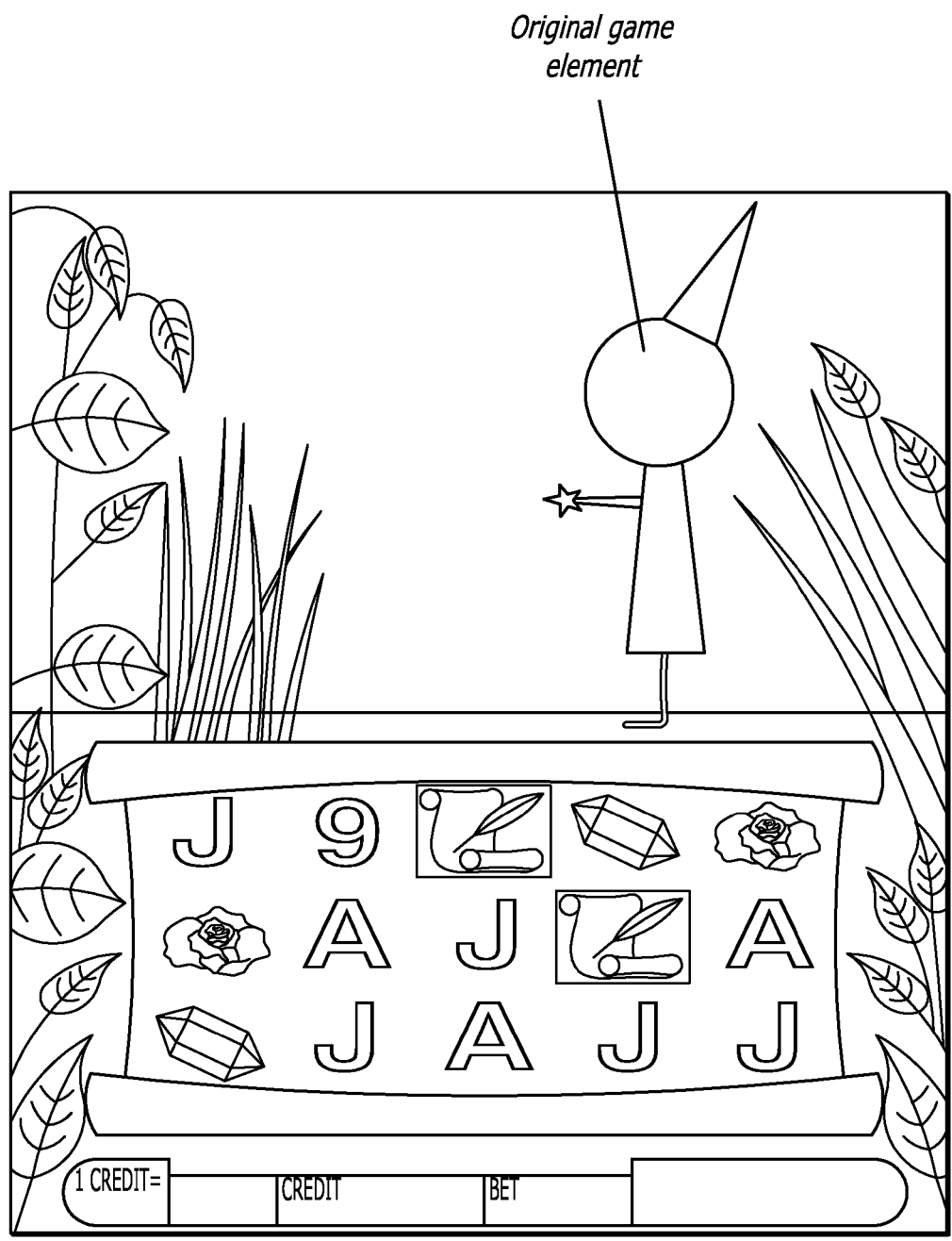
FIG. 88 illustrates an embodiment that shows a game without any augmentation.

Referring now to FIG. 88, an example of existing gaming content of a gaming machine is shown. This particular game (Cash Wizard) is composed of five reels, as well as a "Cash Wizard" (CW) animated character. The CW game is rendered using a real-time 3D engine on both the top and main LCD displays. To provide clarity in this example, both displays are shown adjoining, with no gap between the adjoining displays.

Figure 89:
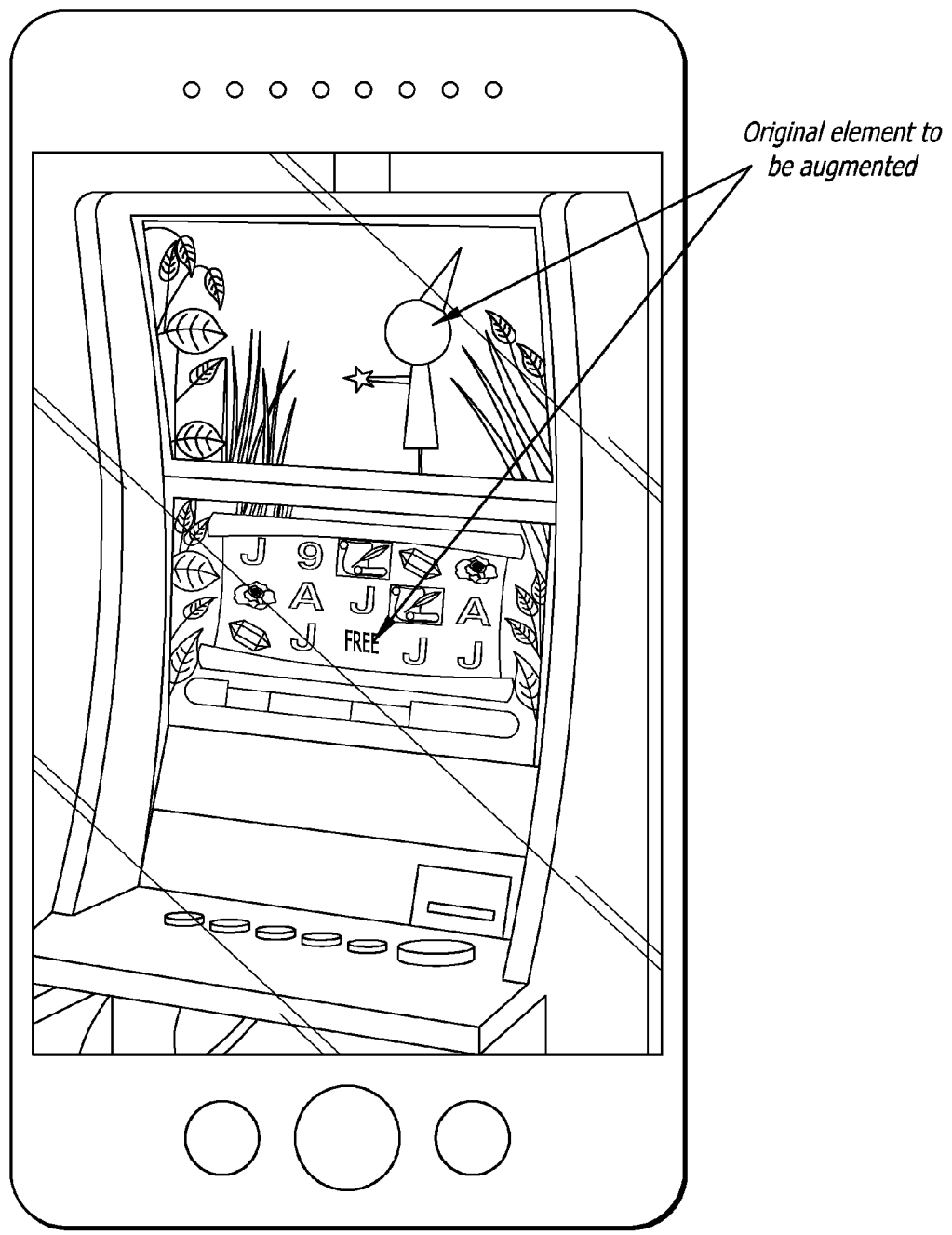
FIG. 89 illustrates an embodiment that shows a game without any augmentation from a player's perspective.

The CW animated character is one of the elements that is augmented in this embodiment. FIG. 89 broadly shows the same content as FIG. 88, but from a player's perspective. In addition to the CW animated character, there is also a Free Games symbol present on the main display of the gaming machine. There is no augmentation present at this stage. FIG. 89 illustrates a player's viewpoint looking at the cabinet.

Figure 90:
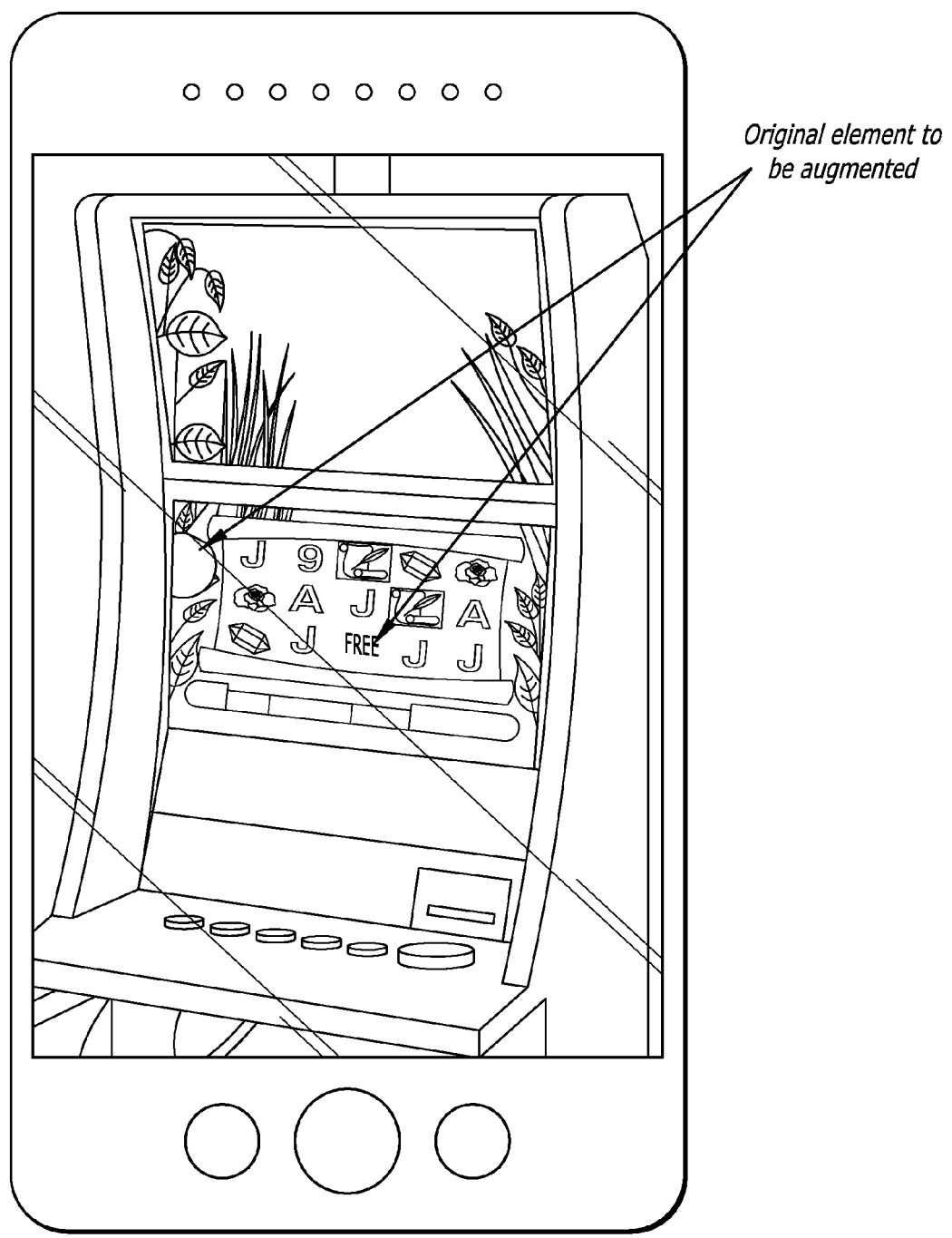
FIG. 90 illustrates an embodiment that shows a game without any augmentation with a clipped element.

Referring now to FIG. 90, it may be seen that the CW animated character has moved partially off the left-hand side of the main display. This example shows some of the limitations of 2D (and even stereoscopic content). In this regard, once elements are partially "clipped," the elements lose their 3D effect (at least somewhat).

Figure 91:
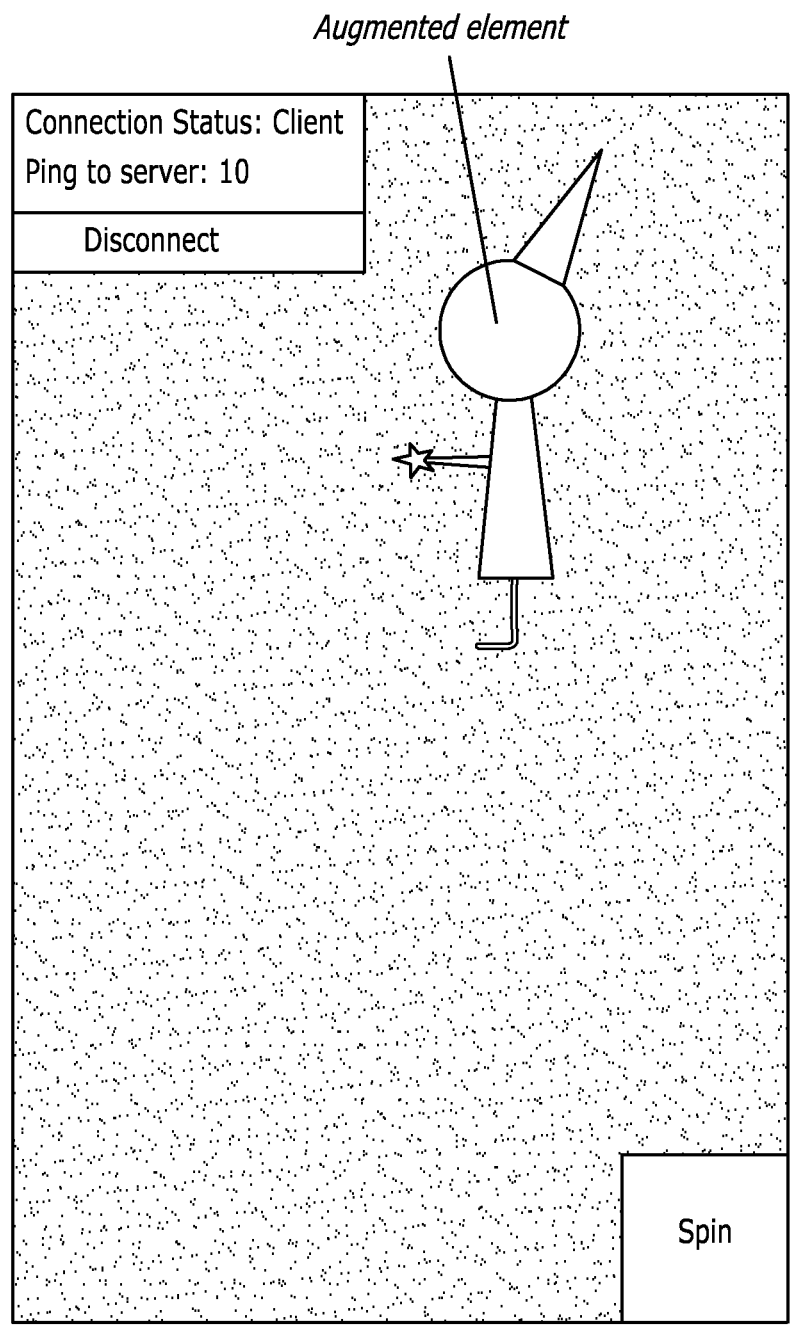
FIG. 91 illustrates an embodiment that shows augmented elements without a live camera view.

Referring now to FIG. 91, an augmented reality mobile application is shown with the camera image replaced by a solid cyan background for ease of clarity. The CW element is rendered by the augmented reality mobile application identically as it would be shown by the gaming machine.

Figure 92:
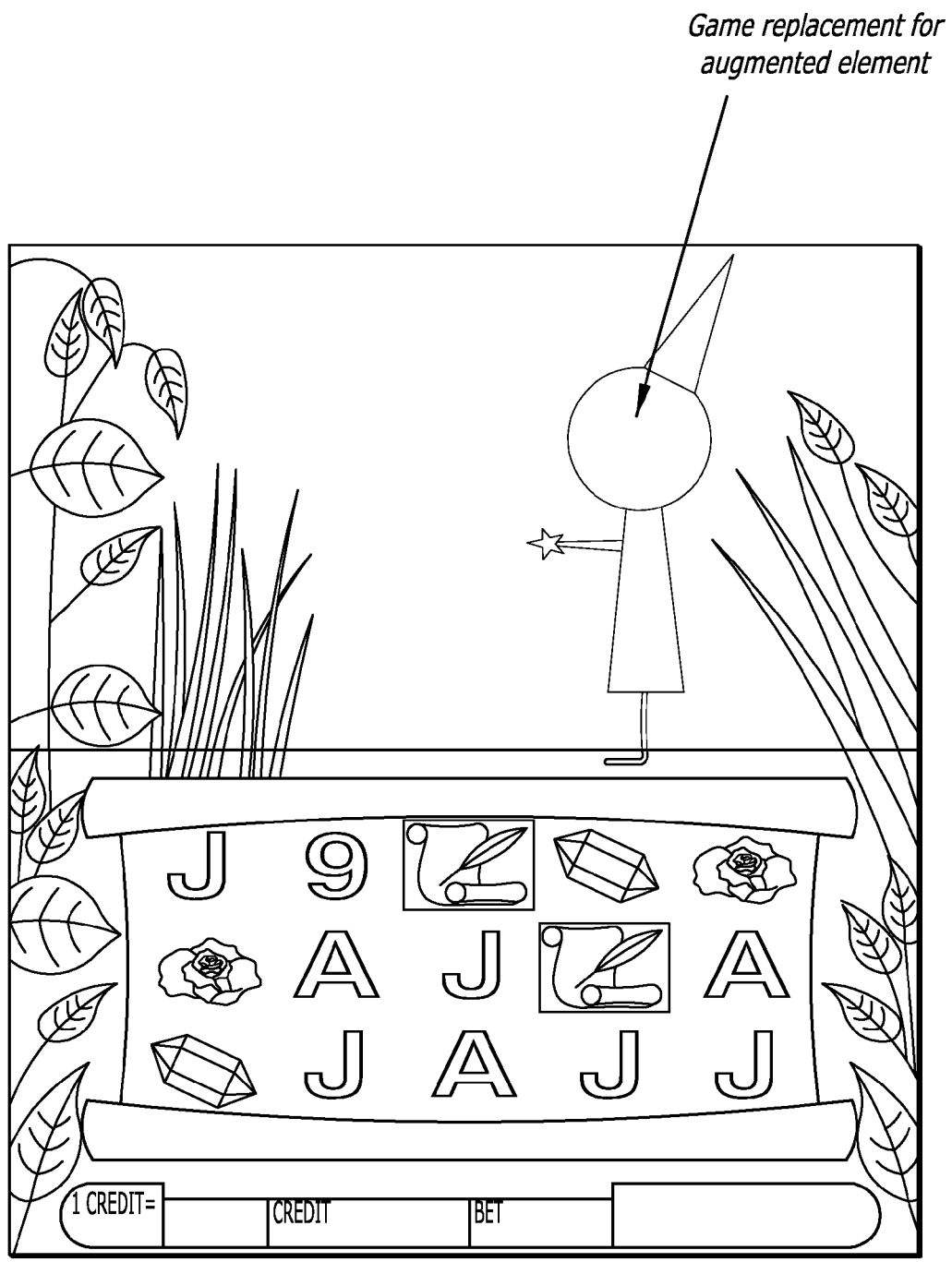
FIG. 92 illustrates an embodiment that shows a game replacement of an augmented element with a shadow.

Continuing, FIG. 92 shows an example of how the presence of augmented reality may affect the gaming machine content. In this example, the mobile device has sent data to the gaming machine. The data tells the gaming machine that the image tag has been acquired and the gaming machine is being tracked. As a result, the gaming machine no longer displays a rendered CW element as in FIG. 88. Instead, the gaming machine displays a shadow of the CW element. Alternatively, the gaming machine may not display the CW element at all.

Figure 93:
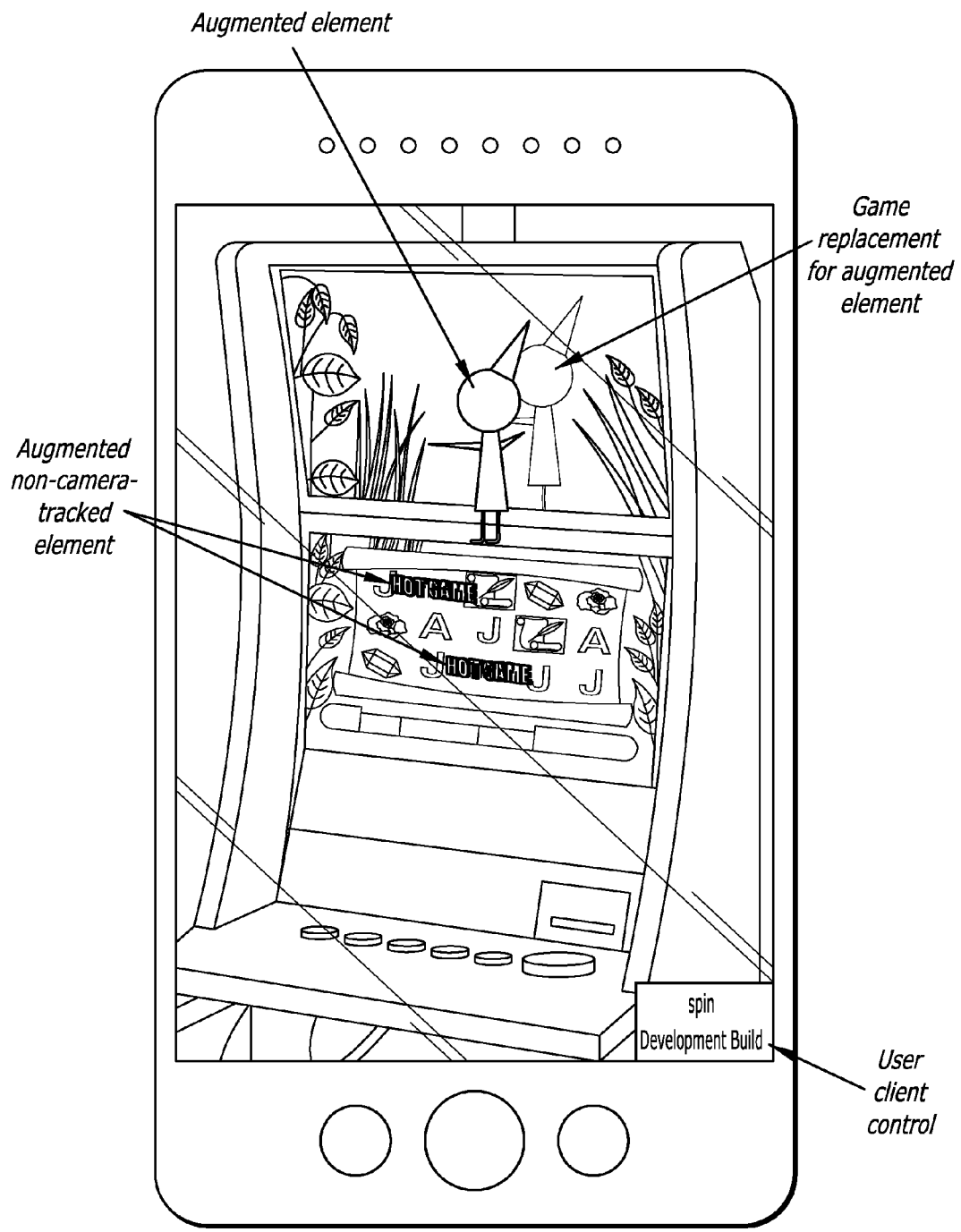
FIG. 93 illustrates an embodiment that shows an augmented view from a player's perspective.

Referring now to FIG. 93, a player's perspective view is shown as if the player had held their mobile device up in front of them, or used augmented reality glasses. The CW element is displayed by the augmented reality application and appears to float above the shadow as it is simultaneously rendered on the gaming machine display. In addition, the Free Game elements have augmented effects applied to them as well (e.g., indicating some enhanced data such as "lucky symbols"). Finally, the virtual "spin" button on the mobile display enables the player to remotely operate the spin button on the gaming machine cabinet.

Figure 94:
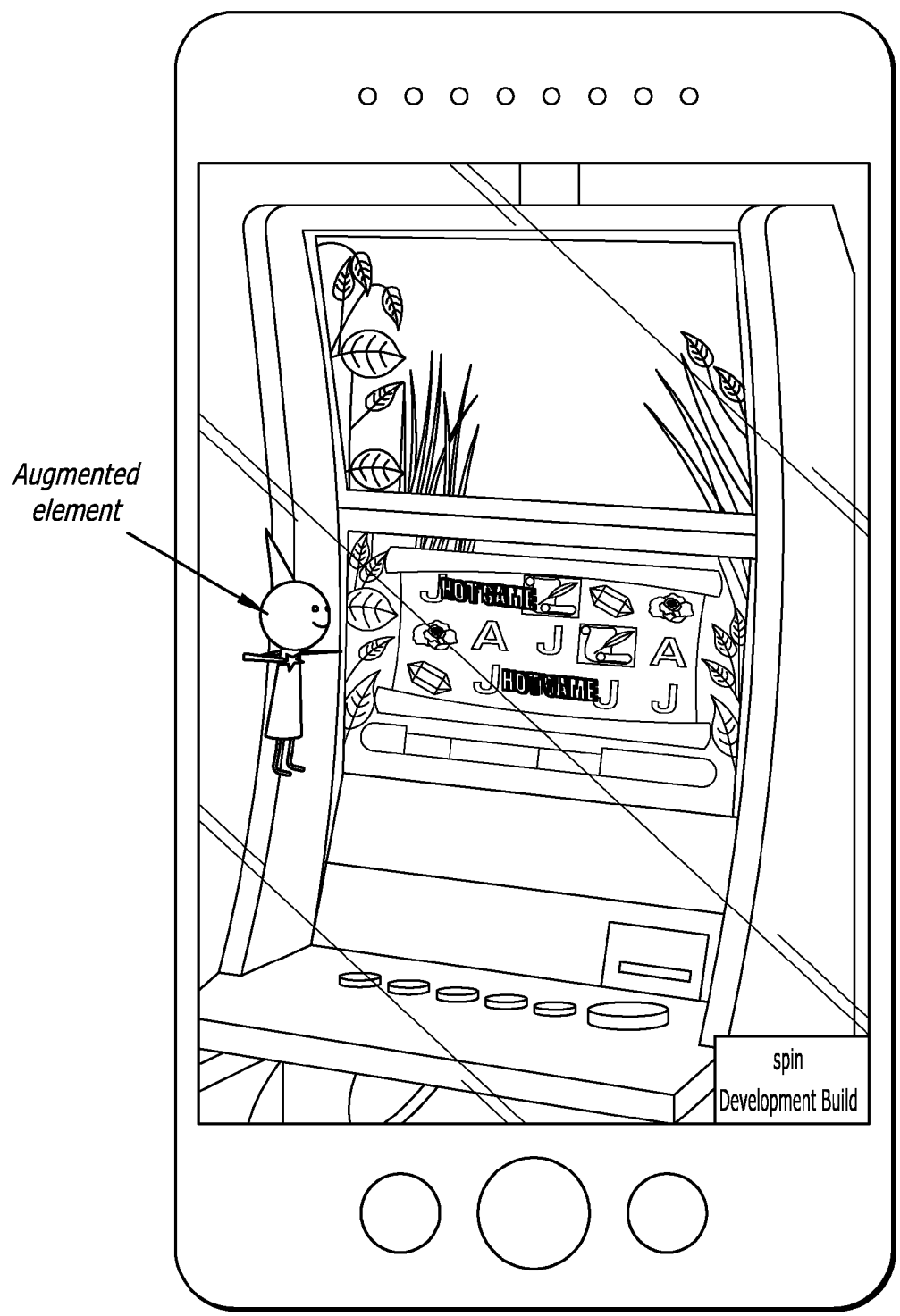
FIG. 94 illustrates an embodiment that shows an augmented view with a non-clipped augmented element.

FIG. 94 illustrates how the clipping problem is solved. Unlike the embodiment shown in FIG. 90, the CW element appears outside of the display, but is not clipped. By leveraging the System and Method of Augmented Reality with Interaction between Real and Virtual Objects, the CW element may interact with the physical cabinet. Notably, all of these techniques may be used for stepper products, curved products, or hybrid video/stepper products. In one embodiment, using stepper products enable video effects to be applied to physical printed reals in a striking manner.

One specific, non-limiting embodiment of the System and Method for Enhanced Augmented Reality Tracking employs an Android or Apple smartphone with an integrated camera; a Qualcomm™ Vuforia™ SDK (Software Development Kit) for augmented reality applications; a gaming machine;

a wired Ethernet component from the gaming machine; and a wireless (Wifi) Ethernet from the smartphone, which connects to the gaming machine over a wired/wireless bridge.

Some embodiments of the System and Method for Enhanced Augmented Reality Tracking disclosed herein provide multiple video display elements that may be augmented at once without increasing processing overhead on the mobile device. Additionally, use of the disclosed system enables video display elements to be augmented that might otherwise be too small, moving too quickly, or lacking in augmented reality suitable features to be adequately tracked. Continuing, the disclosed system enables display elements to be tracked with a high degree of precision, as well as enabling game content to be adjusted to enhance the augmented effect. Another aspect of the disclosed system supports to ability of multiple viewers of augmented content to view the augmented content, each with their own independent viewpoint.

Some embodiments of the System and Method for Enhanced Augmented Reality Tracking disclosed herein use one augmented reality tag to enable multiple display elements to act as though tagged, even when these display elements are spread across multiple displays. In another aspect of one embodiment, underlying game content may be modified depending upon augmentation that is present or absent. Additionally, frame markers may be used to identify a particular gaming machine.

Those skilled in the art will readily recognize various modifications and changes that may be made to the claimed systems and methods without following the example embodiments and applications illustrated and described herein, and without departing from the true spirit and scope of the claimed systems and methods.

What is claimed is:

1. A method of enabling an augmented reality interaction system and a mobile device to overlay a virtual 3D component over a physical 3D component with which the virtual 3D component interacts, the method comprising:
controlling a camera on the mobile device using the augmented reality interaction system;
enabling a user to capture a live camera image of a gaming machine cabinet via the camera;
determining if there are image tags on the gaming machine cabinet in the live camera image;
in response to identifying the image tags on the gaming machine cabinet, producing a virtual rendering of the gaming machine cabinet;
determining virtual 3D components to be displayed over an image of a virtual gaming machine cabinet, wherein the virtual 3D components include a plurality of elements each having a depth value and the virtual gaming machine cabinet includes a different plurality of elements each having a different depth value;
comparing a virtual depth rendering of the virtual 3D components to a virtual depth rendering of the virtual gaming machine cabinet;
in response to the comparison, subtracting the elements of the virtual 3D components that have a lower depth value than the elements of the virtual gaming machine cabinet at corresponding spatial positions; and
overlaying the virtual 3D components without the subtracted elements onto a live camera image of the virtual gaming machine cabinet on a display of the mobile device.

2. The method of claim 1, further comprising: using a depth buffer to determine which elements of a 3D rendering are visible to a virtual camera.

3. The method of claim 2, further comprising: comparing a z-value of each element against an existing depth buffer z-value at a same screen coordinate, wherein if the existing z-value is greater, a pixel is drawn, and wherein if the existing z-value is less than the existing depth buffer z-value at the same screen co-ordinate, then the pixel is discarded.

4. The method of claim 2, further comprising: rendering the virtual gaming machine cabinet by mapping image tag co-ordinates to gaming machine cabinet co-ordinates using vector subtraction.

5. The method of claim 4, further comprising: combining a camera video image with the rendering of an additional virtual 3D component minus the virtual gaming machine cabinet.

6. The method of claim 1, wherein a CAD model having spatial parameters is associated with an image tag.

7. The method of claim 1, wherein the virtual rendering of the gaming machine cabinet is a virtual depth-only rendering of the gaming machine cabinet.

8. The method of claim 1, wherein an object recognition system of an augmented reality gaming assistance component establishes a communication channel between an augmented reality component and a gaming machine enabling additional elements of a game to be augmented on the mobile device, and elements of game content to be influenced by an augmented state.

9. The method of claim 1, wherein an augmented reality translation system of an augmented reality assistance component extracts a first language from a display of a gaming machine and translates the first language into a second language that is visible to the user in place of the first language.

10. A method of enabling an augmented reality interaction system and a mobile device to overlay a virtual 3D component over a physical 3D component with which the virtual 3D component interacts, the method comprising:
enabling a user to capture a live camera image of a 3D object via a camera on the mobile device;
determining if there are image tags on the 3D object in the live camera image;
in response to identifying the image tags on the 3D object, producing a virtual rendering of the 3D object;
determining virtual 3D components to be displayed over an image of the 3D object, wherein the virtual 3D components include a plurality of elements each having a depth value and a virtual 3D object includes a different plurality of elements each having a different depth value;
comparing a virtual depth rendering of the virtual 3D components to a virtual depth rendering of the virtual 3D object;
in response to the comparison, subtracting the elements of the virtual 3D components that have a lower depth value than elements of the virtual 3D object at corresponding spatial positions; and
overlaying virtual 3D components without the subtracted elements onto the live camera image of the virtual 3D object on a display of the mobile device.

11. The method of claim 10, further comprising: using a depth buffer to determine which plurality of elements of a 3D rendering are visible to a virtual camera.

12. The method of claim 11, further comprising: comparing a z-value of each element against an existing depth buffer z-value at a same screen coordinate, wherein if an existing z-value is greater, a pixel is drawn, and wherein if the existing z-value is less than the existing depth buffer z-value at the same screen co-ordinate, then the pixel is discarded.

13. The method of claim 11, further comprising: rendering the virtual 3D object by mapping a image tag co-ordinates to a 3D object co-ordinates using vector subtraction.

14. The method of claim 13, further comprising: combining a camera video image with the rendering of an additional virtual 3D component minus the virtual 3D object.

15. The method of claim 10, wherein a CAD model having spatial parameters is associated with the image tags.

16. The method of claim 10, wherein the virtual rendering of the 3D object is a virtual depth-only rendering of the 3D object.

17. The method of claim 10, wherein virtual rendering of the 3D object extracts 2D information from a display of a gaming machine to produce a 3D image of the gaming machine.

18. The method of claim 10, further comprising: overlaying virtual graphics in a position within 3D space on the display of the mobile device that augment a display of a gaming machine with 3D to create complex augmented reality.

19. The method of claim 10, wherein an object recognition system of an augmented reality gaming assistance component establishes a communication channel between a augmented reality component and a gaming machine enabling additional elements of a game to be augmented on the mobile device, and elements of a game content to be influenced by the an augmented state.

20. The method of claim 10, wherein an augmented reality translation system of an augmented reality assistance component extracts a first language from a display of a gaming machine and translates the first language into a second language that is visible to the user in place of the first language.

* * * * *